US012586444B2

(12) United States Patent
Schwartz et al.

(10) Patent No.: US 12,586,444 B2
(45) Date of Patent: Mar. 24, 2026

(54) COMPUTER-IMPLEMENTED SYSTEMS AND METHODS FOR IMPLEMENTING MATRIX-BASED ONLINE GAMING

(71) Applicant: RSI IP Holding LLC, Chicago, IL (US)

(72) Inventors: Richard Schwartz, Deerfield, IL (US); Mattias Stetz, Chicago, IL (US); Ali Hajjafar, Leander, TX (US); Dan Quinn, Paso Robles, CA (US); Vladislav Köster, Tallin (EE)

(73) Assignee: RSI IP HOLDING LLC, Chicago, IL (US)

( * ) Notice: Subject to any disclaimer, the term of this patent is extended or adjusted under 35 U.S.C. 154(b) by 243 days.

(21) Appl. No.: 18/239,056

(22) Filed: Aug. 28, 2023

(65) Prior Publication Data

US 2024/0071178 A1 Feb. 29, 2024

Related U.S. Application Data

(60) Provisional application No. 63/373,819, filed on Aug. 29, 2022.

(51) Int. Cl.
*G07F 17/32* (2006.01)

(52) U.S. Cl.
CPC ...... *G07F 17/3288* (2013.01); *G07F 17/3211* (2013.01); *G07F 17/3251* (2013.01)

(58) Field of Classification Search
None
See application file for complete search history.

(56) References Cited

U.S. PATENT DOCUMENTS

2005/0091660 A1* 4/2005 Cwalina .................... G06F 8/20 719/310
2015/0080124 A1 3/2015 Andersen et al.
2015/0179021 A1 6/2015 Alexander
2016/0078729 A1 3/2016 Maggio
2018/0025590 A1* 1/2018 Ballone ............... G07F 17/3209 463/21
2025/0005995 A1* 1/2025 Boese ...................... G07F 17/34
2025/0157295 A1* 5/2025 Holt .................... G07F 17/3262

OTHER PUBLICATIONS

International Search Report and Written Opinion mailed Oct. 18, 2023, Patent Application No. PCT/US2023/073073, 11 pages.

* cited by examiner

*Primary Examiner* — Ronald Laneau
(74) *Attorney, Agent, or Firm* — Davis Wright Tremaine LLP

(57) ABSTRACT

An apparatus, system, computer-readable medium, and/or process to perform a house-based game matrix and provide information to a display device. The house-based game matrix may include a plurality of selectable gaming units (e.g., squares for a squares game for a sports betting event). Each selectable gaming unit may be associated with a first gaming number from a first set of event gaming numbers and a second gaming number from a second set of event gaming numbers. The score of the event associated with the house-based game matrix may be monitored. For a selected gaming unit made by the display device, the first score number with the first gaming number of the selected gaming unit and the second score number with the second gaming number of the selected gaming unit may be compared.

20 Claims, 25 Drawing Sheets

SEATTLE SEAHAWKS

| Runs 1705 | | | | | | | | | | |
|---|---|---|---|---|---|---|---|---|---|---|
| | 0 | 1 | 2 | 3 | 4 | 5 | 6 | 7 | 8 | 9 |
| 0 | 0.50% | 1.60% | 1.10% | 1.20% | 1.00% | 1.20% | 0.50% | 0.50% | 0.10% | 0.10% |
| 1 | 1.30% | 0.80% | 1.90% | 1.70% | 1.20% | 1.40% | 0.20% | 0.70% | 0.00% | 0.20% |
| 2 | 2.10% | 3.40% | 0.20% | 0.20% | 1.30% | 0.70% | 0.80% | 0.70% | 0.80% | 0.20% |
| 3 | 2.00% | 2.60% | 4.00% | 2.40% | 0.20% | 1.60% | 1.20% | 0.40% | 0.60% | 0.20% |
| 4 | 2.20% | 2.90% | 2.70% | 1.40% | 1.40% | 1.90% | 0.60% | 0.80% | 0.50% | 0.20% |
| 5 | 1.10% | 1.50% | 1.60% | 0.70% | 2.10% | 0.10% | 0.00% | 0.70% | 0.20% | 0.30% |
| 6 | 0.70% | 1.40% | 1.80% | 0.70% | 0.20% | 1.60% | 0.00% | 1.30% | 0.30% | 0.00% |
| 7 | 1.10% | 1.00% | 1.00% | 0.70% | 0.30% | 0.60% | 0.00% | 0.00% | 0.60% | 0.20% |
| 8 | 0.70% | 0.80% | 1.00% | 0.70% | 0.60% | 0.40% | 0.50% | 0.70% | 0.00% | 0.00% |
| 9 | 0.70% | 0.80% | 0.80% | 0.70% | 0.00% | 0.50% | 0.50% | 0.30% | 0.20% | 0.00% |

*FIG. 17A*

| Hits 1710 | | | | | | | | | | |
|---|---|---|---|---|---|---|---|---|---|---|
| | 0 | 1 | 2 | 3 | 4 | 5 | 6 | 7 | 8 | 9 |
| 0 | 0.90% | 0.90% | 0.40% | 0.60% | 1.00% | 1.20% | 0.50% | 0.50% | 0.10% | 1.00% |
| 1 | 0.70% | 0.80% | 1.90% | 1.70% | 1.20% | 1.40% | 0.20% | 0.70% | 0.00% | 0.60% |
| 2 | 0.50% | 3.40% | 0.20% | 0.20% | 1.30% | 0.70% | 0.80% | 0.70% | 0.80% | 0.90% |
| 3 | 0.40% | 2.60% | 4.00% | 2.40% | 0.20% | 1.60% | 1.20% | 0.40% | 0.60% | 0.70% |
| 4 | 0.70% | 2.90% | 2.70% | 1.40% | 1.40% | 1.90% | 0.60% | 0.80% | 0.50% | 0.60% |
| 5 | 0.70% | 1.50% | 1.60% | 0.70% | 2.10% | 0.10% | 0.80% | 0.70% | 0.20% | 1.00% |
| 6 | 0.70% | 1.40% | 1.80% | 0.70% | 0.20% | 1.60% | 0.80% | 1.30% | 0.30% | 0.70% |
| 7 | 1.30% | 1.00% | 1.00% | 0.70% | 0.30% | 0.60% | 0.75% | 0.00% | 0.60% | 1.40% |
| 8 | 1.30% | 0.80% | 1.00% | 0.70% | 0.60% | 0.40% | 0.50% | 0.70% | 0.00% | 1.90% |
| 9 | 1.20% | 0.90% | 1.00% | 0.80% | 1.40% | 1.20% | 1.60% | 1.40% | 1.20% | 1.10% |

*FIG. 17B*

| Time | A | B | SQ |
|---|---|---|---|
| 12:00 | 0 | 0 | 00 |
| 11:40 | 3 | 0 | 30 |
| 11:15 | 6 | 0 | 60 |
| 10:14 | 8 | 0 | 80 |
| 9:08 | 8 | 2 | 82 |
| 7:45 | 10 | 2 | 02 |
| 7:16 | 12 | 2 | 22 |

Fig. 18A

Team A

| Team B | | | |
|---|---|---|---|
| | 01 | 02 | 06 |
| | 30 | 82 | 02 |
| | 10 | 20 | 01 |

Fig. 18B

Team A

| Team B | | | |
|---|---|---|---|
| | 20 | 30 | 60 |
| | 02 | 22 | 02 |
| | 11 | 23 | 24 |

Fig. 18C

COMPUTER-IMPLEMENTED SYSTEMS AND METHODS FOR IMPLEMENTING MATRIX-BASED ONLINE GAMING

CROSS REFERENCE TO RELATED APPLICATION

This patent application claims the benefit of U.S. Provisional Application No. 63/373,819, filed on Aug. 29, 2022, entitled "COMPUTER-IMPLEMENTED SYSTEMS AND METHODS FOR IMPLEMENTING MATRIX-BASED ONLINE GAMING," which is incorporated herein by reference for its entirety.

TECHNICAL FIELD

The embodiments of the disclosure relate to online wagering games, casino-based wagering games, and computing systems for facilitating such games and, in particular, implementing a house-based game matrix associated with an event (e.g., sports game).

BACKGROUND

Bettors of different experience levels often participate in various types of wagering games and also place bets or wagers on various events including events and live events such as live sporting events. Some games are informally and manually administered such as with betting pools. Various entities have implemented online wagering, which has experienced substantial growth and popularity among wagerers.

A particular popular game played by sports fans for many years is commonly referred to as a Squares Game. The Squares Game is associated with a live sporting event such as a football game. The Squares Game is manually administered by an organizer in a time frame leading up to the live sporting event. The Squares Game includes a plurality of rows and a plurality of columns that form a plurality of cells. A first team is associated with a set of rows and a second team is associated with the set of columns. An organizer obtains users or players for the Squares Game by selling cells and collecting a set fee for each cell until all of the cells are filled with users or players. The user or player selects a cell and places their name in the cell.

The Squares Game has been successful in increasing interest in live sporting events as users have an opportunity to win money. User interest, nevertheless, is still relatively limited as there are no further engagement opportunities with the Squares Game itself. For example, users only engage with the Squares Game when purchasing a cell and then may not check the Squares Game until commencement of the football game or even after completion of the football game. This limited engagement does not maximize interest and excitement in the Squares Game and the football game. Organizing the Squares Game is also time consuming for the organizer. Attempts have been made to implement the Squares Game in an online gaming platform configuration in efforts to increase efficiencies and increase further interest from users. Such implementations, however, have been cumbersome and have not sufficiently maintained engagement with the users of the Squares Game before commencement of the football game and during the play of the football game.

In at least one embodiment, a game engine can generate several matrix games (e.g., several square games) associated with an event (e.g., sports game, lottery). For example, a qualification engine performed by a processor can determine that several players are qualified to play a game based on qualification criteria, these qualified players can place a wager on specific games via one or more APIs, a game engine performed by a processor can then generate square games for each period of a game (e.g., each quarter) for the players that placed a wager, where each square corresponds to a particular score or value associated with that game in that period (e.g., points per team in period, last digit of points per team in period, hits per team in the that period). In at least one embodiment, qualification criteria includes encrypted data related to a player's information (e.g., age, profile, betting behavior, account balance, loyalty score). In at least one embodiment, a qualification criteria is input into a neural network (e.g., convolution neural network) that outputs whether a player is qualified to play a game.

In at least one embodiment, a game engine can continuously generate different square games with different values for each square throughout the game. In at least one embodiment, a game engine can generate different square games every time a there is a change in a game (e.g., new period, new quarter, new pitcher, new umpire, new shot clock, new score), where square values can correspond to a value in the game (e.g., last digits of each teams' score). For these square games, the game engine can generate different square games where the different square games will have different gaming units (e.g., squares) with different probabilities of being a winning square. A game engine can vary statistics associated with each gaming unit depending on desired outcomes (e.g., more winners, more losers, statistics of game, profit margin goals, loyalty of customers).

Additionally, computing networks and computing devices that provide the Squares Game can be improved to reduce memory usage, provide results with low latency, provide live updates and game information with low latency, and process competing requests from multiple mobile devices on a network (e.g., wireless network).

SUMMARY

Consistent with disclosed embodiments, systems, devices, and methods for implementing a house-based game matrix associated with an event are disclosed. In at least one embodiment, an event includes a sporting event, competition, television show, lotteries, auctions, or other events that people can interact with or wager on. In at least one embodiment, a matrix game or matrix-based game includes a Squares game, where a Squares game includes tiles, cards, or squares that represent a result, score, or outcome of a game (e.g., a live sports game). Embodiments may include a server comprising one or more processing units. Embodiments may be configured for providing a house-based game matrix to a display device. The house-based game matrix may include a plurality of selectable gaming units.

Embodiments may be configured for receiving a selection of one or more of the plurality of selectable gaming units. Embodiments may generate two sets of event gaming numbers. The two sets of event gaming numbers may include a first set of event gaming numbers corresponding to a first dimension of the house-based game matrix and a second set of event gaming numbers corresponding to a second dimension of the house-based game matrix. Each selectable gaming unit may be associated with a first gaming number from the first set of event gaming numbers and a second gaming number from the second set of event gaming numbers. Each number in the first set of event gaming numbers may be different from each other. Each number in the second set of event gaming numbers may be different from each other.

Embodiments may be configured for monitoring a score of the event associated with the house-based game matrix. The score may include a first score number and a second score number. Embodiments may be configured for comparing, for a selected gaming unit made by the display device, the first score number with the first gaming number of the selected gaming unit and the second score number with the second gaming number of the selected gaming unit. Embodiments may be configured for providing a notification to the display device based on the comparison. In at least one embodiment, a game engine can generate a bingo version of a game, where a game in which players mark off scores, results, or totals (e.g., points, hits, ice time, penalties) as the numbers are drawn randomly by a game engine, the winner being the first person to mark off several numbers in a row (e.g., 4, 5, 6) or another required pattern.

In at least one embodiment, the disclosed embodiments solve a technical problem of computing live odds in a computing network that includes many (e.g., hundreds, thousands, or more) computing devices, each requesting information for different games at nearly the same time (e.g., simultaneously). In at least one embodiment, the disclosed embodiments include a technical solution such as an application programming interface (API), rewards system, game system, and/or user qualifying system that individually or in combination provide rewards, game updates, or other game information on a user interface (e.g., screen) in a way that is accurate and causes the user to be more engaged with a game or games. In at least one embodiment, a game engine can generate, using an API, a second game that is to be played simultaneously with an event. For example, a game engine can generate a second game corresponds to a bingo game, where the bingo game includes gaming units that correspond to an event (e.g., a football game is the event, and a bingo card game is played simultaneously with the football game based on statistics about the football game). In at least one embodiment, a game engine can generate a bingo game independently as a separate event, where said bingo game can be played before, during, or after an event to increase promotion of a gaming platform and increase user engagement, where such a game selects qualified users from an event based on a qualification engine and user data.

The foregoing and following examples are provided for the convenience of the reader to provide a basic understanding of such embodiments and does not wholly define the breadth of the present disclosure. Therefore, this summary is not an extensive overview of all contemplated embodiments and is intended to neither identify key or critical elements of all embodiments nor to delineate the scope of any or all aspects. Instead, its purpose is to present some concepts of one or more embodiments in a simplified form as a prelude to the more detailed description that is presented herein.

BRIEF DESCRIPTION OF THE DRAWINGS

FIGS. 17A and 17B are examples of quantifiable competition statistics for an event that includes probabilities of a gaming unit being a winning unit consistent with some embodiments of the present disclosure.

FIGS. 18A, 18B, and 18C are examples of a bingo game played in accordance consistent with some embodiments of the present disclosure.

DETAILED DESCRIPTION

Figure 1:
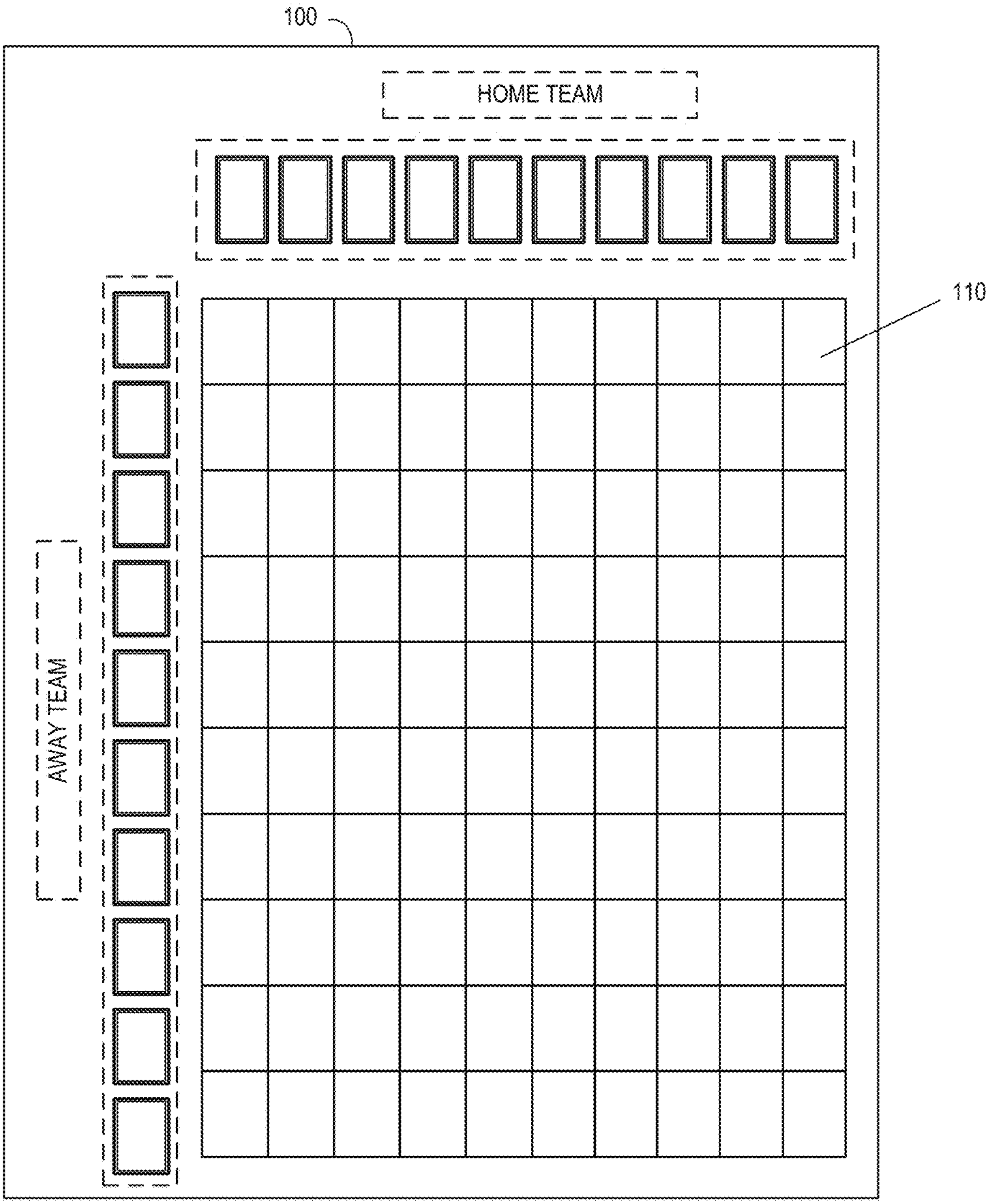
FIG. 1 illustrates an example game matrix, consistent with some embodiments of the present disclosure.

Example embodiments are described herein with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

With online casino gaming gaining greater acceptance, legalization, and popularity, online wagering has increased dramatically over the years. As many wagerers are familiar with matrix-based games, an online offering associated with a live event such as a live sporting event may be well-received. As stated above, the Squares Game has been successful in increasing interest in live sporting events as users have an opportunity to win money, although implementing an online version of the Squares Game has been cumbersome and has not sufficiently maintained engagement with the users of the Squares Game before commencement of the football game and during the play of the football game. For instance, in a conventional Squares Game, each cell or gaming unit within the matrix would need to be selected in order for the Squares Game to commence. In many instances, because the Squares Game did not get each gaming unit selected, the conventional Squares Game would then need to be cancelled and the participants would be disappointed, thereby leading to less interest in not only the football game but also the Squares Game. In at least one embodiment, a squares game is associated with an event that is not live or event that started and stopped several times (e.g., lottery, online video game competition).

The embodiments of the present disclosure seek to overcome certain limitations and other drawbacks of conventional systems, and to provide new features and new uses not heretofore available. The embodiments of the present disclosure solve a technical problem, e.g., providing live results and live betting to many (e.g., hundreds, thousands, or more) display devices in computer network, even though the odds and event information are frequently changing and there is limited bandwidth and memory to provide and store this information. The embodiments of the present disclosure include a technical solution that includes a server, systems, APIs, neural networks, and data structures that efficiently store data and respond to requests, even if the number of requests, memory required, or bandwidth required to provide information is high (e.g., many gigabytes, gigabytes per second). The embodiments of the present disclosure also enable a game within a game to be played on a single display unit. For example, a display can provide information about a current wager (e.g., a bet against a spread in a game) while also providing information about a square for a squares game. The embodiments of the present disclosure also include a qualification system, game engine, and awards system that are combined to efficiently generate selectable game units for a users or generate recommended gaming units based on statistical analysis of many games or historic information.

For example, the disclosed embodiments include systems, methods, and computer-readable medium for implementing a house-based game matrix associated with an event having quantifiable competition statistics (e.g., such as a score). FIG. 1 provides an example of an example house-based game matrix 100, consistent with embodiments of the present disclosure. In at least one embodiment, FIG. 1 provides a Squares game, where each gaming unit 110 includes a square that a player can win (if the player selected that square and/or a game engine provided it to the player). A player can have multiple gaming units 110, or several players can have the same gaming unit 110. In at least one embodiment, users can select specific gaming units 110. For example, a user can purchase a specific square in a squares game (e.g., by paying for it through an application programming interface). In at least one embodiment, all gaming units 110 (e.g., squares) cost the same amount and experience users would select the gaming units 110 that are more likely to win first. In another embodiment, all gaming units (e.g., squares) cost the same, but users would split the winning prize with all other users holding the same gaming unit 110 (e.g., square). In another embodiment, gaming units 110 have different prices and require higher or lower amounts to select based on how likely a particular square is to win (e.g., a 1-0 win in baseball is more likely than 10-1 baseball win).

An advantage of house-based game matrix 100 is that not each selectable gaming unit 110 of the matrix needs to be selected for the matrix game to commence. That is, house-based game matrix 100 may allow a single participant to select one or more available selectable gaming units 110, after which selectable gaming units 110 may be assigned values corresponding to the quantifiable competition statistics. While the quantifiable competition statistics may typically be the score of the game, these statistics may be something other than a score such as, among other things, the number of pitches in a baseball game, serves in a tennis match, or shots on goal in a hockey game. Examples of quantifiable competition statistics are disclosed in FIGS. 17A and 17B.

While the event is often a live sporting event such as football, it is understood that the event may be any event that lends itself to wagering. Disclosed embodiments may be played in association with other sporting events, including basketball, baseball, badminton, boxing, cricket, golf, handball, hockey, motorsports, swimming, table tennis, tennis, volleyball, and Formula 1 racing. Various computing environments and devices used in implementing such house-based game matrices will first be described followed by a description of house-based game matrices and supporting features to the house-based game matrices. It is understood that the examples may be implemented in online gaming configurations and also in casino-based configurations.

The house-based game matrix may be displayed electronically on user-controlled electronic devices (e.g., mobile electronic device). Users may select and purchase gaming units wherein event gaming numbers are generated and inserted into the house-based game matrix. Selections may be user defined or system defined. User-defined selections may include gaming units specifically selected by the user. System-defined selections may include gaming units identified by randomly assigned event gaming numbers. An online offering of the house-based game matrix may monitor the live event in real time wherein winners are determined at specified intervals including at the end of the live event. Winners are notified and predetermined prizes such as real-world currency may be delivered to the winning users. Example embodiments disclosed herein provide increased interest in the house-based game matrix and also the live event. In at least one embodiment, instead of a user selecting a gaming unit, a game engine or API provides a user with a randomly selected gaming unit if a user is qualified to receive “boosts” or “incentives” that cause a user to be more interested in following a game because they have received a gaming unit (e.g., without making an additional bet). The game engine or API can provide the gaming unit and cause a user’s mobile device to make a sound, modify its display (e.g., generate a notification or change outputs on a screen), or a combination thereof. In at least on embodiment, the disclosed technology includes a first API such as a representational state transfer (REST) that is called by a processor unit (e.g., CPU, GPU, or ASIC) that receives user information and provides it to a qualification engine, which determines whether a user is qualified to a play game. In at least on embodiment, the disclosed technology includes a second API such as another REST API that receives wagers, bets, or other betting selections or information from users related to a game. In at least one embodiment, the disclosed technology can include gRPC APIs, which when performed by a processor or processors enable game qualification and wagering. A first and second API allows game in one location on the internet to pass data to a distinct function in another program at another location on the internet for processing. In at least one embodiment, by using two different APIs, the disclosed system performs more efficiently because it requires less bandwidth for different operations and such APIs reduce latency as these are specific interfaces design to efficiently transport information from a gaming unit to a gaming system.

In some embodiments, the house-based game matrix may be used in combination with a qualification system. For example, a qualification system may be provided wherein users that meet a predetermined qualification criteria are approved to play in the house-based game matrix, which adds a sense of exclusivity to users. A qualification system can include a neural network that is configured to receive user information (e.g., name, gaming history, account information, identification, location) and output a qualification score. A qualification score can be a number that indicates whether a user is qualified to a play a particular game or all games available on a computing network. For example, a qualification score can be 50, where 50 is a threshold that indicates a user is qualified to play a game and receive rewards during that game, and a qualification score below 50 indicates a user is not qualified to a play a game. A neural network can include a convolutional neural network, a diffusion model, generative adversarial network, or a large language model. A neural network can be trained using labeled user profile information and expected qualification score values. The qualification system can also include receiving global position system (GPS) information from a display device and using that information to determine if a user is qualified to place a bet. For example, a gaming system can use geofencing to determine that user is inside of an area where it is legal to place wagers or outside of an area to place wagers.

In further example embodiments, bonus awards may be offered to users including at different stages of game implementation. A system of bonus gaming units, level systems, and boost tokens provides opportunities for users to increase chances to win and increase the amount of prize winnings. As describe further herein, various predetermined criteria may be developed to determine when users qualify or are eligible to receive such additional bonus awards.

Still further, example embodiments of the disclosed technology are adapted to maintain user interest in the house-based game matrix for longer periods of time. For instance, while a user may engage the house-based game matrix when initially purchasing and selecting a gaming unit, the systems and methods described herein provide additional features that provide opportunities for users to engage the house-based game matrix multiple times before commencement of the associated live event as well as during play of the live event.

The embodiments disclosed herein thus allow for prolonged house-based game matrix play and also present the user with unique house-based game matrix play experiences that generate further interest. The user thus may be incentivized to continue engaging with the house-based game matrix for longer periods of time, even after gaming units are initially purchased and selected. In at least one embodiment, a house-based game matrix includes a game with several users, where the “house” (e.g., casino, online provider, company, or other entity) is hosting the game for all users to play. In at least one embodiment, a house-based game matrix is a game that does not require all squares in a game to be selected to start or play the game, rather, the house (e.g., game engine, online host, provider) is offering the game is all users that are qualified and willing to play. In at least one embodiment, a game engine can generate several matrix games (e.g., several square games) associated with an event (e.g., sports game, lottery). For example, a qualification engine performed by a processor can determine that several players are qualified to play a game based on qualification criteria, these qualified players can place a wager on specific games via one or more APIs, a game engine performed by a processor can then generate square games for each period of a game (e.g., each quarter) for the players that placed a wager, where each square corresponds to a particular score or value associated with that game in that period (e.g., points per team in period, last digit of points per team in period, hits per team in the that period). In at least one embodiment, a game engine can continuously generate different square games with different values for each square throughout the game. In at least one embodiment, a game engine can generate different square games every time a there is a change in a game (e.g., new period, new quarter, new pitcher, new umpire, new shot clock, new score), where square values can correspond to a value in the game (e.g., last digits of each teams' score). For these square games, the game engine can generate different square games where the different square games will have different gaming units (e.g., squares) with different probabilities of being a winning square. A game engine can vary statistics associated with each gaming unit depending on desired outcomes (e.g., more winners, more losers, statistics of game, profit margin goals, loyalty of customers).

Figure 2:
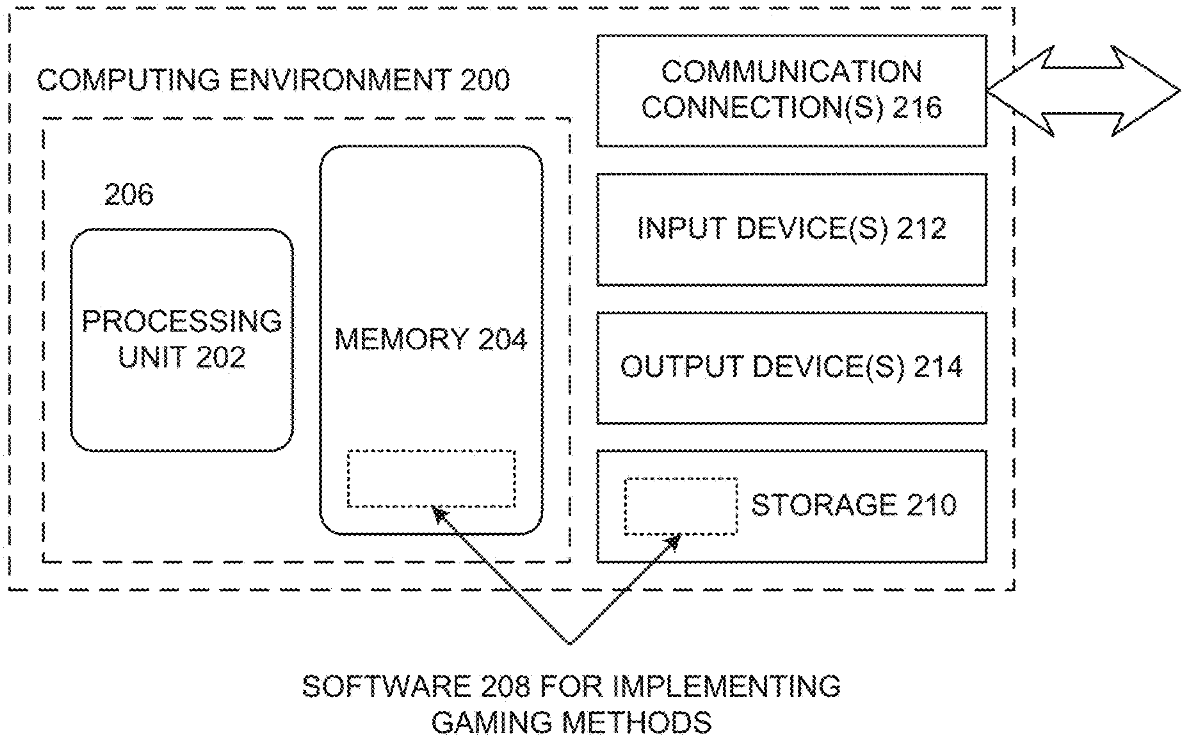
FIG. 2 illustrates a block diagram disclosing an example computing environment in which aspects of the disclosed technology may be performed, consistent with some embodiments of the present disclosure.

FIG. 2 illustrates an example of suitable computing environment 200 with which embodiments of the disclosed technology may be implemented. For example, computing environment 200 can be used to generate house-based game matrix 100 as shown in FIG. 1. Computing environment 200 is not intended to suggest any limitation as to the scope of use or functionality of the disclosed technology, as the techniques and tools described herein may be implemented in diverse general-purpose or special-purpose environments that have computing hardware.

With further reference to FIG. 2, computing environment 200 may include configuration 206 that comprises at least one processing unit 202 and memory 204. Computing environment 200 may be any commercially available computer, including desktop computers, laptop computers, servers, mobile phones, smart phones, tablet computers, netbooks, wearable computers (such as smart watches), or other devices that include computing hardware.

At least one processing unit 202 may execute computer-executable instructions. In a multi-processing system, multiple processing units may execute computer-executable instructions to increase processing power. At least one processing unit 202 may constitute any physical device or group of devices having electric circuitry that performs a logic operation on an input or inputs. For example, at least one processing unit 202 may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processing unit 202, for example, may be pre-loaded into a memory integrated with or embedded into the controller or may be stored in a separate memory. In some embodiments, at least one processing unit 202 may include more than one processing unit. Each processing unit may have a similar construction, or the processing units may be of differing constructions that are electrically connected or disconnected from each other. For example, at least one processing unit 202 may be separate circuits or integrated in a single circuit. When more than one processing unit is used, the processing units may be configured to operate independently or collaboratively. At least one processing unit 202 may be coupled electrically, magnetically, optically, acoustically, mechanically, or by other means that permit them to interact. In at least one embodiment, processing unit 202 can use APIs to perform operations or receive information to enable a user to play a game, multiple games, or qualify for a game.

Memory 204 may be volatile memory (e.g., registers, cache, RAM), non-volatile memory (e.g., ROM, EEPROM, flash memory), or some combination of the two. Memory 204 stores software 208 for implementing one or more of the described embodiments. For example, memory 204 may store software 208 for implementing any of the disclosed techniques described herein and their accompanying user interfaces. Memory 204 may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. Memory 204 may include one or more separate storage devices collocated or disbursed, capable of storing data structures, instructions, or any other data. Memory 204 may further include a memory portion containing instructions for the processor to execute. Memory 204 may also be used as a working memory device for the processors or as a temporary storage. Memory 204 can store APIs to perform one or more games.

In some embodiments, memory 204 can be a non-transitory computer readable medium containing instructions that when executed by at least one processing unit (e.g., processing unit 202) of computing environment 200, cause the computing environment 200 to perform a method or set of operations. Non-transitory computer readable mediums may be any medium capable of storing data in any memory in a way that may be read by any computing device with a processor to carry out methods or any other instructions stored in the memory. The non-transitory computer readable medium may be implemented to include any combination of software, firmware, and hardware. Software may preferably be implemented as an application program tangibly embodied on a program storage unit or computer readable medium consisting of parts, or of certain devices or a combination of devices. The application program may be uploaded to, and executed by, a machine comprising any suitable architecture. In at least one embodiment, a non-transitory computer readable medium includes a software program that includes instructions to perform operations that cause a computer or process to generate control signals or perform operations.

Computing environment 200 may also include an operating system and microinstruction code. The various processes and functions described in this disclosure may be either part of the microinstruction code or part of the application program, or any combination thereof, which may be executed by one or more processing units 202. In addition, various other peripheral units may be connected to the computer platform such as an additional data storage unit and a printing unit. Furthermore, a non-transitory computer readable medium may be any computer readable medium except for a transitory propagating signal.

Any of the computer-executable instructions stored in computing environment 200 for implementing the disclosed techniques as well as any data created and used during implementation of the disclosed embodiments may be stored on one or more computer-readable media (e.g., non-transitory computer-readable media). The computer-executable instructions may be part of, for example, a dedicated software application or a software application that is accessed or downloaded via a web browser or other software application (such as a remote computing application or gaming app). Such software may be executed, for example, on a single local computer or in a network environment (e.g., via the internet, a wide-area network, a local-area network, a client-server network (such as a cloud computing network), or other such network) using one or more network computers. For example, a gaming app may be downloaded to a mobile device (such as a mobile phone, smart phone, tablet computer, or wearable computer) from an "app store" and installed locally on the computing environment 200. The gaming app may be configured to interact with a gaming platform server or a remote game server in order to exchange game play or account information and may be configured to implement the gaming platform or games locally or by interfacing with the gaming platform or remote game server during game play in order to provide the gaming platform and game play experience. The gaming embodiments disclosed herein may also be provided through an app hosted by a social media provider. Further, the embodiments of the disclosed technology may also be implemented through software that provides a browser-based gaming experience (e.g., through a dedicated website or through a website hosted by a social media provider).

Computing environment 200 may include additional features. For example, computing environment 200 may include storage 210, one or more input devices 212, one or more output devices 214, and one or more communication connections 216 for communicating with any remote devices/services. An interconnection mechanism (not shown) such as a bus, controller, or network interconnects the components of computing environment 200. Typically, operating system software (not shown) provides an operating environment for other software executing in computing environment 200, and coordinates activities of the components of computing environment 200.

Storage 210 may be removable or non-removable and may include any tangible non-transitory nonvolatile memory or storage medium which may be used to store information and which may be accessed within computing environment 200. Storage 210 may also store instructions for software 208 implementing any of the described techniques, systems, or environments and may act as a non-transitory computer-readable medium described above.

Input device(s) 212 may be a touch input device such as a keyboard, touchscreen, mouse, pen, virtual reality device (e.g., headset or glasses), trackball, a voice input device, a scanning device, or another device that provides input to computing environment 200. Output device(s) 214 may be a display device (e.g., a computer monitor, smartphone display, tablet display, netbook display, or touchscreen), printer, speaker, CD-writer, or another device that provides output from computing environment 200.

One or more communication connection(s) 216 may enable communication over a communication medium to another computing entity. The communication medium may convey information such as computer-executable instructions or other data in a modulated data signal. A modulated data signal may be a signal wherein one or more of its characteristics are set or changed in such a manner as to encode information in the signal. By way of example, communication media may include wired or wireless techniques implemented with an electrical, optical, RF, infrared, acoustic, or other carrier. One or more communication connection(s) 216 may include hardware for implementation of such communications (e.g., a suitable network card, wireless transceiver, and the like).

As noted, the various methods may be described in the general context of computer-readable instructions stored on one or more computer-readable media. Computer-readable media are any available media that may be accessed within or by computing environment 200.

Figure 3:
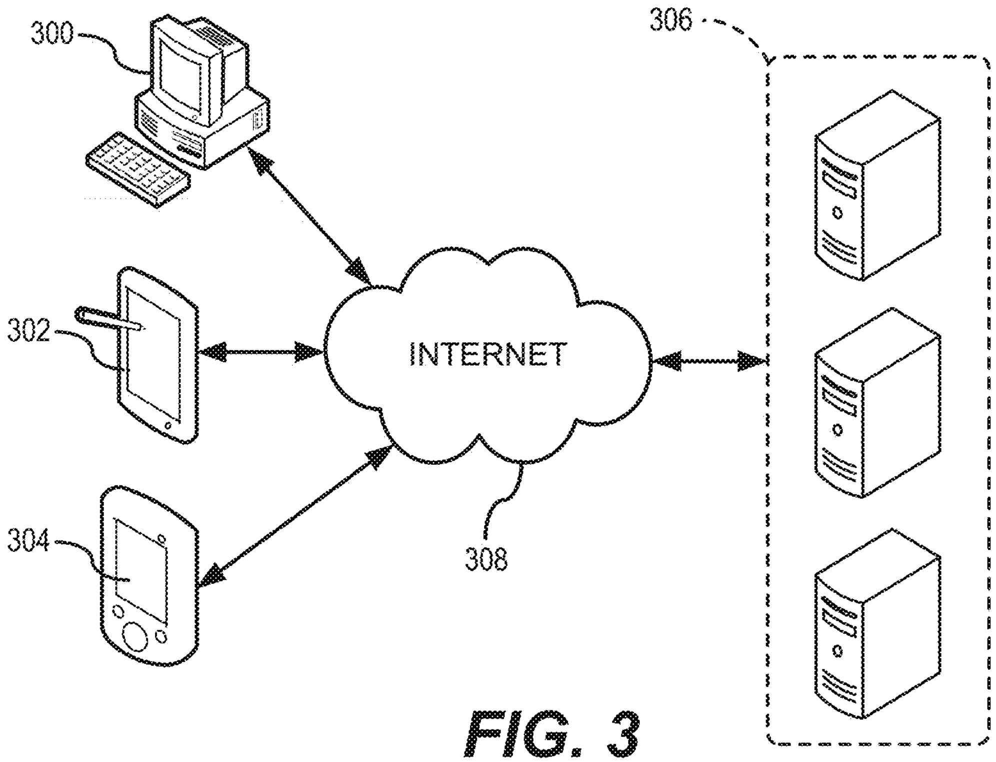
FIG. 3 illustrates a block diagram disclosing a first example network environment in which aspects of the disclosed technology may be performed, consistent with some embodiments of the present disclosure.

An example of a possible network topology (e.g., a client-server network, an internet-connected network, or cloud-based network) for implementing an embodiment according to the disclosed technology is illustrated in FIG. 3. Networked computing devices (e.g., desktop computer 300, tablet computer 302, smartphone 304, any or all of which can implement computing environment 200 of FIG. 2) may be, for example, computers running a browser, plug-in, or other software that communicates with one or more internet gaming platform computers 306 (e.g., one or more servers in a cloud computing environment or one or more dedicated servers) via a network 308 (e.g., a network that at least partially includes the internet, as illustrated, or other network, such as a LAN). Consistent with the present disclosure, some implementations may involve network 308. Network 308 may constitute any combination or type of physical or wireless computer networking arrangement used to exchange data. For example, network 308 may be the Internet, a private data network, a virtual private network using a public network, a Wi-Fi network, a mesh network, a local area network (LAN), a wide area network (WAN), or other suitable connections and combinations that may enable information exchange among various components of the system. In some implementations, network 308 may include one or more physical links used to exchange data, such as Ethernet, coaxial cables, twisted pair cables, fiber optics, or any other suitable physical medium for exchanging data. Network 308 may also include a public, wired network or a wireless cellular network. Network 308 may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data or information between separate entities.

One or more internet gaming platform computers 306 may include a server configured to provide the gaming platform, a separate server configured to host and facilitate game play of one or more games, or a separate server configured to handle user payment and credit card information and to comply with any applicable payment card security standards (e.g., PCI security standards). Any of these services may alternatively be provided by a single server. Further, the servers may be virtual servers configured to easily migrate, install, and co-exist on the underlying server hardware.

Computing devices 300, 302, 304 and one or more internet gaming platform computers 306 may have computer architectures as shown in FIG. 2 and discussed above. Computing devices 300, 302, 304 are not limited to traditional personal computers but may include other computing hardware configured to connect to and communicate with network 308 (e.g., smart phones (such as smart phone 304), tablets (such as tablet 302), or other mobile computing devices, servers, network devices, dedicated devices, and the like).

In the illustrated embodiment, computing devices 300, 302, 304 may be configured to communicate with one or more internet gaming platform computers 306 via network 308 (e.g., a network that at least partially includes the internet). In certain implementations, one or more internet gaming platform computers 306 may execute software for performing any of the disclosed low-denomination gaming methods (e.g., any of the gaming selection or lobby functions or game play functions or features). In some embodiments, the interface provided to the user through which the user may select a game or denomination is referred to as a gaming "lobby" or gaming "room." One or more internet gaming platform computers 306 may transmit data to and receive data from any of computing devices 300, 302, 304 in order to implement the disclosed game lobby functionalities and games (e.g., to transmit game play data or game play data converted to show real-money game information to the computing devices as well to receive user selections made by the user of the computing devices (such as a selected wager amount, selected gaming units, selected bets, other selections made during a game feature, and other such user-inputted information commonly used in wager-based games)). In some example embodiments, executable code may be downloaded from one or more internet gaming platform computers 306 to implement the gaming lobby and games locally on computing devices 300, 302, 304; or, alternatively, data for rendering (or pre-rendered data for) user interfaces or other displays may be sent from one or more internet gaming platform computers 306 to computing devices 300, 302, and 304 (in other words, the game lobby and games are executed by one or more internet gaming platform computers 306, but image content data for displaying the game and lobby to the player (e.g., in real-time or substantially real-time) may be sent to computing devices 300, 302, 304).

Figure 4:
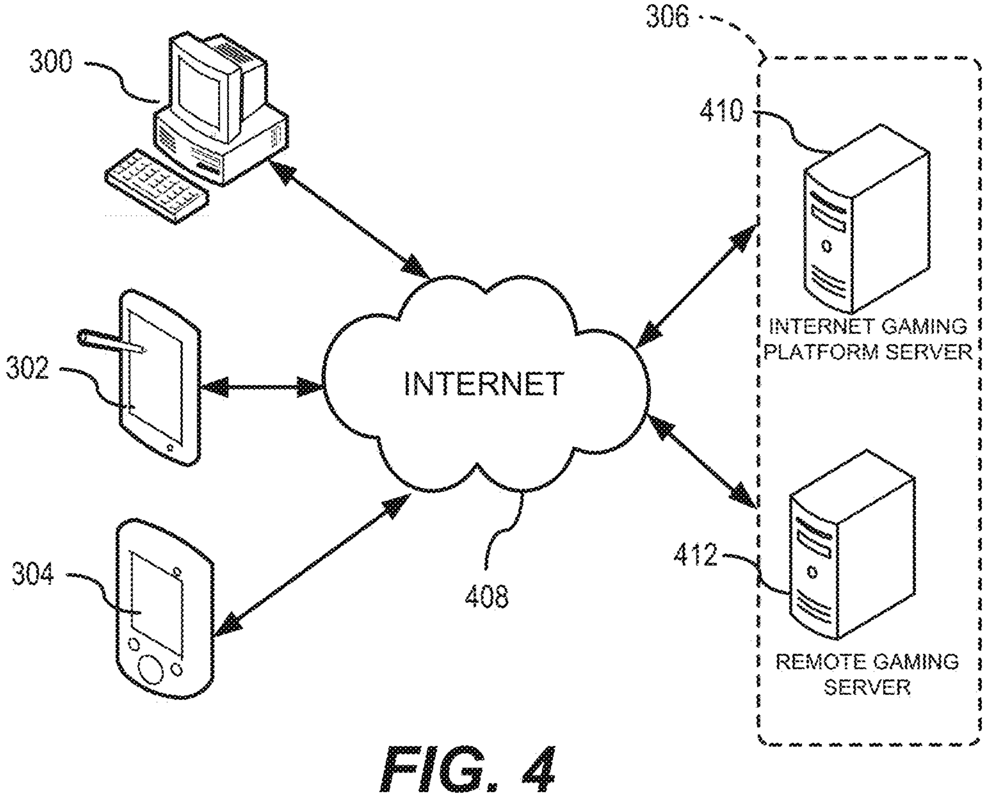
FIG. 4 illustrates a block diagram disclosing an example framework for implementing embodiments of the disclosed technology, consistent with some embodiments of the present disclosure.

In FIG. 3, one or more internet gaming platform computers 306 may be controlled by an internet gaming platform operator and may include the game servers that facilitate game play with a user/player. Another example of a possible network topology for implementing a system according to the disclosed technology is illustrated in FIG. 4. As shown in FIG. 4, one or more internet gaming platform computers 306 may include internet gaming platform server 410 and remote gaming server 412. Remote gaming server 412 may facilitate game play with a player and may be separate from internet gaming platform server 410. Remote gaming server 412 and internet gaming platform server 410 may be operated by different entities. For example, one or more internet gaming platform computers 306 may be remote gaming server 412 that may be controlled and operated by a third-party game vendor. In at least one embodiment, gaming platform computers 306 can perform APIs that enable communication of game information to computing devices 300, 302, 304.

As further shown in FIG. 4, computing devices 300, 302, 304 may be, for example, computers running a browser or other software connected to network 408 (e.g., a network that at least partially includes the internet, as illustrated, or other network, such as a LAN). As above, computing devices 300, 302, 304 as well as internet gaming platform server 410 and remote game server 412 may have computer architectures as shown in FIG. 2 and discussed above. Computing devices 300, 302, 304 are not limited to traditional personal computers but may comprise other computing hardware configured to connect to and communicate with network 408 (e.g., smart phones (such as smart phone 304), tablets (such as tablet 302), or other mobile computing devices, servers, network devices, dedicated devices, and the like).

In the illustrated embodiment, computing devices 300, 302, 304 may be configured to communicate with internet gaming platform server 410 or remote game server 412 via network 408. In particular embodiments, computing devices 300, 302, 304 may be internet gaming platform server 410 configured to implement a gaming platform that allows a respective user of computing devices 300, 302, 304 to select a desired game to play or related selections for wagers made in the game. As more fully explained below, internet gaming platform server 410 may be used to facilitate house-based game matrices and related features disclosed herein.

In some embodiments, computing devices 300, 302, 304 may be configured to communicate with a separate server (not shown) configured to handle user payment and credit card information, or other account information, and to comply with any applicable payment card security standards (e.g., PCI security standards). In other embodiments, however, the user payment and credit card information may be maintained in the same server as the internet gaming platform server.

Further, in certain embodiments of the illustrated architecture, computing devices 300, 302, 304 and remote gaming server 412 may be configured to communicate with each other (e.g., via one or more APIs that specify a communication protocol between computing devices 300, 302, 304) and facilitate game play for a user. In the illustrated embodiment, one or more internet gaming platform computers 306 may be internet gaming platform server 410 and remote gaming server 412 configured to provide one or more games for play at computing devices 300, 302, 304. Remote gaming server 412 may be a remote game server operated by a third-party game vendor.

In certain embodiments, after a game is selected, computing devices 300, 302, 304 may be configured to communicate with one or more internet gaming platform computers 306 configured to implement the desired game selected by the user. For instance, in some implementations, computing devices 300, 302, 304 communicate only with one or more internet gaming platform computers 306 during game play, e.g., to receive game play data from one or more internet gaming platform computers 306 at computing devices 300, 302, 304 as well to receive user selections from the user of any of computing devices 300, 302, 304 (e.g., a selected gaming unit, a selected wager amount, selected paylines, selected bets per payline, selections made during a game feature, and other such user-inputted information commonly used in wager-based games) at computing devices 300, 302, 304. In other implementations, computing devices 300, 302, 304 may communicate with one or more internet gaming platform computers 306 as well as internet gaming platform server 410 during game play (e.g., to receive game play data from one or more internet gaming platform computers 306 and converted game play data to show real-money game information from internet gaming platform server 410 at computing devices 300, 302, 304, as well to receive user selections made by the user of computing devices 300, 302, 304 (e.g., a selected gaming unit, a selected wager amount, selected paylines, selected bets per payline, selections made during a game feature, and other such user-inputted information commonly used in wager-based games)) at internet gaming platform server 410 or remote gaming server 412.

In still other implementations, computing devices 300, 302, 304 may communicate only with internet gaming platform server 410 during game play (e.g., to receive game play data converted to show real-money game information from one or more internet gaming platform computers 306 at computing devices 300, 302, 304 as well to receive user selections from the user of any of computing devices 300, 302, 304 (e.g., a selected gaming unit, a selected wager amount, selected paylines, selected bets per payline, selections made during a game feature, and other such user-inputted information commonly used in wager-based games)) at internet gaming platform server 410. This situation may arise, for example, for configurations in which remote gaming server 412 passes game play information to the internet gaming platform server 410, which then supplements the game play information and transmits a modified version of the data to computing devices 300, 302, 304 as discussed more fully below.

In general, one or more internet gaming platform computers 306 may transmit data to any of computing devices 300, 302, 304 for implementing the disclosed gaming platform functionalities or game play functionalities. For instance, executable code may be downloaded from one or more internet gaming platform computers 306 to locally implement the gaming methods on computing devices 300, 302, 304; or, alternatively, data for rendering (or pre-rendered data for) user interfaces (e.g., game play displays that allow for user input) or other displays may be sent from any of one or more internet gaming platform computers 306 to computing devices 300, 302, 304 (for instance, in certain embodiments, the game lobby (or game room) functionalities are executed by internet gaming platform server 410 and the selected game is executed by remote gaming server 412, and image content data for displaying the game lobby (or game room) functionalities as well as the game play functionalities are sent to computing devices 300, 302, 304 from one or more internet gaming platform computers 306).

In the illustrated embodiments, networks 408 may be implemented at least in part using the internet or a similar public network and operated using an appropriate protocol (e.g., the HTTP protocol). Illustrated networks 408 may also include a Local Area Network ("LAN") using wired networking (e.g., the Ethernet IEEE standard 802.3 or other appropriate standard) or wireless networking (e.g., one of the IEEE standards 802.11a, 802.11b, 802.11g, or 802.11n, which are commonly used for Wi-Fi networks, or other appropriate standard). Further, data transmitted through networks 408 to or from any of the devices or servers may be transmitted using a secure sockets layer ("SSL") connection.

Figure 5:
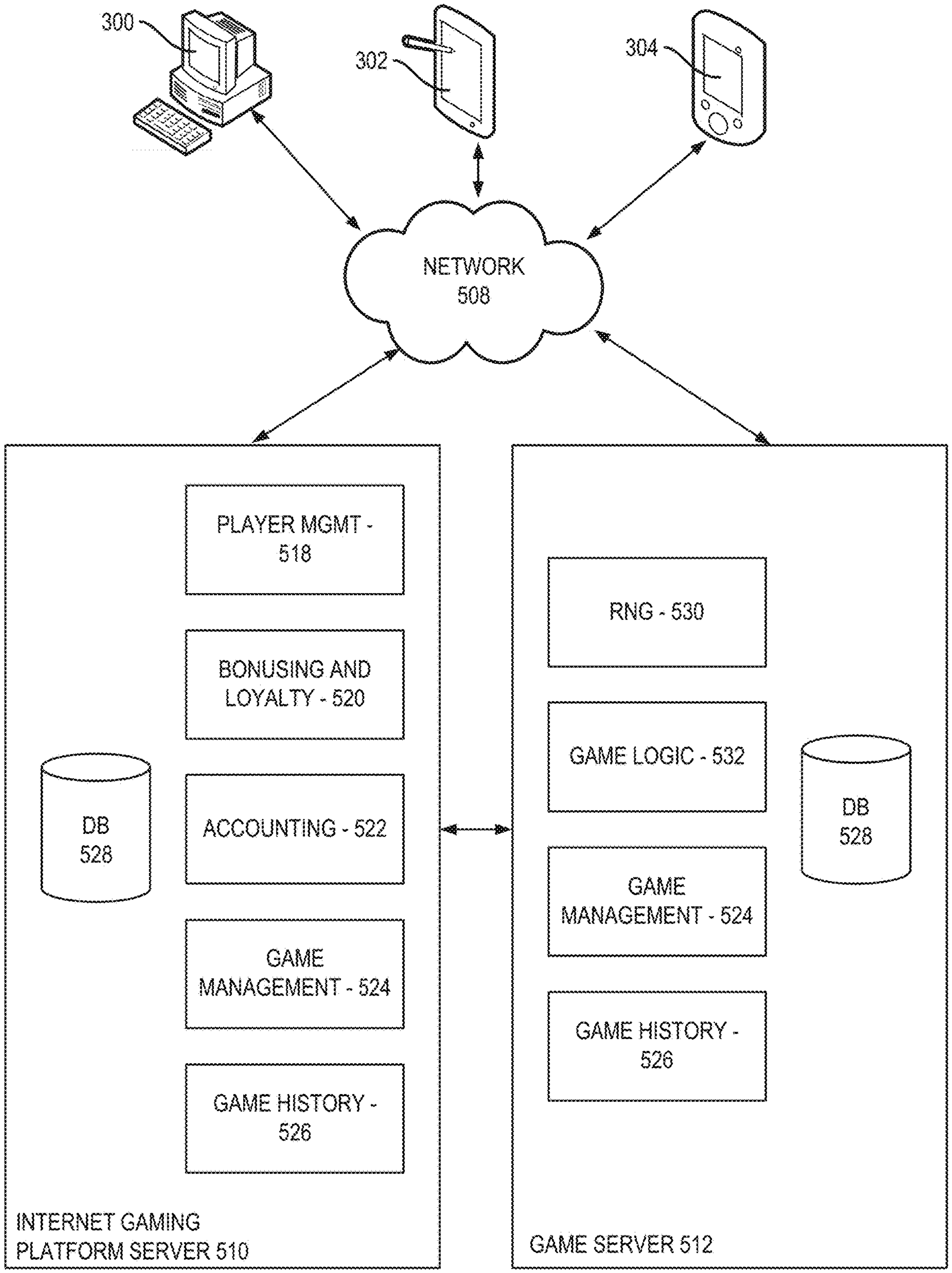
FIG. 5 illustrates a block diagram disclosing components of an example internet gaming platform and remote game server as disclosed in FIG. 4, consistent with some embodiments of the present disclosure.

FIG. 5 is a schematic block diagram illustrating various components of example internet gaming platform server 510 and game server 512 (which can correspond to internet gaming platform server 410 and remote game server 412, respectively). The various components are by way of example only and not to be construed as limiting. Instead, any of the components may be used alone or in any combination or subcombination with one another, as well as with other components. Further, in other embodiments, one or more components from internet gaming platform server 510 may be implemented in game server 512 and vice versa. Internet gaming platform server 510 and game server 512 may have computer architectures as shown in FIG. 2 and discussed above.

In the illustrated embodiment, internet gaming platform server 510 and game server 512 may be configured to communicate with any of computing devices 300, 302, 304 (e.g., using an SSL connection) or other computing devices via network 508, which may be at least partially implemented by a public network such as the internet. (References to "internet gaming platform server" 510 in this description have been used for convenience but should be construed as being equally applicable to remote gaming server 412 which uses a different type of network.) Computing devices may be, for example, any of desktop computer 300, tablet device 302, or smart phone 304, operated by a user (e.g., player) but may also be any other computing device with access to the network. Internet gaming platform server 510 and game server 512 may also be configured to communicate with each other (e.g., via one or more APIs) for internet gaming platform server 510 and game server 512, respectively). This inter-server communication may also be through a public network (such as the internet) or through a dedicated network (e.g., a LAN). In some embodiments, game server 512 may be remote gaming server 412 operated by a third-party vendor (entity) different from the operator of the internet gaming platform server 510 and may communicate with internet gaming platform server 510 over the internet. Still further, in certain embodiments, any one or more of the components of internet gaming platform server 510 and game server 512 may be implemented as part of a single server.

In the illustrated embodiment, internet gaming platform server 510 may be configured to facilitate game play for a player (e.g., operating any computing devices 300, 302, 304) by coordinating access to games on one or more game servers, such as game server 512, controlling wagering options (e.g., according to any of the embodiments disclosed below), and managing player account activities. Internet gaming platform server 510 may comprise a variety of components (e.g., implemented as one or more software modules) for providing the gaming platform functionalities. For instance, in the illustrated embodiments, internet gaming platform server 510 may comprise player management component 518, bonusing and loyalty component 520, accounting component 522, game management component 524, or game history component 526, any one or more of which may be configured to store or retrieve data from platform database 528.

Player management component 518 may be configured to perform player registration, player verification, and player profile maintenance operations. Bonusing and loyalty component 520 may be configured to maintain a player's loyalty program data including level progressions as described herein, and provide awards or incentives to the player according to the rules of the loyalty program. Bonusing and loyalty component 520 may also be configured to store and provide bonuses to players in accordance with any bonus offers provided through the system (e.g., bonus amounts added to a player's account upon registration, upon deposit of a certain amount of money, upon game play during certain "happy hour" times, awards relating to matrix-based games or levels progressions as described herein, etc.).

Accounting component 522 may maintain a player's account information and may, in some embodiments, interact with another server storing a player's personal payment card information. Accounting component 522 may also include a module for handling withdrawals or deposits of funds such as prize payouts in real-world currency (e.g., by interfacing with a player's bank account or credit card company). Further, when a game is selected for play by a user, accounting component 522 may be configured to provide a total account balance for use during game play of the selected game (which is sometimes referred to as a seamless wallet approach), or provide a portion of the total balance (which may be selected by the user) which is provided as a separate account balance for use during game play of the selected game.

Game management component 524 may be configured to store a list of games supported by the platform and to launch and appropriately configure the games upon selection by a user. In some implementations, game management component 524 may also provide web-hosting or other services that provide an interface to the player (e.g., a game lobby), or provide a downloadable application that provides the interface to the player. For instance, game management component 524 may provide a browser-based gaming experience (e.g., through a dedicated website or through a website hosted by a social media provider) or provide the game-play experience via a downloadable app with which game management component 524 may interface during game lobby operations or game play. In other implementations, the website or app providing the game lobby to the user is separate from internet gaming platform server 510 and game management component 524 (e.g., as part of a separate layer that interfaces with the platform). Game management component 524 may also be configured to interact with and facilitate game play with game server 512. For example, game management component 524 may include a messaging module for interfacing with game server 512 via an API. For instance, in some cases, game management component 524 may receive, from a remote user, a selection of a game available on game server 512 and launch the game (e.g., by interfacing with game server 512 through an API to start the game and exchange the desired information (such as player identification and available balance (or credits) for game play)). In some embodiments, game server 512 then interfaces directly with the remote user to provide the game play experience. In such embodiments, game server 512 may operate to provide game play information to internet gaming platform server 510 as game play progresses (e.g., on a game-by-basis, including wager selection and in-game (e.g., game feature) activity) or after a game play session of multiple games is complete (e.g., upon a user selecting to exit a game). In other embodiments, game server 512 may transmit information to internet gaming platform server 510, which interfaces with the remote user to provide the game play experience. For instance, in one example implementation, game management component 524 may receive game play information (e.g., data indicating the outcome of a game as determined by random number generator (RNG) component 530 and game logic 532) or game play image data from remote game server 512, and cause the display of real-money statistics together with the game play for the wager-based game on a display device of a remote computing device operated by the remote user. This may be performed, for example, by rendering the display screen at internet gaming platform server 510 (using, for instance, game management component 524) and transmitting image content data for the rendered image to the remote device. Or, data regarding the real-money statistics, game play, or game play images (e.g., data indicating the outcome of a game or other associated image content data) may be transmitted to the remote device for local rendering at the remote user's device. In some implementations, internet gaming platform server 510 may be configured to receive game play or other game play image content data from game server 512, process such data (e.g., to provide the simultaneous display of the real-money statistics with the game play), and transmit data (e.g., image content data) for causing the desired display on the remote device. In still other embodiments, both game server 512 and internet gaming platform server 510 interface with the remote user during game play to provide the game play experience. For instance, data may be sent from both internet gaming platform server 510 and game server 512 to the remote user's device to produce the desired display. Further, game management component 524 may communicate with accounting component 522 to obtain player account information during game launch or to update the player account information during game play (e.g., tracking bonus awards and levels progressions) or upon completion of a game play session (after performing any conversion to account for bonus awards and wins) so that accounting component 522 may maintain accurate account information for a player.

Game history component 526 may be configured to maintain and store a player's game play history for accounting or compliance purposes. It is to be understood that the components and functionalities described above are by way of example and not limitation. Any of the functionalities may be performed by other components in internet gaming platform server 510 or even by other components that interface with internet gaming platform server 510. For example, certain desired techniques and functions described herein may be performed by accounting module 522 instead of game management module 524.

Remote game server 512 in FIG. 5 may comprise RNG component 530, game logic component 532, game management component 524, or game history component 526, any one or more of which may be configured to store or retrieve data from remote game server database 528.

RNG component 530 may comprise one or more random number generator modules that provide random numbers to game logic for purposes of facilitating game play, such as for providing sets of event gaming numbers. Random number generator component 530 may comprise, for example, a module that has been approved by a gaming authority in one or more jurisdictions.

Game logic component 532 may be configured to provide the actual game play for a game selected for play by a player and include the game assets (e.g., game graphic and animation data, game audio data, reel strip data, game feature data, paytable data, and other such game play data). Game management component 524 may be configured to interact with and facilitate game play with internet gaming platform server 510 (e.g., by receiving a game request for a player along with game configuration information, and facilitating the local launch and delivery of the game to the player from the game server). For instance, game management component 524 may include a messaging module for interfacing with internet gaming platform server 510 via the platform's or the game server's API. In some cases, each game module in game server 512 may have its own (potentially unique) game-specific API or control mechanism, in which case game management component 524 may also interface with the game-specific API or game control mechanism (e.g., after performing any necessary translation or data formatting) to facilitate the communication between internet gaming platform server 510 and the game module. Further, for embodiments in which game server 512 at least partially interfaces directly with the remote user's device, game management component 524 may include a module for facilitating such communication. Further, game management component 524 may include a module for performing player authentication operations or in-game funds handlings.

Game history component 526 may be configured to maintain and store a player's game play history for accounting or compliance purposes. It is to be understood that the components and functionalities described above are by way of example and not limitation. Any of the functionalities may be performed by other components in gamer server 512 or even by other components that interface with game server 512.

In the example description above, support for bonus awards may be provided by the gaming platform (e.g., by internet gaming platform server 510). It is to be understood that support for bonus awards may also be provided by one or more components or modules within game server 512. For instance, game server 512 may have a component (e.g., game management component 524) that may provide for bonus awards according to any of the disclosed bonus award types or display techniques described herein.

For any of internet gaming platform server 510 and game server 512 embodiments described above or elsewhere herein, it is to be understood that the precise character and content of the data transmitted between internet gaming platform server 510 and game server 512 as well as to and from computing devices 300, 302, 304, will vary depending on the implementation. For example, in some embodiments, computing devices 300, 302, 304 may operate as remote game clients and download some code and game assets for local execution and use during play of a particular game. The game code may include code for rendering the game display (including any of the modified displays disclosed herein) in response to receipt of certain information from internet gaming platform server 510 or game server 512 (e.g., game play information that includes game outcome data and converted gaming statistics data). The game code may also include code for determining and sending user requests to internet gaming platform server 510 or game server 512 (e.g., data concerning a player's desired wager, paylines, bets per payline, selections during a game feature, bonus applications or any other user input used during game play). For instance, in some particular implementations, any of computing devices 300, 302, 304 may have at least some of the image asset or reel strip data for a game downloaded locally so that it may locally render an image of the game results using a relatively small set of image content data sent by internet gaming platform server 510 or game server 512. In these implementations, RNG component 530, paytable data, and win determination logic are typically performed by game server 512 (e.g., for regulatory purposes). The image content data used for local rendering in such implementations may comprise game play information that includes game outcome data, such as the random numbers determined from RNG component 530, the amount of a win determined from the paytable, or the account balance after a win. The image content data may also include information that originated from any of computing devices 300, 302, 304 (e.g., the number of paylines bet, the amount bet per payline, or the total amount bet) via user selection but which, in some examples, is processed, accepted, and passed back to computing devices 300, 302, 304 by internet gaming platform server 510 or game server 512 (e.g., as part of game play information).

In some embodiments, the exchange of data between internet gaming platform server 510, game server 512, or computing devices 300, 302, 304 may be performed substantially continuously. Therefore, the user may view any modified or supplemental data regarding gameplay in real-time or substantially real-time.

A variety of suitable gaming platforms may be used or adapted to implement the embodiments of the disclosed technology. Online gaming platforms or game servers provided by, for example, NYX Gaming Group, Playtech, or Amaya, among others, may be adapted for use with the disclosed technology.

Figure 6:
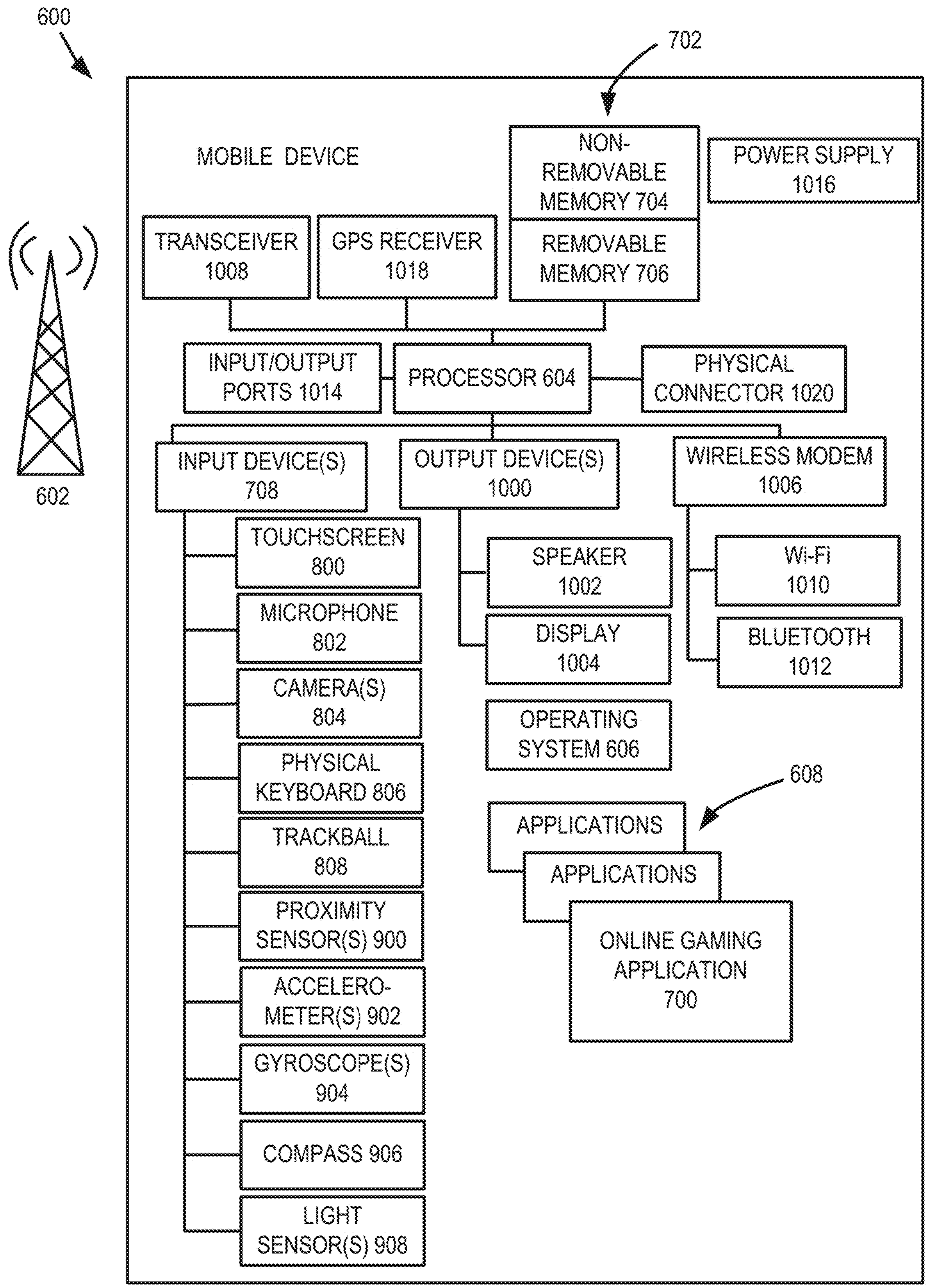
FIG. 6 illustrates a schematic block diagram of an example mobile device environment in which embodiments of the disclosed technology may be consistent with some embodiments of the present disclosure.

As noted, internet gaming platform server 510 or game server 512, may communicate and facilitate game play on a mobile device with which internet gaming platform server 510 or game server 512 communicate. FIG. 6 illustrates a schematic block diagram depicting a detailed example of a mobile computing device 600 capable of implementing embodiments of the disclosed technology (e.g., capable of displaying and providing interaction mechanisms for use with embodiments of the disclosed online gaming methods and systems (e.g., via communication with a gaming platform server/game server (via a website or application) as disclosed herein)). Mobile computing device 600 may include a variety of optional hardware and software components. In general, a component in mobile computing device 600 may communicate with any other component of mobile computing device 600, although not all connections are shown, for ease of illustration. Mobile computing device 600 may be any of a variety of computing devices (e.g., a cell phone, smartphone, handheld computer, laptop computer, notebook computer, tablet computer, media player, PDA, or other such mobile devices) and may allow wireless two-way communications with one or more mobile communications networks, such as a Wi-Fi, cellular, or satellite network.

Mobile computing device 600 may include a controller or processor 604 (e.g., signal processor, microprocessor, ASIC, or other control and processing logic circuitry) for performing such tasks as signal coding, data processing, input/output processing, power control, or other functions. Processor 604 may be at least one processing unit 204. Operating system 606 controls the allocation and usage of the components and support for one or more application programs 608, such as online gaming application 700 that may implement one or more of the innovative features described herein. One or more application programs 608 may further include common mobile computing applications (e.g., telephony applications, email applications, calendars, contact managers, web browsers, social network applications, messaging applications), or any other computing application.

Mobile computing device 600 may include memory 702. Memory 702 may include non-removable memory 704 or removable memory 706. Memory 702, non-removable memory 704, or removable memory 706 may be memory 206. Non-removable memory 704 may include RAM, ROM, flash memory, a hard disk, or other well-known memory storage technologies (e.g., non-transitory computer-readable storage media). Removable memory 706 may include Flash memory or a Subscriber Identity Module ("SIM") card, which is well known in Global System for Mobile Communications ("GSM") communication systems, or other well-known memory storage technologies, such as "smart cards." Memory 702 may be used for storing data or code for running operating system 606 and applications 608 (including online gaming application 700). Example data may include web pages, text, images, sound files, video data, or other datasets to be sent to or received from one or more network servers or other devices via one or more wired or wireless networks. Memory 702 may be used to store a subscriber identifier, such as an International Mobile Subscriber Identity ("IMSI"), and an equipment identifier, such as an International Mobile Equipment Identifier ("IMEI"). Such identifiers may be transmitted to a network server to identify users and equipment.

Mobile computing device 600 may support one or more input devices 708, such as touchscreen 800 (e.g., capable of capturing finger tap inputs, finger gesture inputs, multi-touch finger tap inputs, multi-touch finger gesture inputs, or keystroke inputs for a virtual keyboard or keypad), microphone 802 (e.g., capable of capturing voice input), one or more cameras 804 (e.g., capable of capturing still pictures or video), physical keyboard 806, trackball 808, one or more proximity sensors 900, one or more accelerometers 902, one or more gyroscopes 904, compass 906, one or more light sensors 908, or buttons. Mobile computing device 600 may further support one or more output devices 1000, such as speaker 1002, and display 1004. Other possible output devices 1000 (not shown) may include piezoelectric or other haptic output devices. Some devices may serve more than one input/output function. For example, touchscreen 800 and display 1004 may be combined in a single input/output touchscreen.

Mobile computing device 600 may provide one or more natural user interfaces ("NUIs"). For example, operating system 606 or applications 608 may comprise speechrecognition software as part of a voice user interface that allows a user to operate mobile computing device 600 via voice commands.

Wireless modem 1006 may be coupled to one or more antennas (e.g., transceiver 1008) and may support two-way communications between processor 604 and external devices, as is well understood in the art. Wireless modem 1006 may be shown generically and may include, for example, a cellular modem for communicating at long range with mobile communication network 602, Bluetooth-compatible modem 1012, or Wi-Fi-compatible modem 1010 for communicating at short range with an external Bluetooth-equipped device or a local wireless data network or router. Wireless modem 1006 may be typically configured for communication with one or more cellular networks, such as a GSM network for data and voice communications within a single cellular network, between cellular networks, or between the mobile device and a public switched telephone network ("PSTN").

Mobile computing device 600 may further include at least one input/output port 1014, power supply 1016, satellite navigation system receiver 1018, such as a Global Positioning System ("GPS") receiver, transceiver 1008 (for wirelessly transmitting analog or digital signals) or physical connector 1020, which may be a USB port, IEEE 1394 (FireWire) port, or RS-232 port. The illustrated components are not required or all-inclusive, as any of the components shown may be deleted and other components may be added.

Mobile computing device 600 may be part of an implementation environment in which various types of services are provided by a computing "cloud." For example, the cloud may comprise a collection of computing devices, which may be located centrally or distributed, that provide cloud-based services to various types of users and devices connected via a network such as the internet. Some tasks (e.g., processing user input and presenting a user interface) may be performed on local computing devices (e.g., connected devices) while other tasks (e.g., performing game play and gaming platform services) may be performed in the cloud.

Figure 7:
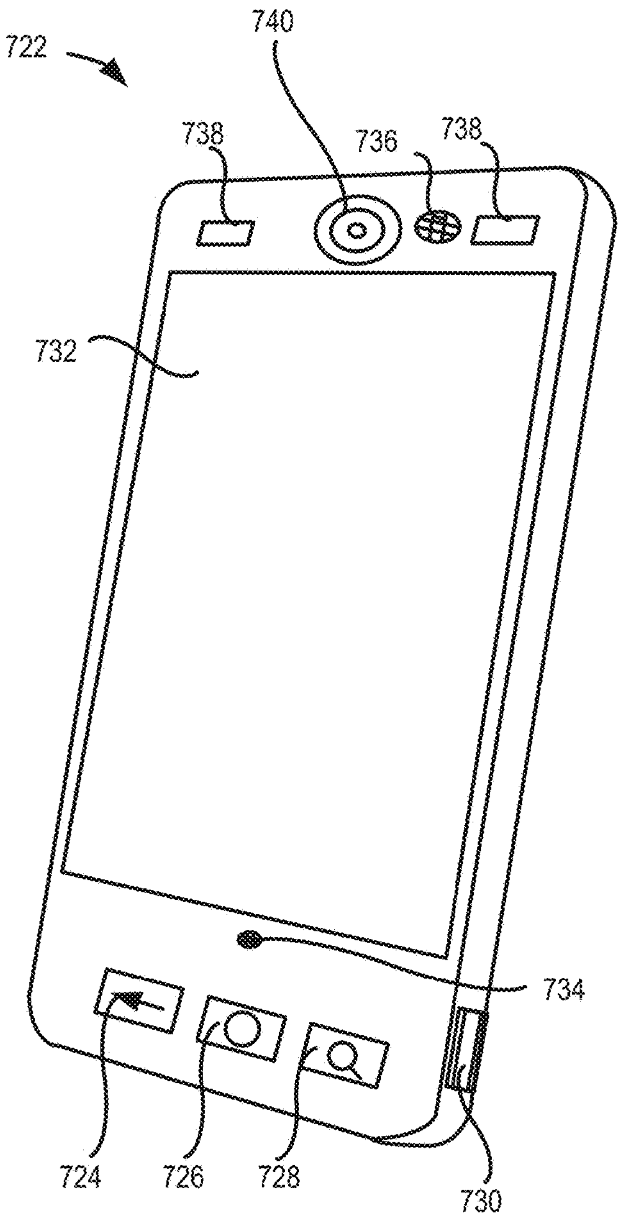
FIGS. 7 and 8 illustrate an example mobile device that may be utilized to implement embodiments of the disclosed technology, consistent with some embodiments of the present disclosure.
Figure 8:
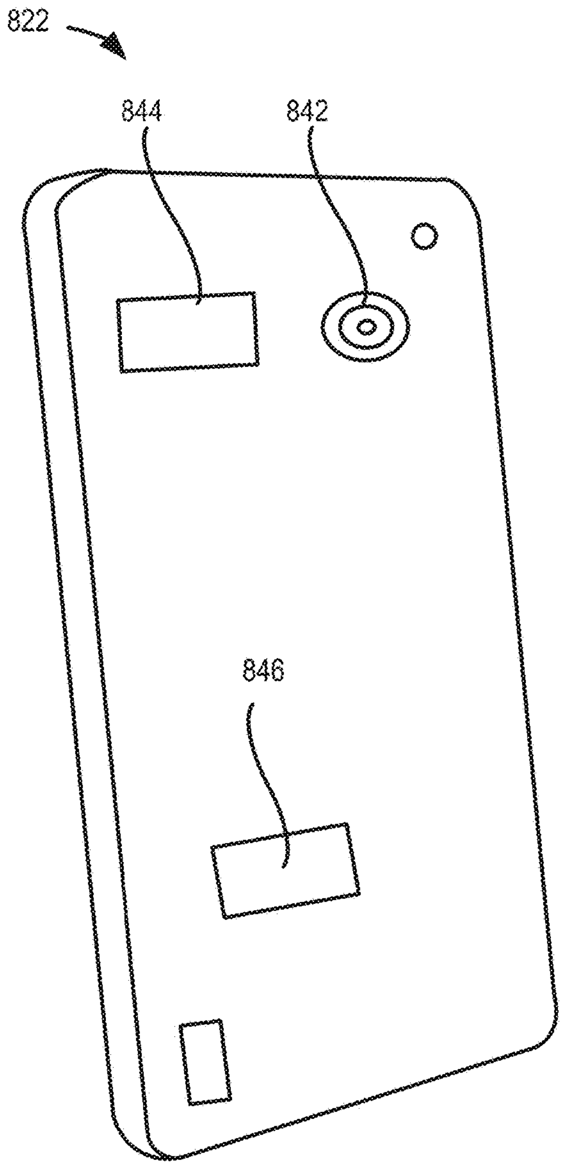

FIG. 7 illustrates a front view of the body of an example mobile device 722, while FIG. 8 depicts a rear view of the mobile device 822. It is understood that the example mobile device 722, 822 of FIGS. 7 and 8, are similar in structure having similar components as discussed with mobile device 600 of FIG. 6. As shown, mobile device 722 may include several input devices hardware buttons, including a "back" button 724, home button 726, search button 728, and camera shutter (image-capture) button 730. Also depicted is touchscreen display 732.

Mobile device 722 may include microphone 734 and speaker 736, along with two proximity sensors 738, situated below the surface of mobile device 722. In some examples, a single, or three or more, proximity sensors may be used. Any suitable proximity sensor(s) may be employed. The front face of mobile device 722 may further include front camera 740. Front camera 740 may be used to capture images or video with an image sensor embedded in mobile device 722 behind a lens. The image sensor may comprise, for example, a CMOS-based sensor, CCD (charge-coupled device) sensor, or other suitable technology.

As shown in the rear view of mobile device 822 shown in FIG. 8, mobile device 822 may include rear camera lens 842 and electronic flash 844. In some examples, there is no flash present in mobile device 822. Rear camera 842 may be configured to capture an image or video with an image sensor embedded in the device behind a lens. The image sensor may be, for example, a CMOS-based sensor, CCD (charge-coupled device) sensor, or other suitable technology.

The individual components (e.g., hardware buttons 724, 726, 728, and 730, microphone 734, speaker 736, touchscreen display 732, rear camera lens 842 and electronic flash 844) may be coupled to a mobile device chassis (not shown), which is connected to internal components of mobile device 822, for example: one or more processors, a piezoelectric actuator, a power supply, and a modem.

As shown, software 846 for implementing embodiments of the described online gaming techniques may be stored on computer-readable storage media (e.g., non-transitory computer-readable storage media) in mobile device 822.

Figure 9A:
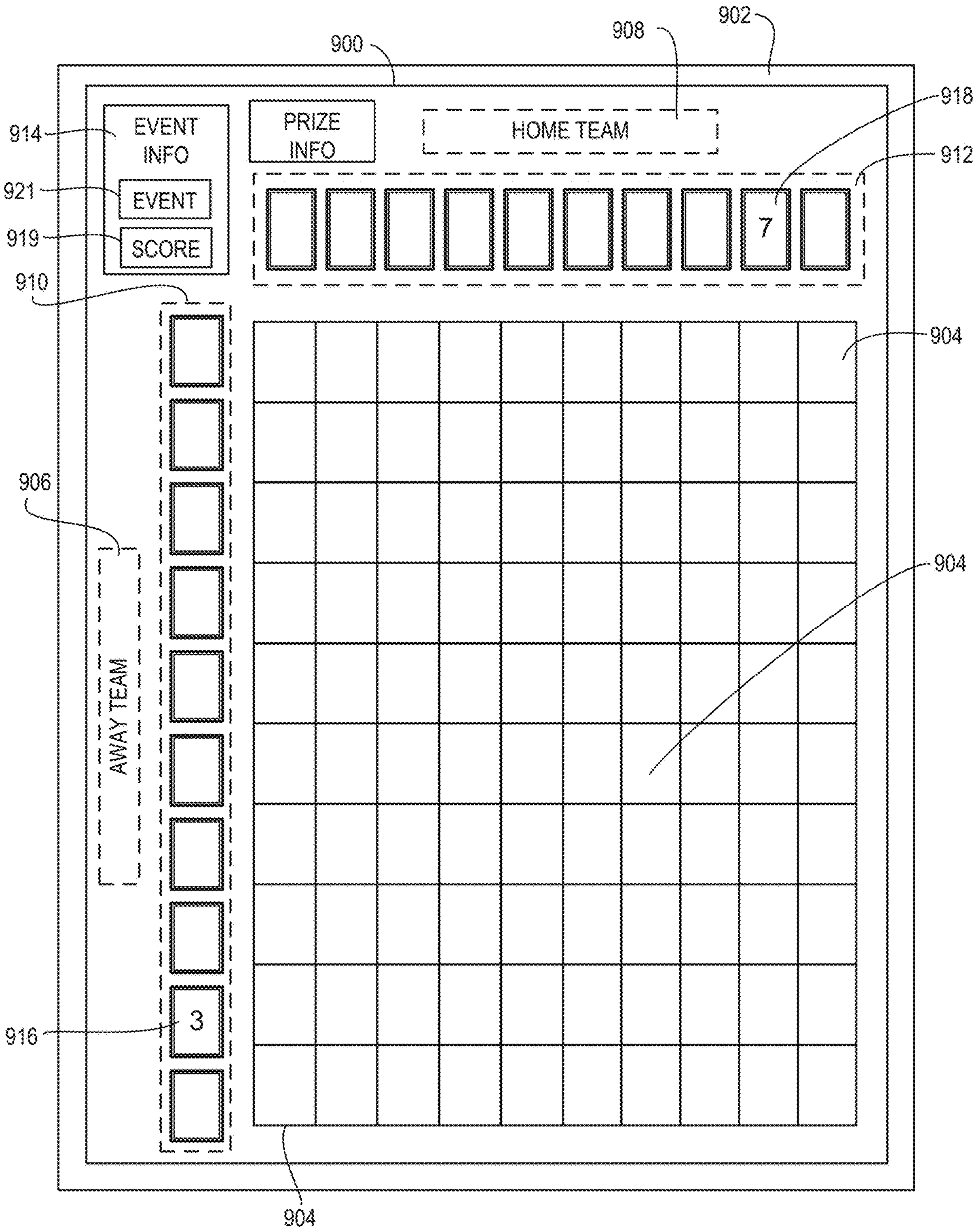
FIG. 9A illustrates an example game matrix displayed on a user-controlled electronic device, consistent with some embodiments of the present disclosure.

As discussed, the example embodiments may be configured to implement a house-based game matrix associated with an event. The event is often a live sporting event but could be any type of live event where wagers may be placed on the event. A first example of a house-based game matrix will be described herein in association with a live sporting event in the form of a football game. As described herein, other types of live sporting events may also be utilized. House-based game matrix 900 may be included, such as shown in FIG. 9A. As explained in greater detail below, internet gaming platform server 510 of disclosed embodiments may be configured to display house-based game matrix 900 on display 902 of a user-controlled electronic device such as the devices described above. As further shown in FIG. 9A, house-based game matrix 900 may have a plurality of rows and columns that define a plurality of selectable gaming units 904. While plurality of selectable gaming units 904 may have a unit shape, it is understood that plurality of selectable gaming units 904 may possess other shapes. In at least one embodiment, selectable gaming units 904 include radio buttons, checkboxes, and/or switches that allow users to control, adjust, or otherwise select options and/or settings. Selectable gaming units 904 can include a hover option, where if a user hovers over a selectable gaming unit 904 (e.g., holds finger or cursor over selectable gaming unit) for a specific period of time (e.g., 4 seconds) then that selectable gaming unit will be selected. In at least one embodiment, the house-based game matrix 900 is associated with a single event (e.g., a specific game), several events (e.g., a season), or combination thereof (e.g., single event and several events combined into a single square game). In least one embodiment, a square game is associate with a live event, an event that is not live, or an event that pauses (e.g., lottery over several weeks). A house-based game matrix 900 can also be associated with a social media event or a sports competition that is international (e.g., the Olympics).

House-based game matrix 900 may further include a first dimension 906 and a second dimension 908 of selectable gaming units 904. First dimension 906 may correspond with an "Away Team" heading extending a side portion of house-based game matrix 900. Second dimension 908 may correspond with a "Home Team" heading extending across a top portion of house-based game matrix 900. "Away Team" and "Home Team" may be the actual names of teams playing in the football game. It is understood that "Away Team" and "Home Team" headings may be reversed. In at least one embodiment, each square includes an away team number on the left, and home team number on the right so a user is able to determine if they won/are winning simply by looking at the square itself.

House-based game matrix 900 may further include two sets of event gaming numbers 910 and 912. First set of event gaming numbers 910 may be associated with first dimension 906 and contain a plurality of gaming numbers to be generated. Second set of event gaming numbers 912 may be associated with second dimension 908 and contain a plurality of gaming numbers to be generated.

Selectable gaming units 904 may be selected or picked by a user. In at least one embodiment, selectable gaming units 904 can include different colors (e.g., red, blue, black, green) or designs (e.g., rough edges, straight edges, shapes, bold, thin) to indicate that a particular prize or probability of winning is more or less likely. For example, a diamond-shaped gaming unit 904 may pay out a maximum of $100,000, while a bronze gaming unit may pay out a maximum of $100. In at least one embodiment, selectable gaming units that have been boosted, increased, or indicated to be special (e.g., prize money increased) have a different appearance than other selectable gaming units 904 (e.g., different color, different shape, different design). For example, gaming platform server 510 and game server 512 can cause selectable gaming units 904 to change it size, shape, design, or other appearance based on odds changing, prizes changing (e.g., boosting an award, where boosting can include increase a value of a prize).

User may be able to select more than one selectable gaming unit 904. Alternatively, selectable gaming units 904 may be assigned to users. RNG component 530 may aid in the process of randomly assigning selectable gaming units 904 to users. Selectable gaming units 904 may be revealed before generation of house-based game matrix 900. For example, selectable gaming unit 904 may be revealed to user after selection of all selectable gaming units or after user pick(s) selectable gaming unit 904. Each selectable gaming unit 904 may be selected, picked, or released as a stand-alone, real-money game. For example, house-based game matrix 900, unlike traditional Square Games, does not need every selectable gaming unit 904 to be selected or assigned. Gaming unit 904 can be assigned based on statistics of its probability that it is a winning gaming unit 904 such as shown in FIGS. 17A and 17B. In at least one embodiment, multiple players can receive the same gaming unit 904 and multiple players can win simultaneously. Gaming unit 904 may be provided to a user based on a user's qualification score. For example, a qualification system can generate a score for each user, where a higher score indicates a user is qualified for gaming units that are more likely to win and a lower score indicates a user is less qualified and is qualified for gaming units that are less likely to win. In such an example, a qualification can include a neural network that receives user input data and generates a qualification score, which a gaming engine uses to determine which gaming unit to select for a user. In at least one embodiment, gaming platform server 510 and/or game server 512 can award users a consolation prize if they match just one of the two numbers (e.g., would occur 19/100 times, with both numbers being matched 1/100 times in a one digit for each team implementation). In at least one embodiment, users may receive an exact score correct to win (e.g., a square would have 27-17 displayed on it and not 7-7).

Users may enjoy disclosed embodiments upon selecting, picking, or being assigned just one selectable gaming unit 904. In some examples, disclosed embodiments may only require one user per house-based game matrix 900. In other examples, disclosed embodiments may allow for more than one user per house-based game matrix 900. User or users may also enjoy participating in more than one house-based game matrix 900. For example, a first house-based game matrix 900 may be associated with a first event 921 and a second house-based game matrix 900 may be associated with a second event 921. Alternatively, more than one house-based game matrices 900 may be associated with event 921. For example, first score number 923 and second score number 925 may be associated with event score 919 (e.g., 10-10) of event 921 (e.g., a NFL football game). In other examples, first score number 923 and second score number 925 may be associated with other event information 914 (e.g., number of rushing yards a player has, number of passing yards a player has, number of goals, number of rebounds, number of pitches, number of runs, number of homeruns, number of total outs, number of total pitches, number of aces, golf score).

Disclosed embodiments may provide for a user to select, pick, or be assigned more than one selectable gaming unit 904 per house-based game matrix 900. In this example, user may optionally wager for a "parlay." Parlay may refer to two or more than wagers that are linked together and must all occur in order for user to win. Alternatively, the user may wager for a combo-parlay. In this example, multiple wagers may be linked together and a number of the multiple wagers must occur for user to win. If the user wins parlay or combo-parlay, the user may win or be paid out more than what a single selectable gaming unit 904 would. Some examples may provide for user to select two selectable gaming units 904 and place a wager that both selectable gaming units 904 are winning gaming units. For example, first score number 923 may be the first digit from first score number 923 and second score number 925 may be the second digit from second score number 925. Third score number may be the second digit from first score number 923 and fourth score number may be the second digit from second score number 923. In this example, if event score 919 is 17-21, then two selectable gaming units 904 may be winning gaming units. First score number 923 is 1 and second score number is 2. Third score number is 7 and fourth score number is 1. Thus, first winning gaming unit is selectable gaming unit 904 that is associated with first event gaming number (e.g., 1) and second event gaming number (e.g., 2). Second winning gaming unit is selectable gaming unit 904 that is associated with first event gaming number (e.g., 7) and second event gaming number (e.g., 1). If user selected or possessed both selectable gaming units 904 and placed an appropriate wager, user may win a larger payout.

User may also select a bonus. Bonus may be in the form of selectable gaming unit 904 expansion. For example, bonus may expand from selection of selectable gaming unit 904 (e.g., one unit) to more than one selectable gaming unit 904 (e.g., nine total units).

House-based game matrix 900 may further include event info 914. Event info 914 may include any information associated with event, including event score 919, event 921, and any other information associated with event 921. It is understood and as further described herein, display 902 of house-based game matrix 900 may include various types of graphics, color schemes, and animations.

Figure 9B:
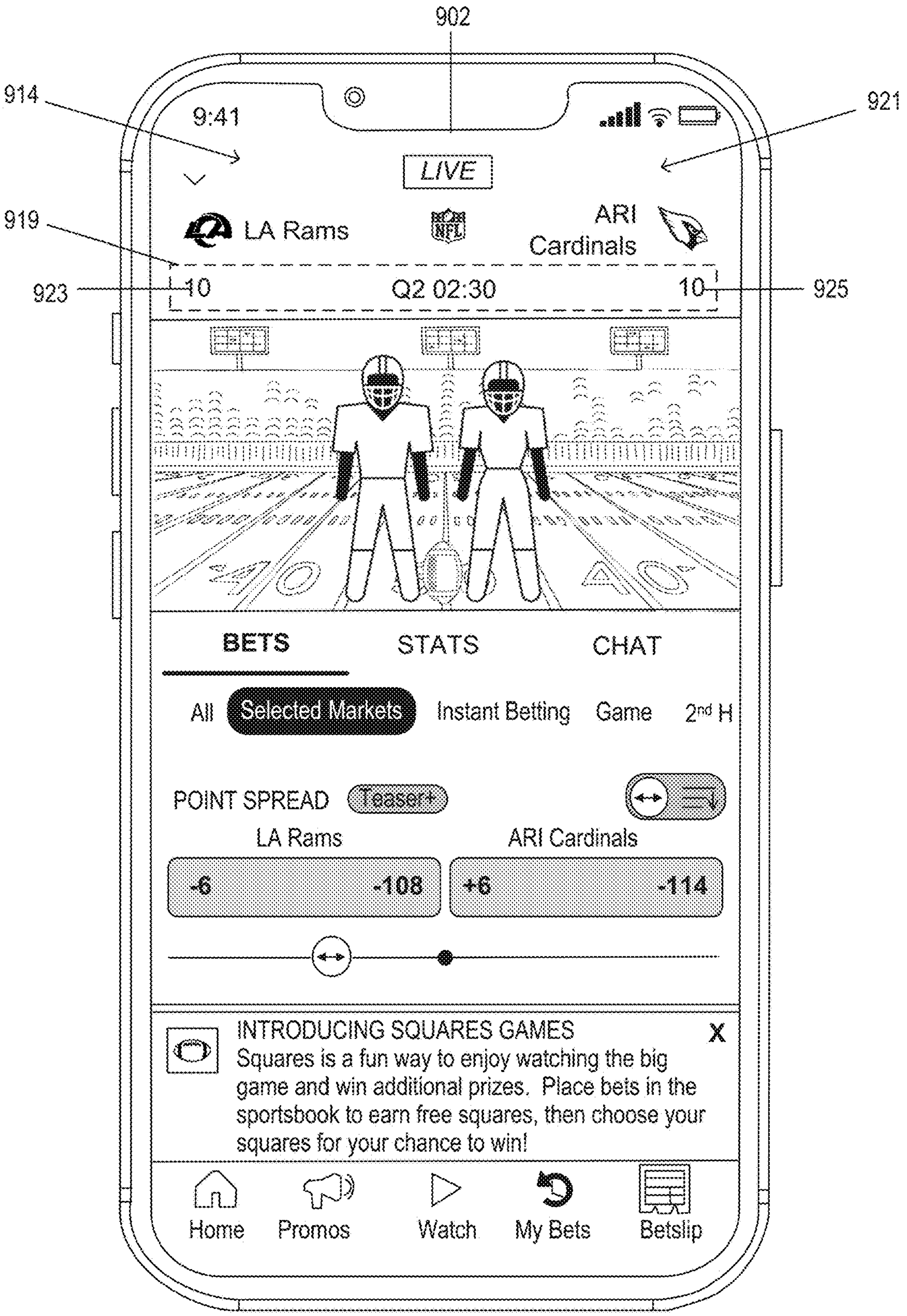
FIGS. 9B-9D illustrate an example display of an example mobile device that may be utilized to implement embodiments of the disclosed technology, consistent with some embodiments of the present disclosure.

FIGS. 9A through 9K provide examples of the disclosed embodiments. FIG. 9B illustrates display 902, event information 914, event 921, and first score number 923 and second score number 925. Event information 914 may include information related to event 921 such as what event 921 may be (e.g., a NFL football game), teams (e.g., the Los Angeles Rams and the Arizona Cardinals), event score 919 (e.g., 10-10), what quarter event 921 is in, time left in event 921, whether event 921 is live, and other information associated with event 921. Event score 919 may be divided into first score number 923 (e.g., 10) and second score number 925 (e.g., 10). In some examples, first score number 923 may be in the form of a single digit (e.g., 1 or 0) or second score number 925 may be in the form of a single digit (e.g., 1 or 0). FIG. 9B may also include information related to placing wagers or bets on event 921. For example, the point spread for event 921 may be included. Additionally, a notification may be displayed introducing a matrix game.

Figure 9C:
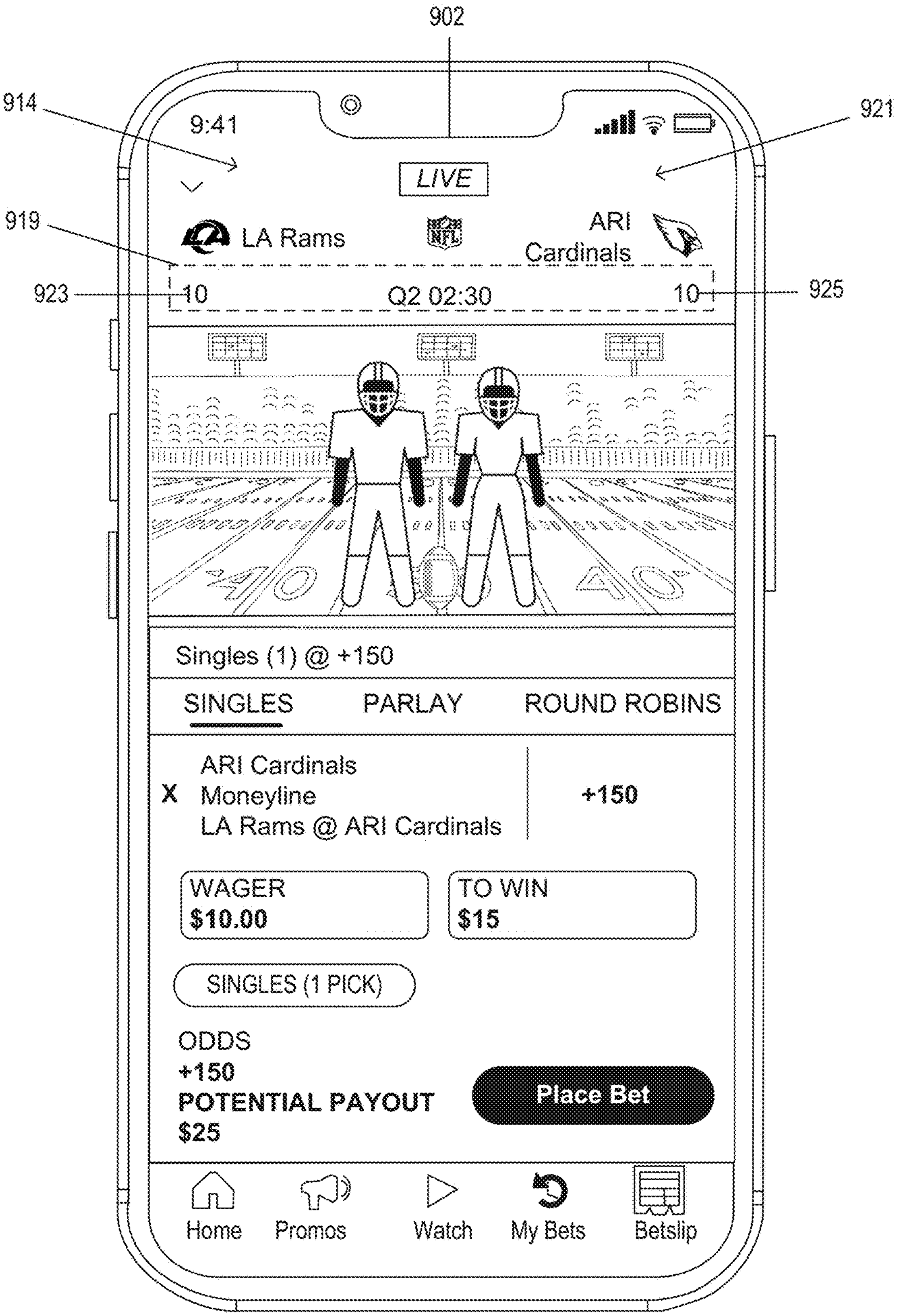
Figure 9D:
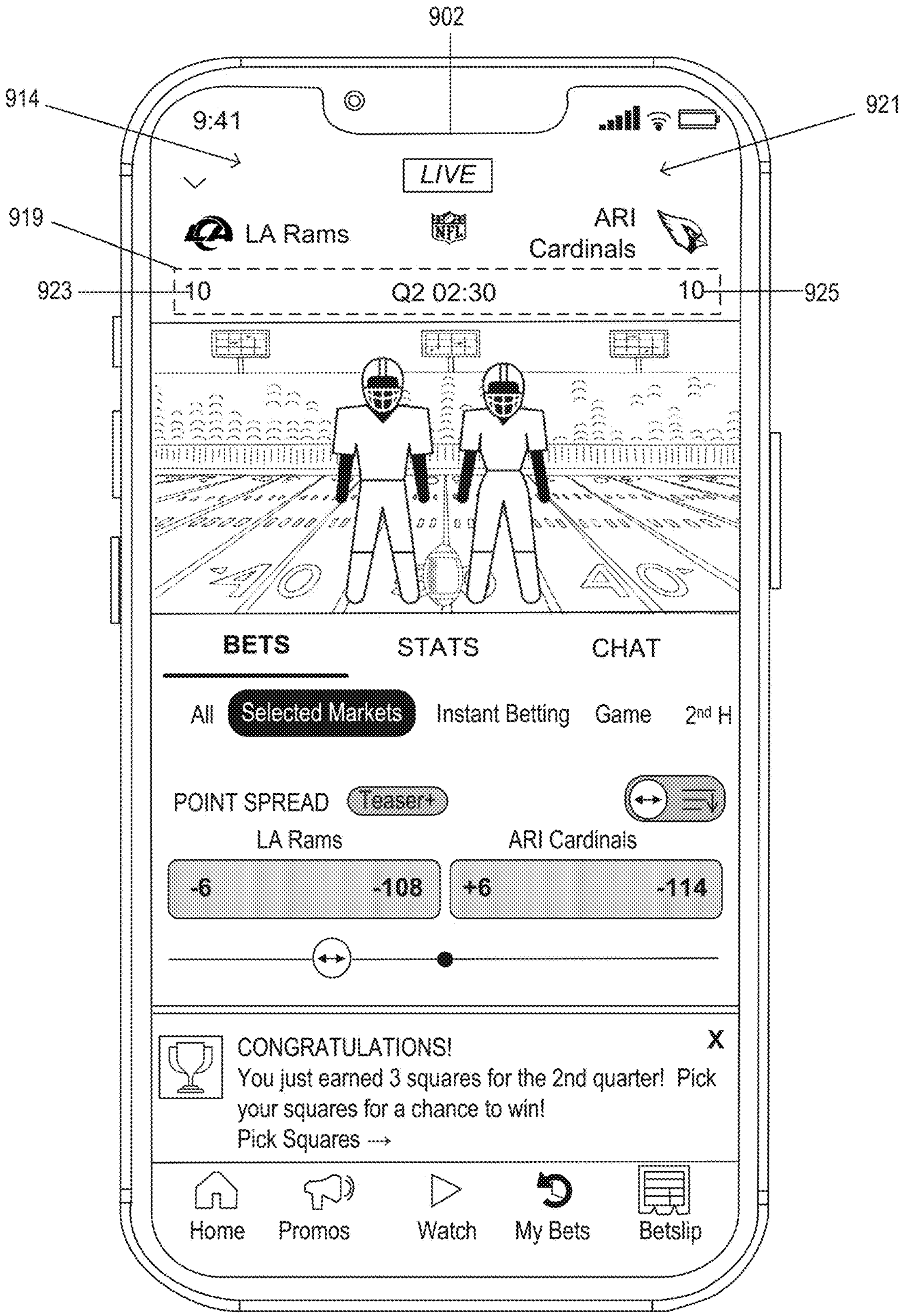

FIG. 9C illustrates display 902, event information 914, event 921, and first score number 923 and second score number 925 as well. FIG. 9C illustrates a selected wager/bet of $10.00 to win $15.00 for a single wager/bet selection. FIG. 9D illustrates a notification that a user earned three selectable gaming units 904 (e.g., squares) for the second quarter of event 921. While FIG. 9D shows the matrix game as a bonus, it is appreciated that the matrix game may be a separate wager-based game. While FIG. 9D shows a notification that a user earned three selectable gaming units 904 (e.g., squares) and the user can select which units, it is possible that game engine selected the gaming units 904 for the user such that the gaming units have the highest probability of winning. In at least one embodiment, a game engine assigns squares to users randomly, and users are not able to select gaming units 904. In another embodiment, a game engine assigns squares with a higher probability of winning to certain users (e.g., users who wagered more, are loyal, or new) and squares with a lower probability of winning other users (e.g., users who wagered less, are not loyal, or who are generally not engaged in a game based on recent activity or previous activity).

Figure 9E:
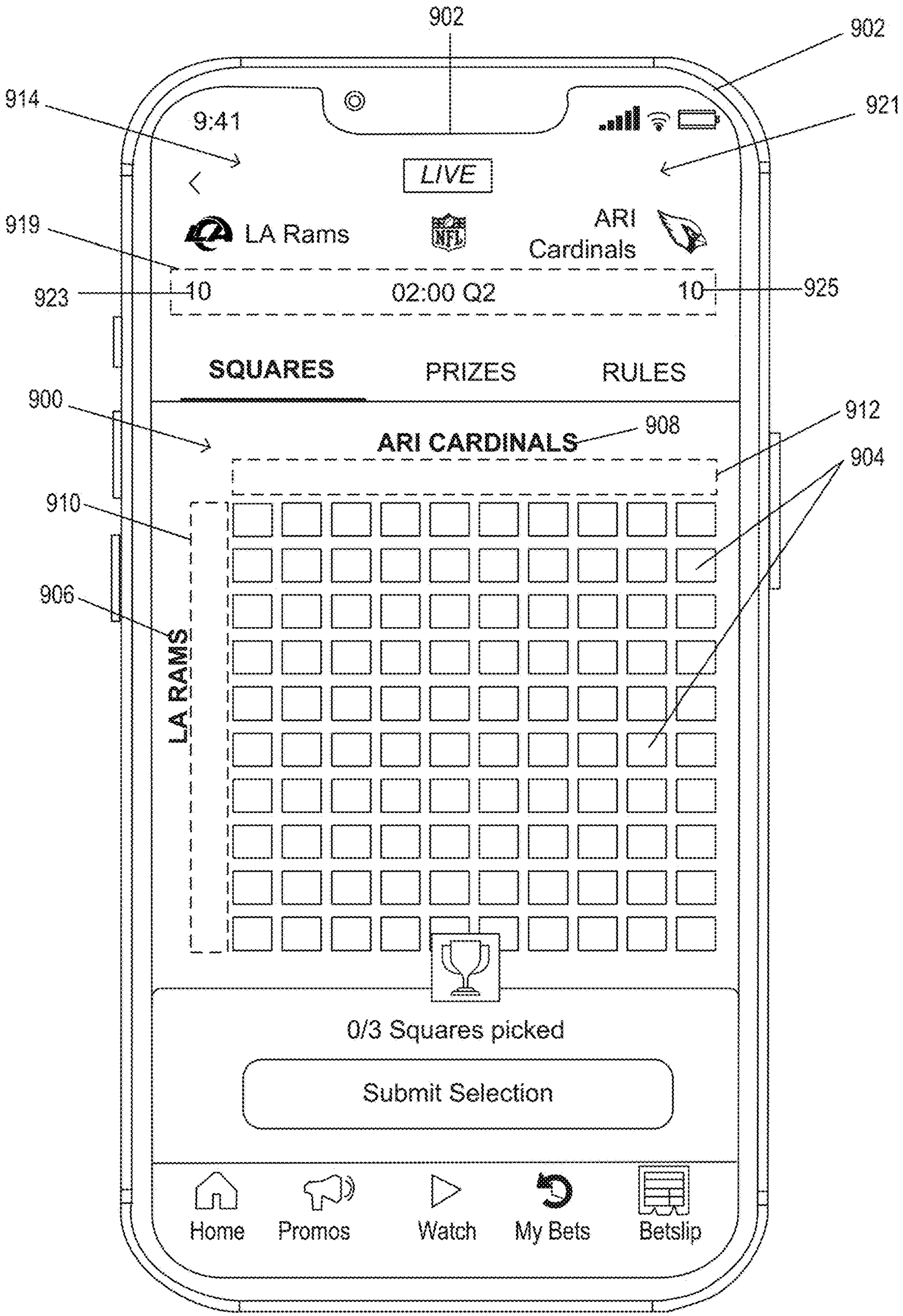
FIG. 9E illustrates an example game matrix displayed on the user-controlled electronic device, consistent with some embodiments of the present disclosure.

FIG. 9E illustrates display 902, event information 914, event 921, and first score number 923 and second score number 925. FIG. 9E also illustrates house-based game matrix 900, selectable gaming units 904, first dimension of gaming units of house-based game matrix 906, second dimension of gaming units of house-based game matrix 908, first set of event gaming numbers 910, and second set of event gaming numbers 912. First dimension of house-based game matrix 906 may be associated with a team name (e.g., LA RAMS) and second dimension of house-based game matrix 908 may be associated with a different team name (e.g., ARI CARDINALS). First dimension of house-based game matrix 906 may provide a first dimension associated with selectable gaming units 904 and second dimension of house-based game matrix 908 may provide a second dimension associated with selectable gaming units 904. FIG. 9E prompts a user to select three selectable gaming units 904.

Figure 9F:
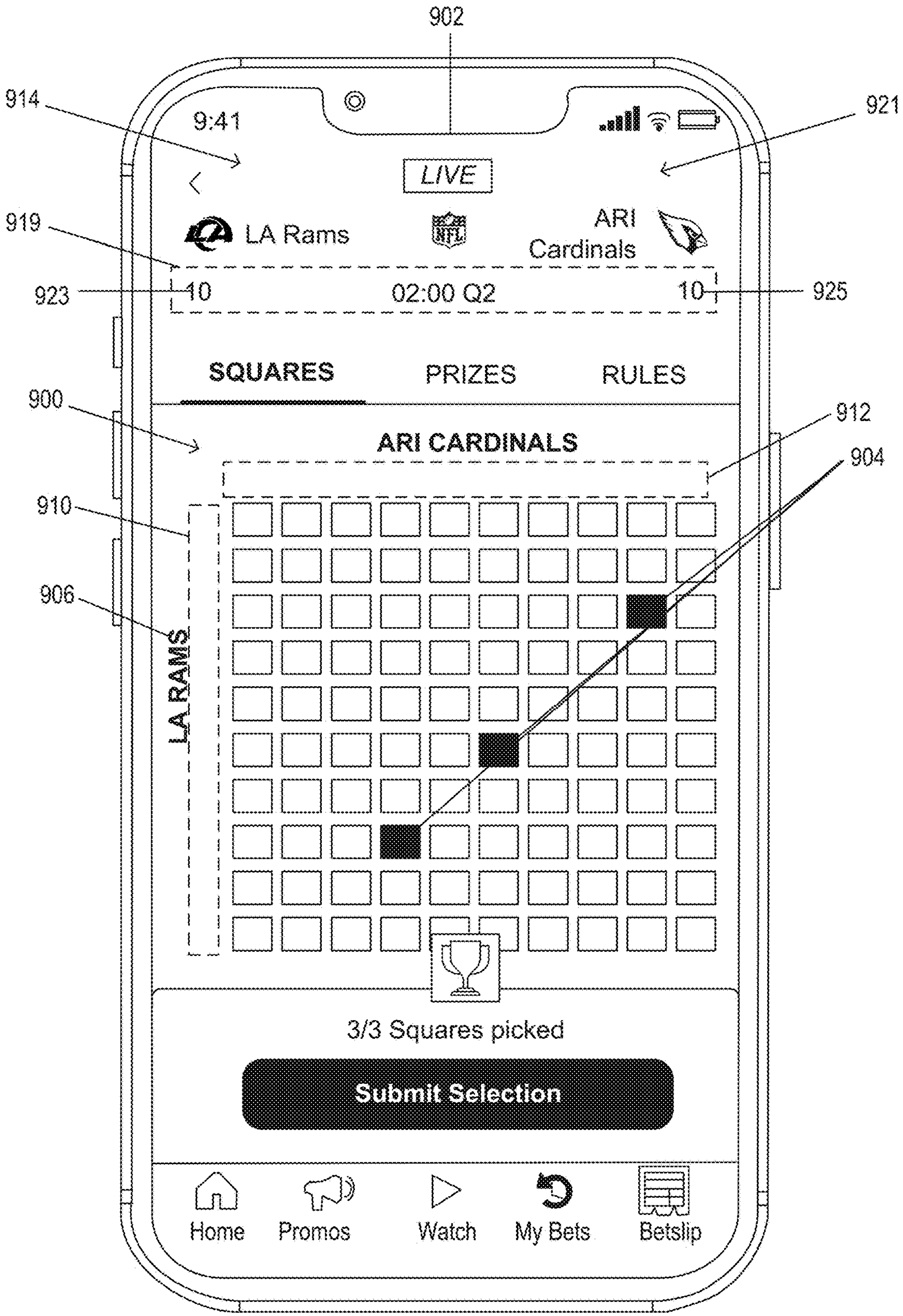
FIG. 9F illustrates an example game matrix displayed on the user-controlled electronic device and showing selection of three gaming units, consistent with some embodiments of the present disclosure.

FIG. 9F illustrates three selectable gaming units 904 selected. Each selectable gaming unit 904 is associated with an event number from first set of event gaming numbers 910 and an event number from second set of event gaming numbers 912.

Figure 9G:
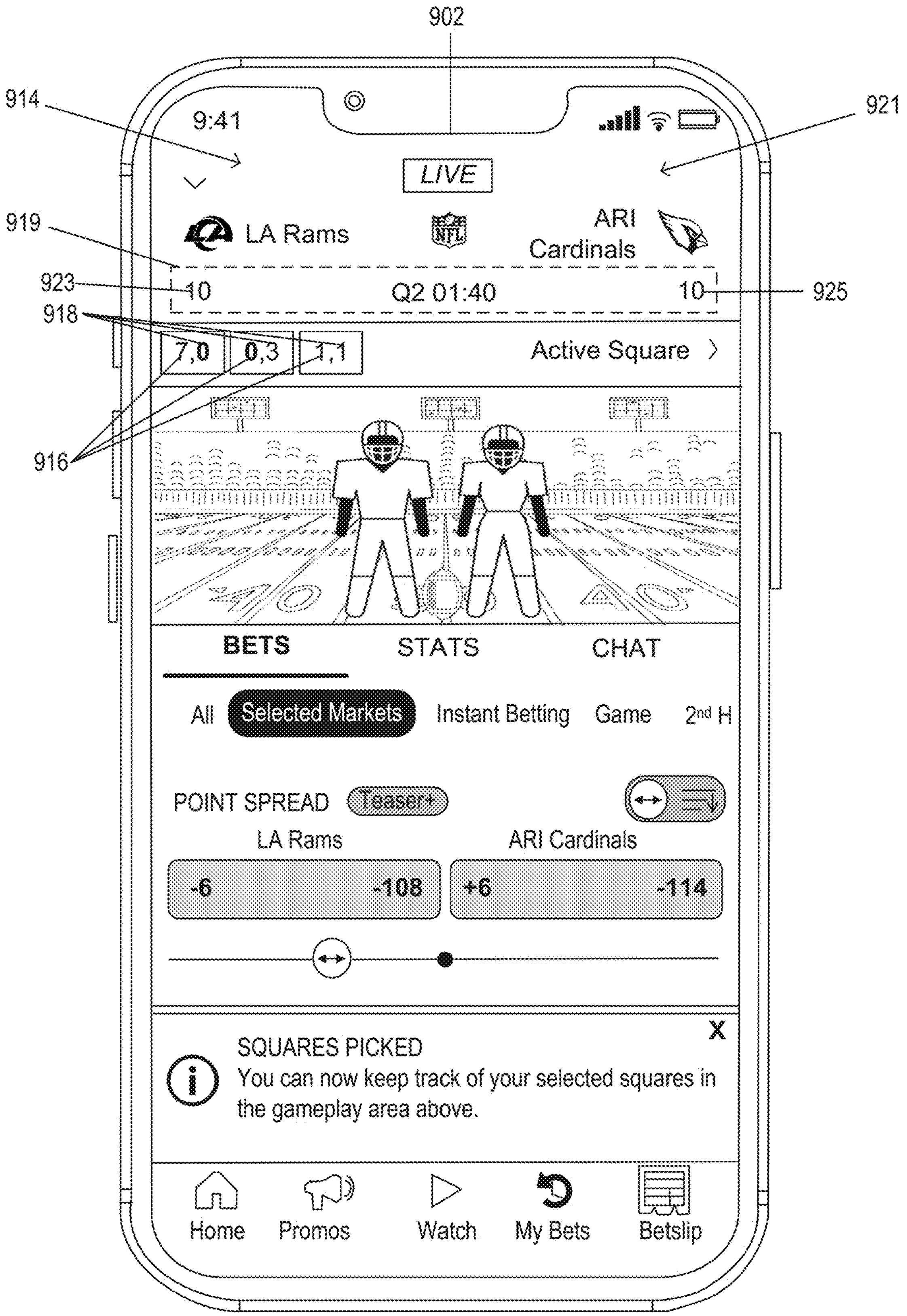
FIG. 9G illustrates an example display of an example mobile device that may be utilized to implement embodiments of the disclosed technology, consistent with some embodiments of the present disclosure.
Figure 9H:
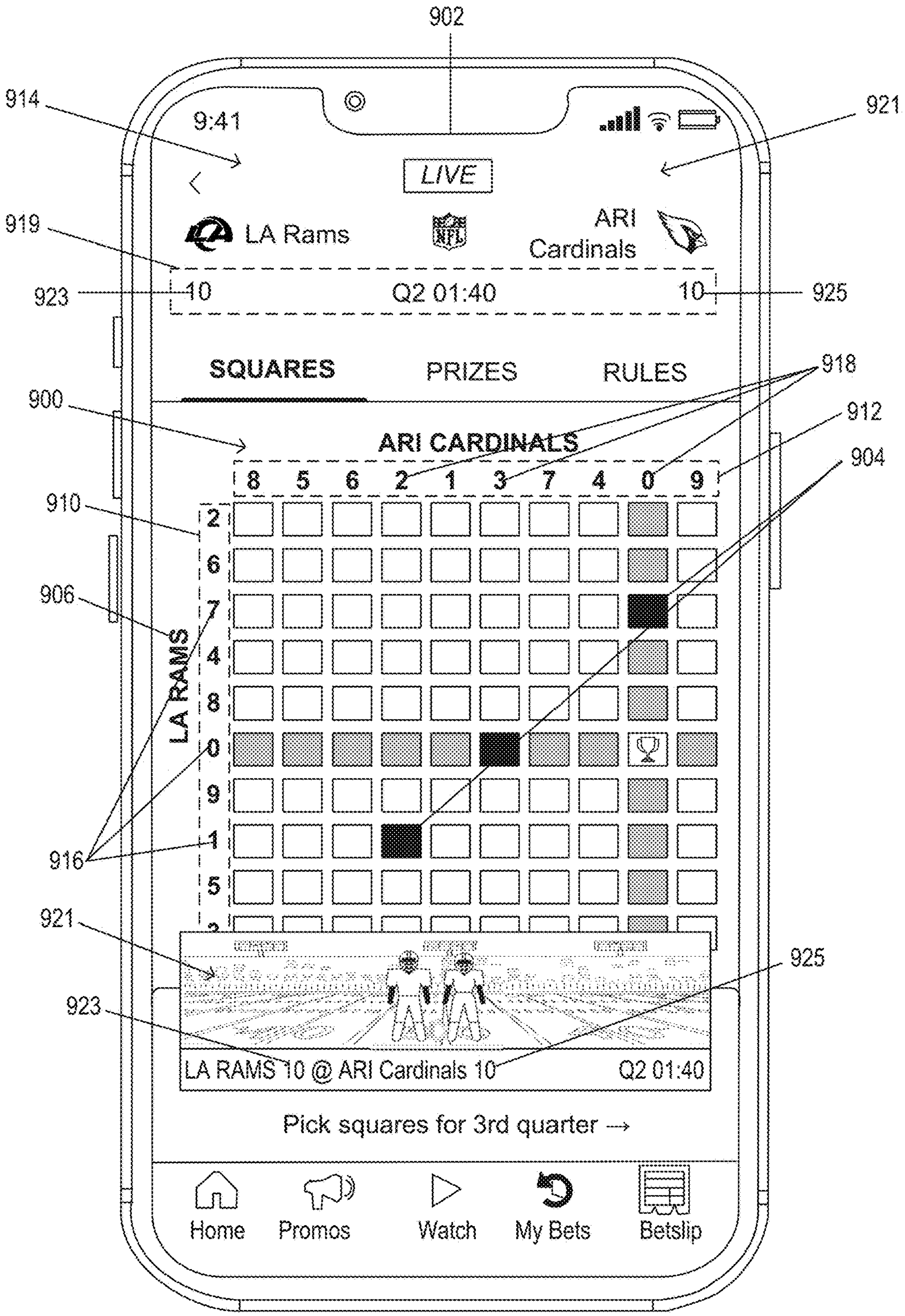
FIG. 9H illustrates an example display of an example mobile device showing selection of three gaming units, a winning gaming unit, and the event, consistent with some embodiments of the present disclosure.

FIG. 9G illustrates event 921 and three first gaming numbers 916 and three second gaming numbers 918 for three selectable gaming units 904. FIG. 9G also illustrates a notification to user that user may now keep track of its selected gaming units 904. FIG. 9H illustrates first set of event gaming numbers 910 (e.g., 2, 6, 7, 4, 8, 0, 9, 1, 5, 3) and second set of event gaming numbers 912 (e.g., 8, 5, 6, 2, 1, 3, 7, 4, 0, 9), both sets of event gaming numbers having been randomly selected (e.g., via RNG component 530 of FIG. 5). First score number 923 is 0 and second score number 925 is also 0. Winning selectable gaming unit 904 therefore is selectable gaming unit 904 that is associated with first event gaming number 916 (e.g., 0) from first set of event gaming numbers 910 and second event gaming number 918 (e.g., 0) from second set of event gaming numbers 912. In this example, unfortunately, user did not select winning selectable gaming unit 904. User selected selectable gaming unit 904 associated with first event gaming number 916 (e.g., 1) and second event gaming number 918 (e.g., 2); selectable gaming unit 904 associated with first event gaming number 916 (e.g., 0) and second event gaming number 918 (e.g., 3); and selectable gaming unit 904 associated with first event gaming number 916 (e.g., 7) and second event gaming number 918 (e.g., 0). In at least one embodiment, when a game engine or reward system provides random squares to a user, there is no need to randomize the axis numbers representing the last digit of each team's score.

Figure 9I:
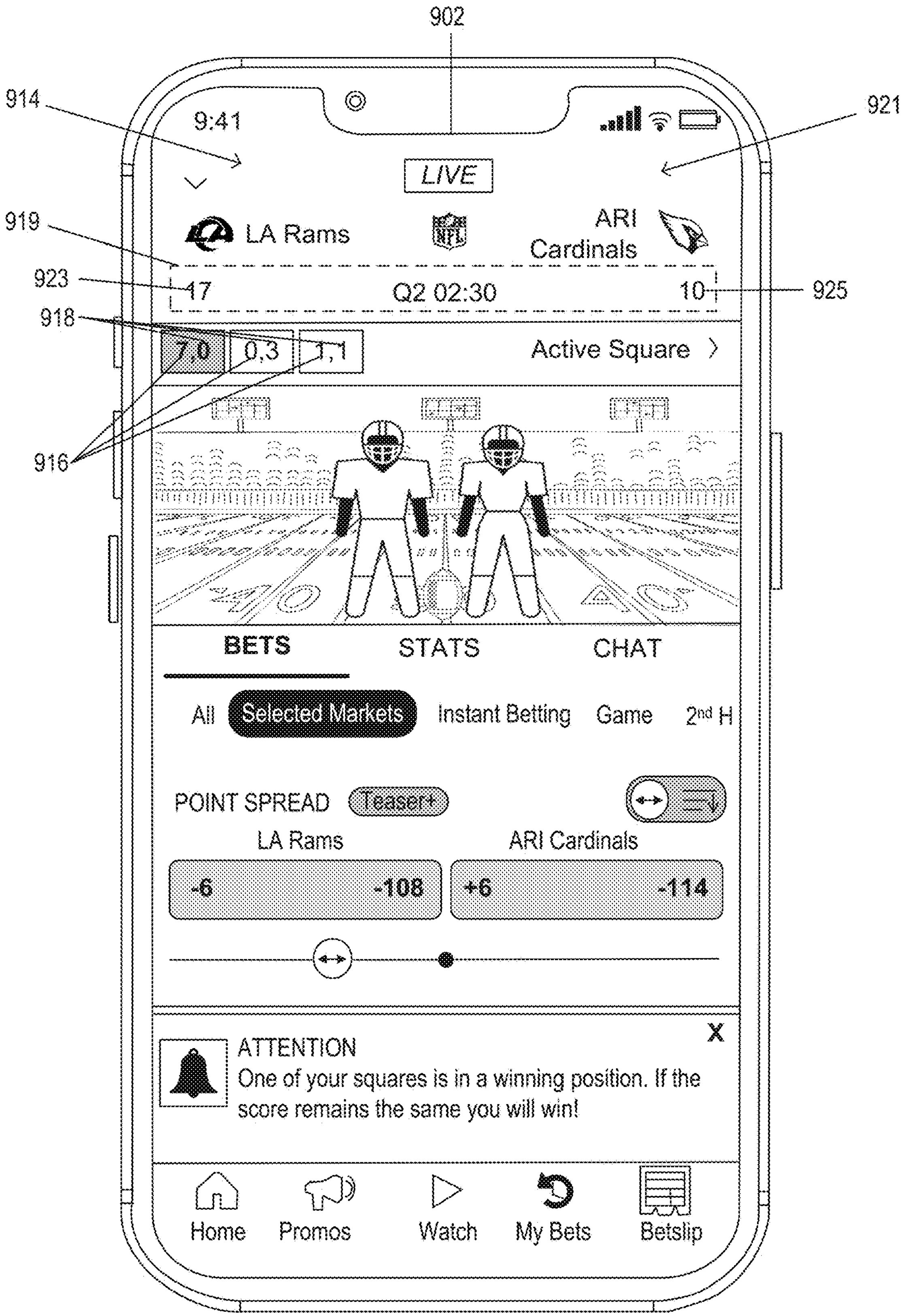
FIG. 9I illustrates an example display of an example mobile device showing the event and gaming numbers, consistent with some embodiments of the present disclosure.

FIG. 9I illustrates event 921 and first score number 923 (e.g., 17) and second score number 925 (e.g., 10), wherein the value of the first digit from each score number is compared to the event gaming numbers (i.e., 7 and 0). Winning selectable gaming unit 904 therefore is selectable gaming unit 904 that is associated with first event gaming number 916 (e.g., 7) from first set of event gaming numbers 910 and second event gaming number 918 (e.g., 0) from second set of event gaming numbers 912. In this example, user has selected winning selectable gaming unit 904 (e.g., 7,0) as indicated by animation or lighting up the associated selectable gaming unit 904. FIG. 9I also illustrates notification "Attention" that one of user's selectable gaming units 904 is in a winning position if the score stays the same at the end of the period (in this case, at the end of the second quarter). It is appreciated that any type of notification can be used, such as displaying matching numbers in green or non-matching numbers in red.

Figure 9J:
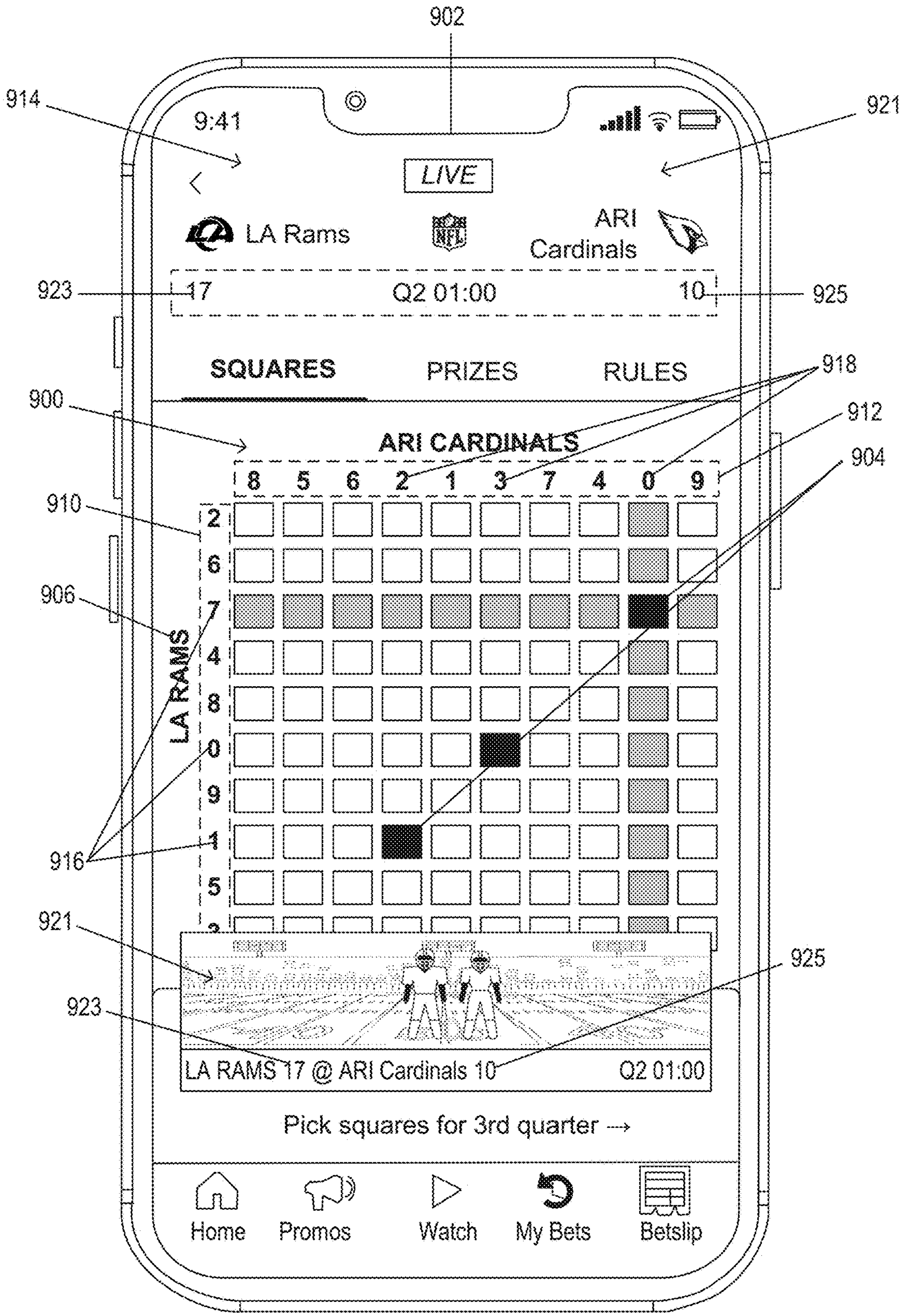
FIG. 9J illustrates an example display of an example mobile device showing selection of three gaming units and the event, consistent with some embodiments of the present disclosure.
Figure 9K:
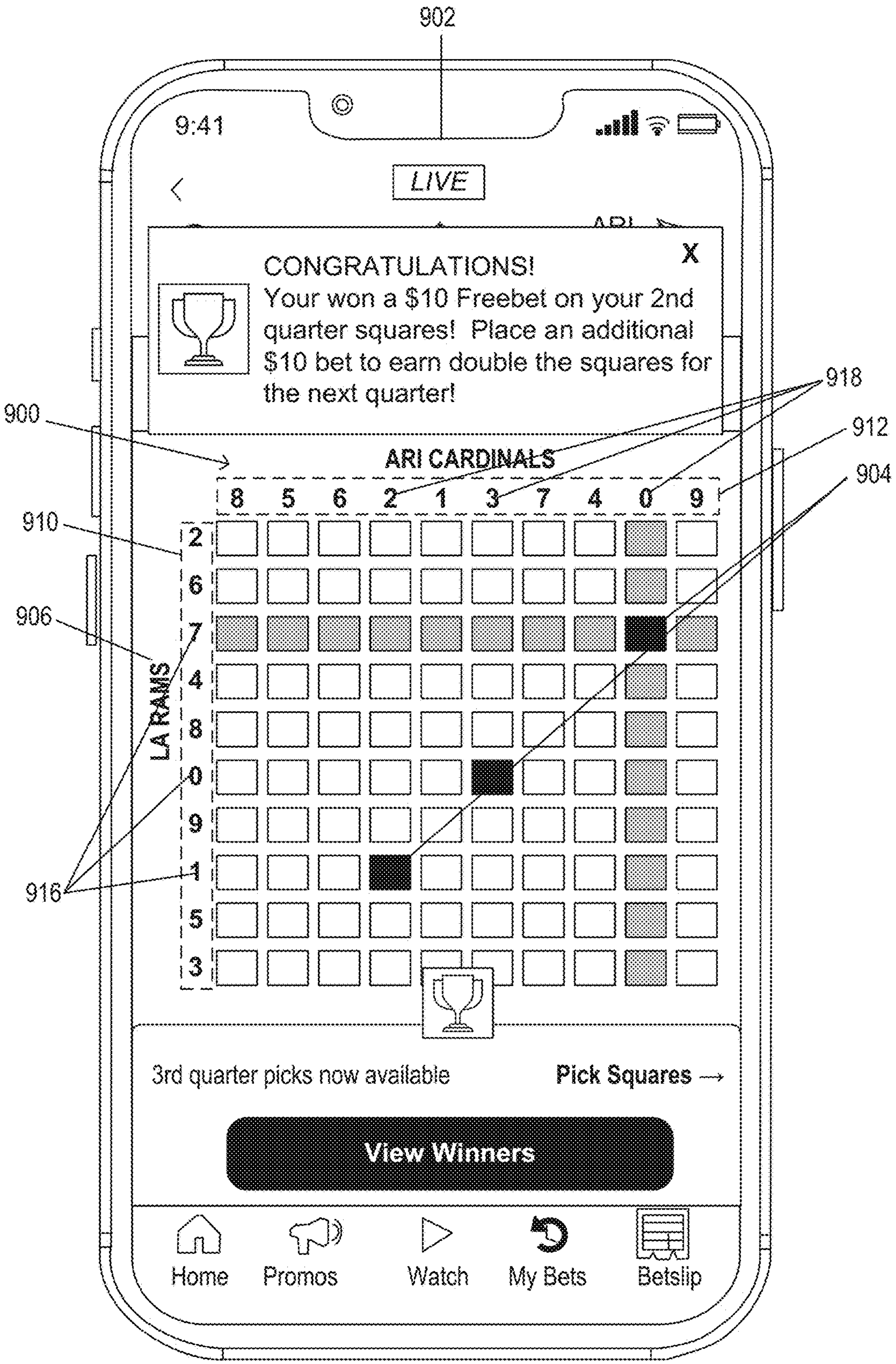
FIG. 9K illustrates an example display of an example mobile device showing selection of three gaming units, consistent with some embodiments of the present disclosure.

FIG. 9J illustrates house-based matrix 900 with user's winning selectable gaming unit 904. FIG. 9K illustrates a notification to user that user won a $10.00 Freebet on its second quarter selectable gaming units 904. In addition, user may place an additional $10 wager/bet to earn double selectable gaming units 904 for the next quarter of event 921.

As further described herein, users, also referred to as players, purchase selectable gaming units 904 or are awarded selectable gaming units 904 by disclosed embodiments in association with event 921, such as a football game. User names are typically listed in selectable gaming units 904. Disclosed embodiments do not require that all selectable gaming units 904 be selected. Two sets of event gaming numbers 210, 212 (typically the numbers 1 through 9 and 0) are generated and inserted into the house-based game matrix 900. Once event gaming number sets 210, 212 are generated and inserted, house-based game matrix 900 is completed. Internet gaming platform server 510 may also be configured to display the completed house-based game matrix 900 for viewing by users or other passive viewers not owning any selectable gaming units 904. It is understood that a system operator or administrator may assist in the overall configuration of the disclosed embodiments and implementation of house-based game matrix 900. Once event 921 begins, the play of house-based game matrix 900 may be monitored and event data such as event score 919 may be communicated to internet gaming platform server 510, which may be displayed if desired. Users watching event 921 may review house-based game matrix 900 to see which user may be a potential winner based on predetermined intervals for prize awards. For example, house-based game matrix 900 may award prize money based on event score 919 after the first quarter, second quarter, third quarter and the end of event 921. As play of event 921 progresses, winners are determined based on event score 919 and plurality of selectable gaming units 904 associated with first gaming number 916 and second gaming number 918.

First gaming number 916 from first set of event gaming numbers 910 may correspond to a final digit of a team's score from first score number 923. Second gaming number 918 from second set of event gaming numbers 912 may correspond to a final digit of a team's score from second score number 925. For a selected gaming unit from plurality of selected gaming units 904, first score number 923 may be compared with first gaming number 916. For the same selected gaming unit from plurality of selected gaming units 904, second score number 925 may be compared with second gaming number 918. A winning gaming unit from plurality of selected gaming units 904 may be defined where the comparison of first score number 923 with first gaming number 916 is a match and where the comparison of second score number 925 with second gaming number 918 is a match. The user(s)/player(s) with winning game unit may be notified of winning game unit and a win. Predetermined prize money may be paid out to the user(s)/winner(s) via internet gaming platform server 510 and digital communication with user's respective accounts.

Disclosed embodiments may include additional features associated with the house-based game matrix that may be implemented on internet gaming platform server. The additional features result in enhanced interest from users in events and also the house-based game matrix. The enhanced interest may include interest during the timeframe leading up to event as well as during the play of the event.

It is understood that the house-based game matrix may be hosted by disclosed embodiments and displayed on the internet gaming platform server to be generally viewed by potential users associated with disclosed embodiments. Potential users, using the various devices discussed above such as the desktop/laptop computers, tablets and smartphones, may purchase the selectable gaming units from the house-based game matrix. Such configuration may be an open event to any potential users. To add excitement and a sense of exclusivity, disclosed embodiments implementing house-based game matrix may require potential users to qualify, be specifically invited or otherwise be selected by player management component 518 of FIG. 5. Whether a user qualifies under some predetermined qualification criteria, is specifically invited or otherwise selected to play, the user may be considered to have "qualified user status" or be a "qualified user."

A user may qualify to play in several different ways. For example, a user may achieve qualified user status or become a qualified user by completing a specific wagering requirement in related or other games administered by the entity owning the system. The user could also be automatically qualified by having VIP member status with the entity or achieving a certain loyalty status, or loyalty level status of the entity over time. Thus, active wagerers in disclosed embodiments may receive priority to qualify for the house-based game matrix. In other example embodiments, current live wagerers in disclosed embodiments are prioritized to qualify for house-based game matrix. Another type of predetermined qualification status may be the user placing a wager in the disclosed embodiments during a predetermined time frame before the commencement of the event. The user could also purchase a ticket offered by the entity through disclosed embodiments, or by winning a ticket through another promotion from disclosed embodiments. The user could also become qualified through a bonus code associated with a marketing promotion conducted by disclosed embodiments. Finally, a user may simply be invited by disclosed embodiments, such as through a system administrator, and become qualified to play based on some predetermined criteria entered in the system.

Disclosed embodiments may also randomly invite users associated with the system. In certain example embodiments, the invitation may be based on predetermined criteria including: whether user has an account balance; amount of account balance; any system loyalty level achieved; whether the user has been active or inactive in system (e.g., wagering) within a predetermined number of days; or a GGR criteria. In addition, disclosed embodiments may invite potential users based on a combination of purely random selection criteria and user-based criteria. Other qualification methods are also possible such as transferable rewards from another user. Finally, a system administrator may also manually qualify a user even if the user did not meet designated criteria wherein the user still obtains qualified user status and becomes a qualified user.

Once qualified, a message is sent to the user(s) via e.g., pop-up messaging, text messaging, push notification or email notification, that the user may participate in house-based game matrix. It is understood that registration information associated with the user is previously entered into the internet gaming platform server or such registration information is obtained from the user. Registration information includes general information such as name, age, contact information, bank account information or credit card information. It is further understood that multiple house-based game matrices may be available for play at the same time. The administrator may prepare a menu of available house-based game matrices for users. Each house-based game matrix may be associated with a different event. In such case, the user initially selects the desired house-based game matrices to play.

Upon qualification and selection of the desired house-based game matrix such as by clicking on a system-provided link and menu selection, the user may be directed to a "room" and presented with house-based game matrix 900 that is displayed on the user's device display 902 such as shown in FIG. 9A. As previously discussed and disclosed, house-based game matrix 900 shown in FIG. 9A has a 10×10 field of rows and columns. Thus, 100 selectable gaming units 904 may be defined in house-based game matrix 900, and each selectable gaming unit 904 may represent a Home/Away Team parameter combination, which is typically an event score 919 combination. Associated event 921 may be suitably identified in event information 914 and may also include the date of event 921 and start time. Winning prize information and payout information may also be displayed in the event information 914. It is understood that prize information may be displayed in other locations for viewing by players as well. The Home Team and Away Team may also be associated with first dimension 906 and second dimension 908 as described above. First set of event gaming numbers 910 and second set of event gaming numbers 912 associated with first dimension 906 and second dimension 908 may also be generated, but the numbers are not yet filled into the spaces. In further example embodiments, internet gaming platform server 510 may be configured such that when the user is presented with house-based game matrix 900, animated features are provided such as showing other users' names randomly applied to different selectable gaming units 904 as well as numbers being applied in the spaces of first set of event gaming numbers 910 and second set of event gaming numbers 912. It is understood that additional visually perceptive indicia may be applied to selectable gaming units 904 to indicate certain selectable gaming units 904 being already purchased by other users.

Figure 10:
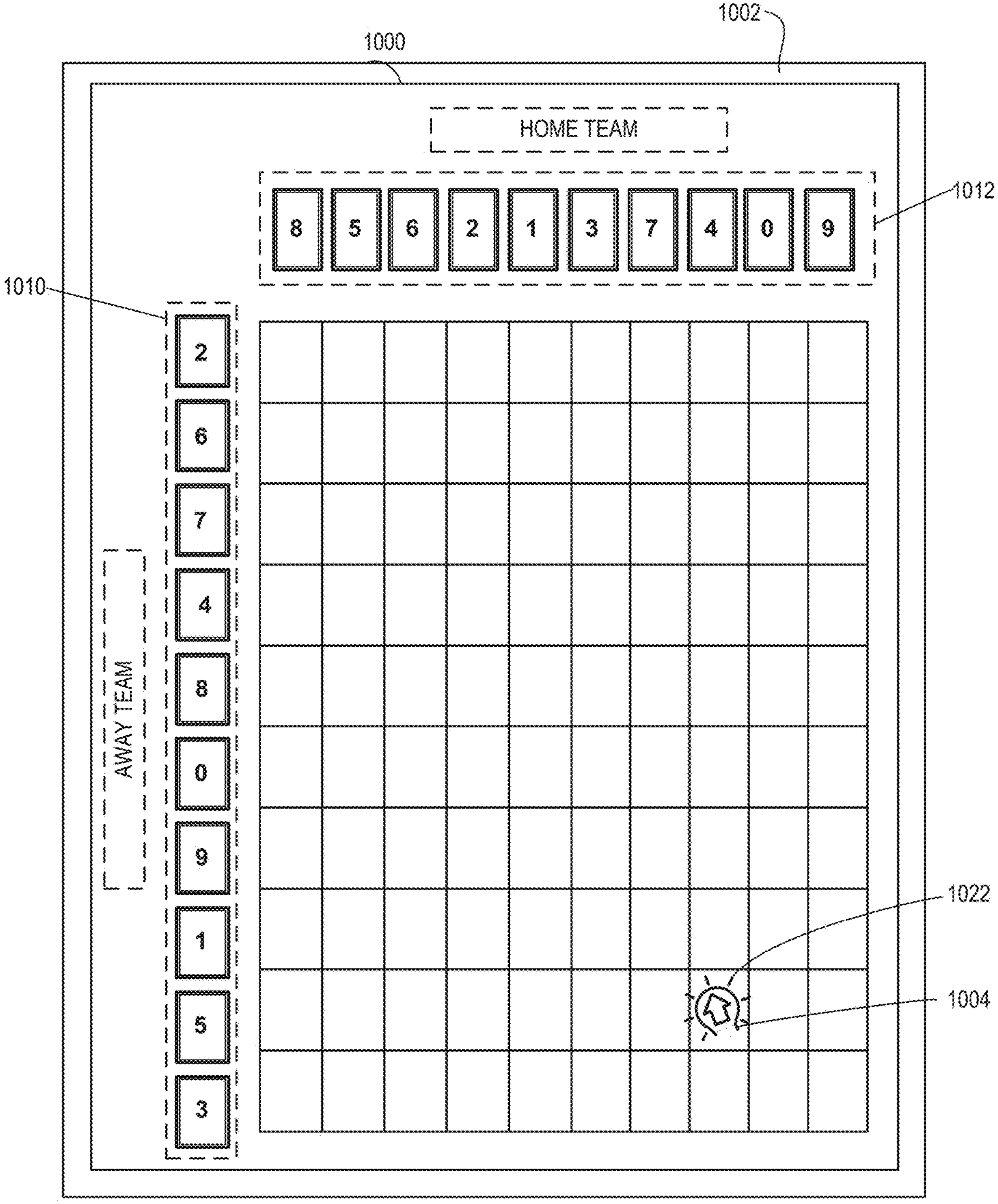
FIG. 10 illustrates an example game matrix displayed on the user-controlled electronic device and showing selection of a gaming unit, consistent with some embodiments of the present disclosure.

After the user is qualified and selects the desired house-based game matrix, the user may choose a desired selectable gaming unit 904 or desired selectable gaming units 904 as the predetermined rules of the game provide. The user has full control of which selectable gaming units 904 to purchase except, of course, selectable gaming units 904 already purchased by other users. The user chooses which selectable gaming unit 904 or selectable gaming units 904 to buy on house-based game matrix 900. As shown in FIG. 10, the user may use a mouse cursor to hover over selectable gaming units 1004 and click on selectable gaming unit 1004 to select the desired selectable gaming unit 1004. Other selection methods may be performed by the user on the various user-controlled electronic devices such as touching a touch-screen with a digit or stylus. Internet gaming platform server 510 may be configured to provide house-based game matrix 1000 with an animation 1022 or some other visually perceptible indicia 1022 that is presented in response to the selection of selectable gaming unit 1004. It is further understood that such animation features 1022 may be presented once the purchase of selectable gaming unit 1004 is complete from the user's payment account. It is understood that disclosed embodiments are configured to accept payments from users and confirm selection of selectable gaming units 1004 prior to final purchase. FIG. 10 illustrates a representative view of a gaming unit 1004 selection and associated animation in response to the selection. The user's name and information are then associated with the selected unit. In at least one embodiment, poor numbers or numbers which are unlikely to result in winning may be withheld, unissuable, or otherwise unpurchasable within a game.

At a designated time before the scheduled commencement or start of event 921, the spaces of first set of event gaming numbers 1010 and second set of event gaming numbers 1012 are filled in with numbers, as discussed. Just prior to generating first set of event gaming numbers 910 and second set of event gaming numbers 912, disclosed embodiments prevent purchase of any further selectable gaming units 904. Any unsold selectable gaming units 904 may be assigned to the entity/system administrator. If desired, a random number generator may be used to assign a random number to any unsold selectable gaming units 904 wherein all selectable gaming units 904 in house-based game matrix 900 have a number associated therewith.

Disclosed embodiments may use a random number generator to generate sets of random numbers representing first set of event gaming numbers 910 and second set of event gaming numbers 912. In many typical matrix-based games using event score 919 as the determinative metric as in football and basketball games, the numbers 0 and 1 through 9 are used. As explained in greater detail below, in other types of matrix-based games associated with other types of events or when using different metrics, the numbers may be different numbers, or fewer numbers if house-based game matrix 900 has fewer rows and columns. First set of event gaming numbers 910 and second set of event gaming numbers 912 are then randomly generated and inserted into house-based game matrix 900 where users may see what gaming numbers are associated with selectable gaming units 904 purchased by the user. The random number generator may be implemented via hardware components and generated by the system administrator, and may also be implemented via software wherein the numbers are automatically generated and inserted. A combination hardware/software method could also be utilized. It is further understood that the gaming numbers could be generated by the random number generator when initially preparing house-based game matrix 900 wherein disclosed embodiments hide the gaming numbers from users until a set time to be revealed. In further example embodiments, the gaming numbers may be randomly generated and inserted into first set of event gaming numbers 910 and second set of event gaming numbers 912 at an event set time wherein users may watch the generation/selection in real time. Additional betting options could be presented to the users watching the random generation/insertion event to add further interest and excitement to the house-based game matrix.

It is understood that there may be a significant time period between when selectable gaming units 904 are first offered for sale and when first set of event gaming numbers 910 and second set of event gaming numbers 912 are randomly generated and inserted. It is understood that internet gaming platform server 510 may be configured to offer additional wagering opportunities to users during this time frame. At least some of the additional wagering opportunities may be associated with the additional features to house-based game matrix 900 disclosed herein such as bonus awards to the user. Such additional wagering opportunities provide opportunities to engage with house-based game matrix 900 in more instances beyond a single engagement when initially purchasing and selecting selectable gaming unit(s) 904.

After first set of event gaming numbers 910 and second set of event gaming numbers 912 are randomly generated and inserted into house-based game matrix 900, users know the numbers associated with their purchased selectable gaming unit(s) 904. With first set of event gaming numbers 910 and second set of event gaming numbers 912 inserted, a completed house-based game matrix 900 is set. Internet gaming platform server 510 may be configured to display the completed house-based game matrix 900 on users' associated display devices as well as generally on the website of the system administrator entity. Upon commencement of event 921, disclosed embodiments may monitor the progress of event 921. Disclosed embodiments may be in communication with available sports data feeds to automatically update event information 914 as further described below. It is understood that individual user displays may be personalized wherein the user's selectable gaming unit(s) 904 have additional identifying indicia/animation to constantly or periodically indicate the user's selectable gaming unit(s) 904. Completed house-based game matrix 900 as displayed may also include general information associated with event 921 such as event score 919 and stage of event 921 such as time left in event 921.

Event score 919 may be updated on display 902 based on a predetermined frequency along with the other relevant information such as updated time left to play in event 921. Monitoring of event 921 may be done manually with the system administrator entering updates into the system. Monitoring may also be performed via operable connections to various available live event feeds wherein the desired event parameters are automatically communicated to the system and displayed to users such as on house-based game matrix 900 as desired. Disclosed embodiments may also cooperate with other data partners to automatically receive the desired information. During play of event 921, selectable gaming unit 904 that is "currently winning" may be highlighted, animated or have visually perceptible items associated therewith, based on event score 919 or whatever parameter is used to determine a winner. Disclosed embodiments may also send in-game messages to users to notify which user is currently winning with amount of time left in event 921 or other indication of event progress. It is generally recognized that the system is equipped with the ability to message any user at a predetermined time.

Figure 11:
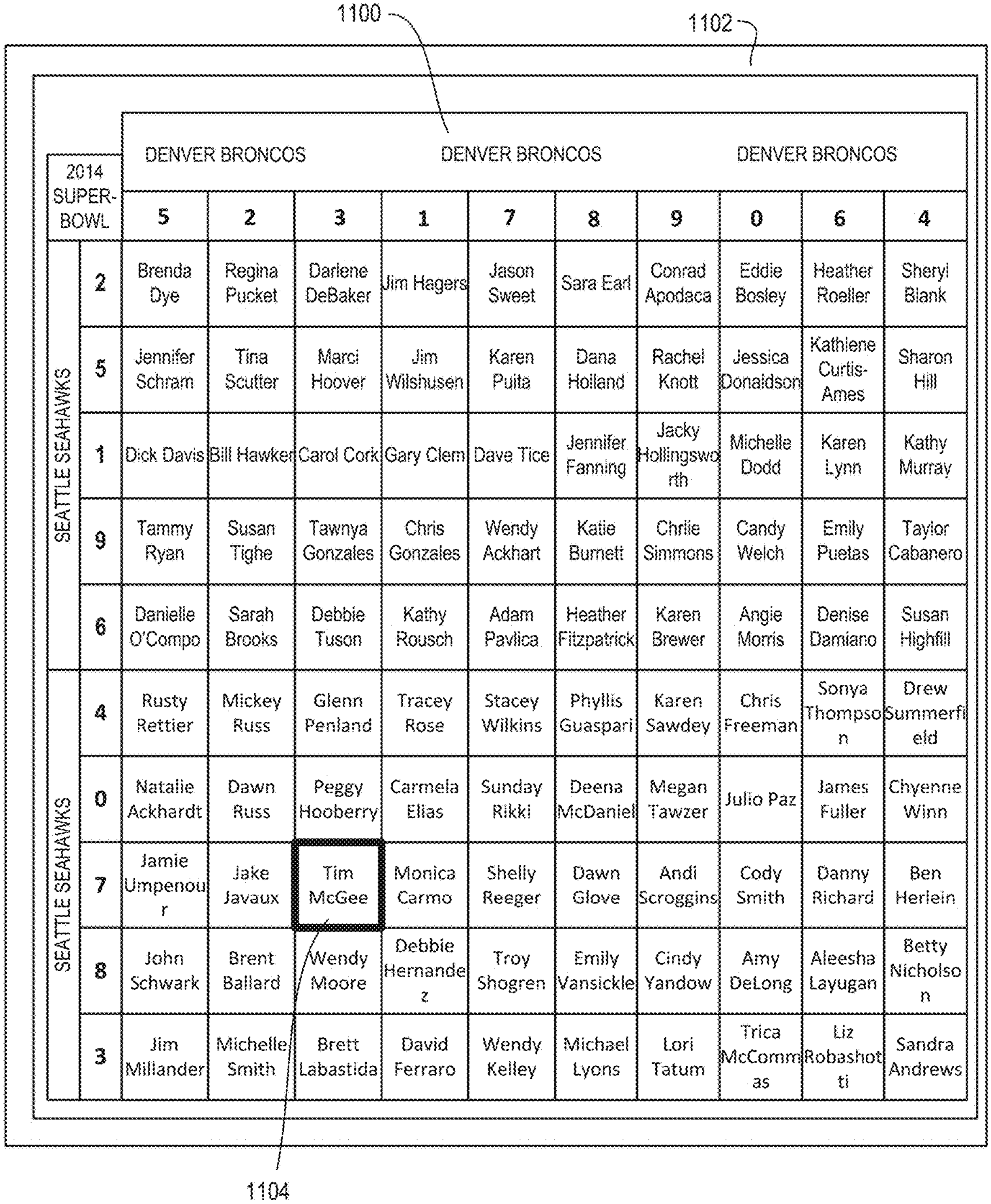
FIG. 11 illustrates a completed example game matrix displayed on the user-controlled electronic device, consistent with some embodiments of the present disclosure.

As discussed, the prizes are predetermined and designated at the start of the house-based game matrix. In at least one embodiment, funds may be required to be varied and available on a user's account before a user can participate. In another embodiment, a user can play with credits, which are not currently available in a user's accounts. In another embodiment, a user can play with bonus points or tokens or other units which are not related to a particular currency. In another embodiment, a user can play with bitcoin, crypto-currency, or other blockchain related currency or asset. The prize structure can include payouts to users of real-world currency. For example, prize money may be awarded in intervals, for example, after each quarter of the event such as the first quarter, second quarter, third quarter and fourth quarter. The fourth quarter representing the final score of the event may have an increased amount of prize money. Prize money at the various intervals may be decided by the system administrator as desired for the particular house-based game matrix and set costs of selectable gaming unit(s) 904. At the end of each interval, a winning user is determined based on selectable gaming unit 904 that is associated with the final digit of the respective score of the Home Team and the Away Team. For example, FIG. 11 represents a completed house-based game matrix 1100 for a football game. As an example, completed house-based game matrix 1100 represents the form at a final interval, or final score 919 of the football game. To determine a winner, internet gaming platform server 510 may be configured to perform a comparison of the numbers from final event score 919 of the football game first gaming number 916 and second gaming number 918 associated with selectable gaming unit 904. For example, the final event score 919 of the football game may be Denver Broncos—23 and Seattle Seahawks—17. With the respective final digits of the score being "3" and "7," selectable gaming unit 904 may be purchased by "Tim McGee." At the end of each interval or end of the football game, the comparison and determination of winning selectable gaming unit(s) 904 may be performed and may also include a reconfirming step to minimize the chance of identification errors. A system administrator may also perform a check to confirm the correct selectable gaming unit 904 has been correctly determined. Internet gaming platform server 512 may be further configured to send messages to the users owning winning selectable gaming unit(s) 904 as a notification of winnable selectable gaming unit(s) 904. After the official notification is sent to the winning user(s), prize money may be transferred to account(s) associated with the winning user(s). Internet gaming platform server 510 may also be configured to send messages to non-winning users.

Figure 12:
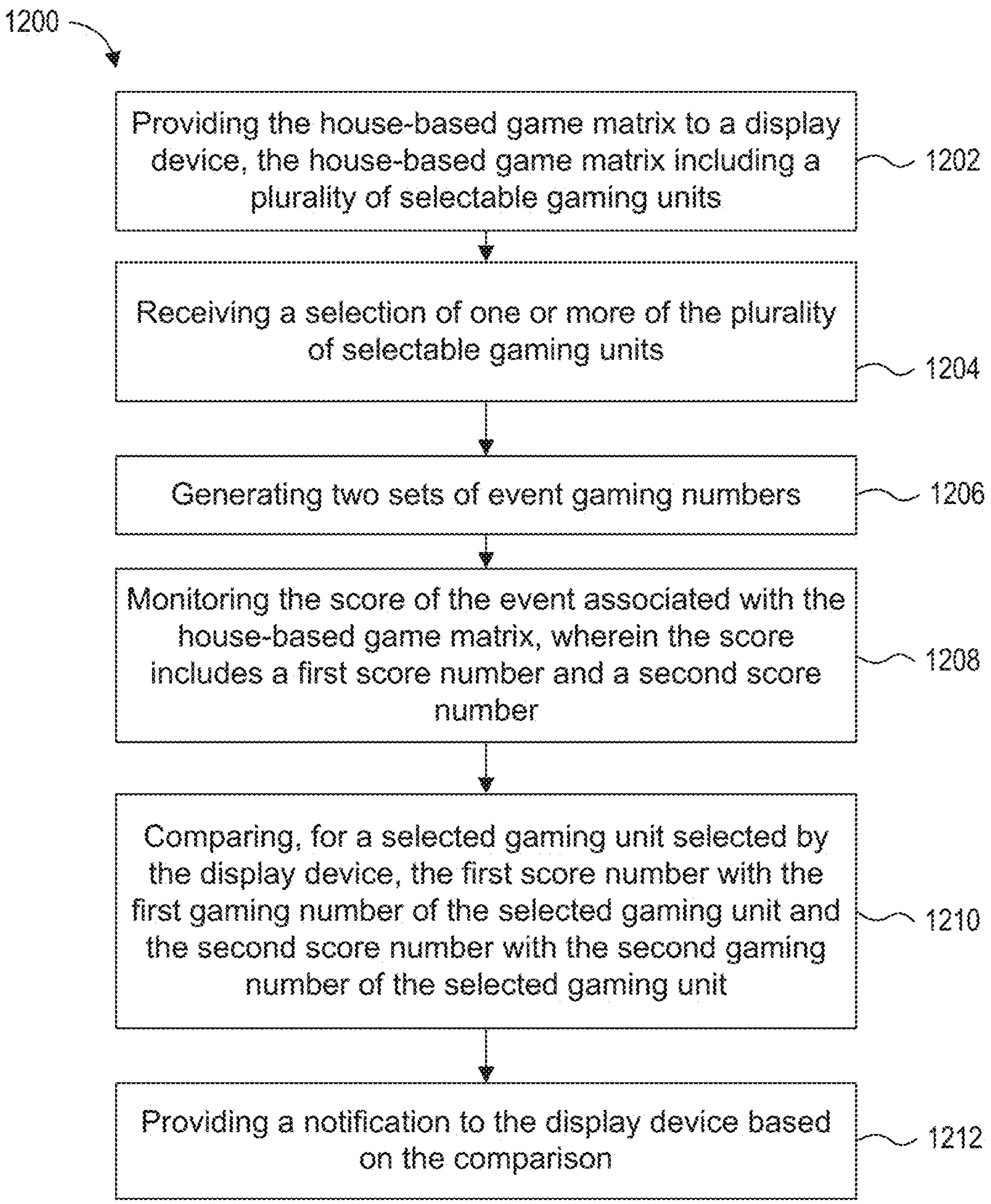
FIG. 12 illustrates an example method for implementing a house-based game matrix associated with an event, consistent with some embodiments of the present disclosure.

FIG. 12 illustrates an example method 1200 for implementing house-based game matrix 900 associated with event 921. The steps of the disclosed method 1200 may be modified in any manner, including by reordering steps or inserting or deleting steps. The steps may be performed by computing environment 200 or its components. For example, the steps may be performed by configuration 206, including at least one processing unit 202. Software 208 performed by a processor (e.g., central processing unit (CPU) or graphics processing unit (GPU) may perform the steps of method 1200 for implementing house-based game matrix 900 associated with event 921).

Method 1200 may include a step 1202 of providing house-based game matrix 900 to display device 902. House-based game matrix 900 may include plurality of selectable gaming unit(s) 904. Method 1200 may include a step 1204 of receiving a selection of one or more of the plurality of selectable gaming units (e.g., gaming units 904 of FIG. 9A). Method 1200 may include a step 1206 of generating two sets of event gaming numbers (e.g., gaming numbers 910, 912 of FIG. 9A). Method 1200 may include a step 1208 of monitoring event score 919 of event 921 associated with house-based game matrix 900, wherein event score 919 includes first score number 923 and second score number 925. As stated previously, it is appreciated that other statistics can be monitored besides score.

Method 1200 may include a step 1210 of comparing, for selected gaming unit 904 selected by the display device, first score number 923 with first gaming number 916 of selected gaming unit 904 and second score number 925 with second gaming number 918 of selected gaming unit 904. Method 1200 may include a step 1212 of providing a notification to the display device based on the comparison.

In a further example embodiment of the house-based game matrix, disclosed embodiments select users to play in the house-based game matrix based on a predetermined criteria. Thus, the selected players receive qualified player status or are qualified users based on this selection. Internet gaming platform server 510 may be configured to randomly insert the selected users into the house-based game matrix 900 and house-based game matrix 900 may be sent to all users with a suitable message regarding entry into house-based game matrix 900. In this configuration, disclosed embodiments require the user to specifically "opt-in" to the game by a predetermined input of the user (e.g., clicking on the selectable gaming unit and submitting an additional verification/confirmation of the user). Only players who opt-in are eligible to collect prize money on winning selectable gaming units 904. In this configuration, users who are actively engaged with the system win the prize money.

Figure 13:
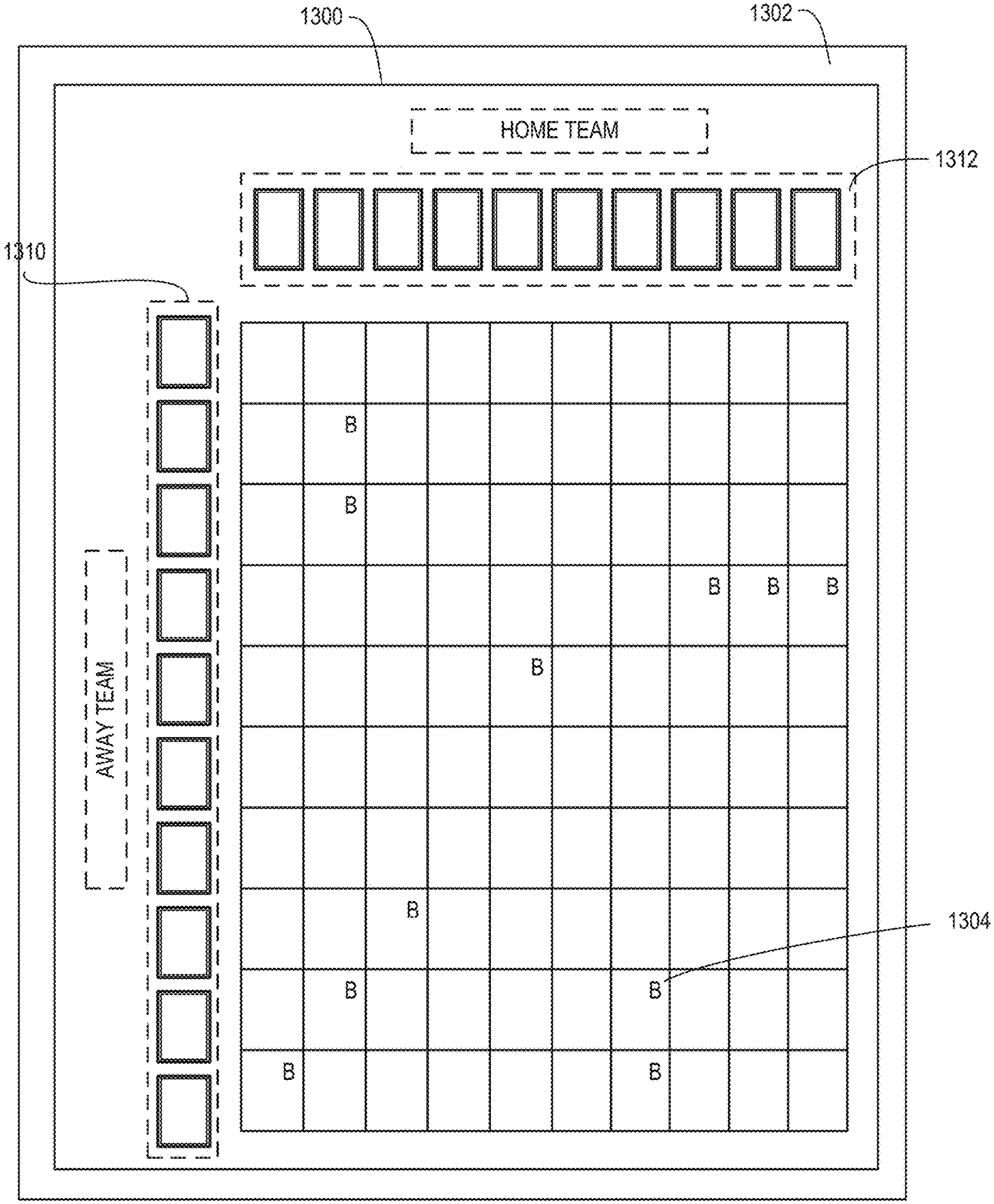
FIG. 13 illustrates an example game matrix displayed on a user-controlled device and showing certain gaming units designated with a bonus award, consistent with some embodiments of the present disclosure.

Disclosed embodiments may provide bonus gaming unit or gaming units that are initially designated to have an increased prize value associated therewith. A prize value may be fixed or variable. Variable prize values may, for example, vary based on loyalty status or value of patron to operator's business. The increased prize value could be an increased monetary value, e.g., an additional real-world currency amount, or some other component having value to the user. Internet gaming platform server 510 may be configured to designate a random number or set of selectable gaming units 904 to have bonus rewards or modifiers if selectable gaming units 904 are a winning selectable gaming unit 904 during any one interval, multiple intervals or designated interval of event 921. These designated selectable gaming units 904 are invisible to the users when the users are selecting gaming units 904 for purchase. FIG. 13 illustrates house-based game matrix 1300 having a plurality of selectable gaming units 1304 designated to have a bonus award attached thereto, represented by the letter "B" in selectable gaming unit 1304. It is understood that the designation could take other forms and disclosed embodiments may track the bonus unit designation in alternative forms. After house-based game matrix 1300 is completed with first set of event gaming numbers 1310 and second set of event gaming numbers 1312, bonus selectable gaming units 1304 are illuminated on house-based game matrix 1300 and viewable to the users. It is understood the letter "B" indicia could be illuminated on house-based game matrix 1300 or some other indicia/animation or other visually-perceptible indicia could be used. Showing the user bonus gaming units 1304 even when not selected by the user shows that the user had a chance at the enhanced reward if the user had chosen different selectable gaming units 1304. This reinforces the idea of the user having a chance of getting lucky in the gaming unit selection for an enhanced reward and further promotes the idea of having "lucky" patterns in gaming unit selection or gaming units that may be selected in subsequent house-bases game matrices. If one of the bonus gaming units is a winning unit in house-based game matrix 1300, the user owning selectable gaming unit 1304 receives the bonus or enhanced reward.

Disclosed embodiments may be configured to assign a random number or set of selectable gaming units 904 for bonus rewards that are specifically tailored to a particular user. The number of bonus gaming units designed or the amount of the enhanced reward may be designated based on the status of the user. A user that is a more frequent participant or a high value wagerer may have more enhanced rewards associated with their respective bonus gaming units. A more frequent participant or high value wagerer could also have more selectable gaming units 904 designated for bonus awards increasing the chance that such user selects selectable gaming unit 904 with a bonus award attached thereto. It is further understood that disclosed embodiments may be configured to set the amount of bonus gaming units also in view of the number of gaming units left to be purchased as well as based on some other status of the user. Finally, disclosed embodiments may be configured such that in response to the user selecting selectable gaming unit 904, internet gaming platform server 510 may be configured to attach a bonus award to selectable gaming unit 904 based on a predetermined award criteria associated with the user.

The bonus award associated with bonus selectable gaming unit 904 may take various forms. The reward could be a money multiplier where if the user's bonus selectable gaming unit 904 is a winning selectable gaming unit 904, the prize money is doubled, tripled or increased by some other factor. Thus, internet gaming platform server 510 may be configured to confirm that winning selectable gaming unit 904 has a bonus award attached thereto and in response, deliver the bonus award to the user. The award could also be that the user is allowed to select another gaming unit at no further charge to the user. The award could also be a ticket for another promotion from the entity (e.g., bingo games, scratch lottery tickets or other games) or entry into other games administered by the entity such as ticket to a slot tournament. The award could also be bonus money awards to be used in other betting with the entity system and also real-world currency awards. It is further understood that depending on the form of the bonus award, the bonus award could be paid to the user at various times such as an immediate payment to the user. Finally, the bonus award could be selectable gaming unit 904 itself such as a user winning a bonus award in the form of a free gaming unit to the user to participate in the house-based game matrix.

Disclosed embodiments may also be configured to provide a level system, or progress system, that allows a user to obtain enhanced winning probabilities in the house-based game matrix or other awards. Disclosed embodiments encourage user replayability and motivates users to interact with the house-based game matrix from more than just an initial selectable gaming unit purchase. With the level system, or progress system, the system sets predetermined wagering requirements for users to meet or exceed. When the user completes the wagering requirements, the house-based game matrix may be enhanced or the potential reward for a winning selectable gaming unit may be amplified.

Disclosed embodiments may include a specific wagering requirement wherein once a user places wagers that achieves the wagering requirement, such as a first cumulative monetary amount, the user is considered to reach a first level L1. It is understood that the wagers may be made in other games offered by the entity in association with internet gaming server platform 510. The user must wager "X" amount of money that corresponds to the wagering requirement. The wager of "X" amount of money may take the form of a single wager, or smaller, incremental wagers that, cumulatively, over an allowed period of time, also add up to "X" amount of money. It is understood that larger wagering requirements may also be set to define multiple sequential levels such as a second level L2 by wagering a second cumulative monetary amount, a third level L3 by wagering a third cumulative monetary amount and so on as desired. The second cumulative monetary amount is greater than the first cumulative monetary amount, and the third cumulative monetary amount is greater than the second cumulative monetary amount. The user's goal is to achieve the next level by placing additional wagers to achieve the next wagering requirement. By achieving the next wagering requirement and next level, the user may receive level awards as described below. It is also understood that the level system may also be used as a way for a user to qualify or be invited to participate in the house-based game matrix as described above regarding qualification. It is also understood that the user may achieve the first level or the second level in a time frame between a start of the house-based game matrix when selectable gaming units are available for purchase and the start of event.

The awards associated with completing a set wagering level may also vary. In one example embodiment, the award may be that the user is allowed to select an extra selectable gaming unit at no further cost to the user. The award could also be that a single purchased selectable gaming unit or all purchased selectable gaming units have a winnings multiplier associated therewith. The award could also be a chance to play a separate game for a chance to attach a bonus to a purchased selectable gaming unit. For example, upon completing a set wagering level, internet gaming platform server 510 may be configured to display on the user's device a single turn game such as a spinning wheel or a slot machine. For example, with respect to the house-based game matrix, internet gaming platform server 510 may be configured to temporarily replace house-based game matrix 904 on display 902 to the single turn game for the user to play. The user is allowed one turn and if the user achieves a win in the separate game, the system attaches a bonus award to the user's purchased selectable gaming unit 904. This could also be provided as a choice to the user, such as if the user is unhappy with first set of event gaming numbers 910 or second set of event gaming numbers 912 associated with the purchased selectable gaming unit 904. It is further understood that the awards for achieving levels may increase in value to the user as the number of levels increases.

Disclosed embodiments may also be configured to offer users boost tokens. Boost tokens exist as a form of currency for users to use in various ways in association with the house-based game matrix and such other games offered by the entity in the internet gaming platform server 510. The boost tokens may also be used in conjunction with the level system as further described below. In particular to house-based game matrix 900, boost tokens may be used during the time frame when house-based game matrix 900 is first opened for the purchase of selectable gaming unit(s) 904 on house-based game matrix 900 and the start of event 921 associated with house-based game matrix 900. Use of boost tokens provides incentive for users to interact with house-based game matrix 900 more often after initially purchasing selectable gaming unit(s) 904. In returning to house-based game matrix 900 prior to the start of event 921, the user may monitor progress of levels progressions and potentially use the boost token to increase the chances of winning house-based game matrix 900 or increasing prize money if being determined to have winning selectable gaming unit 904.

Users may acquire a boost token in multiple different ways. The user could simply purchase a boost token such as through a loyalty store, or loyalty component in the system operated by the entity. In one example, the boost token allows the user to select another selectable gaming unit 904 in house-based game matrix 900 at no further cost to the user. It is understood that the user may have achieved a certain preferred status with the entity allowing the user the opportunity to purchase the boost token. It is further understood that the cost of the boost token is less than the cost of purchasing selectable gaming unit 904 directly in house-based game matrix 900. In another example embodiment, a user may receive a boost token by referring a new user to the entity in general or also a specific new user to house-based game matrix 900 who has purchased selectable gaming unit 904 in house-based game matrix 900 for the first time. The boost token awarded to the referring user may provide the user enhanced prize money if obtaining a winning selectable gaming unit 904 or award a new level status for the user in the level system described above. For example, if the user had achieved a level one status L1, then the user is automatically moved to the level two status L2 and obtains all available awards associated with level two L2.

It is further understood that the awards associated with the boost tokens may take other modified forms. The award may be a form of currency from the entity to be used for wagering in other entity games on the gaming platform server. The award may also be a level advancement in the level system as discussed. The award may also be a multiplier where prize money awarded for winning selectable gaming unit 904 is multiplied by a certain factor, e.g., two times, three times etc. The multiplier associated with the boost token may be applied to all of a user's purchased selectable gaming units 904 or a selectable gaming unit 904 or group of selectable gaming units 904. The award from the boost token could also be an extra selectable gaming unit 904 to the user as discussed. Finally, similar to the level system, the user may be provided with bonus rerolls in a separate game that appears on the user's display. For example, if a user is unhappy with first set of event gaming numbers 910 and second set of event gaming numbers 912 associated with selectable gaming unit 904, and event 921 has not yet started, the user having a boost token may use a bonus roll to win a bonus award to attach to purchased selectable gaming unit 904. In at least one embodiment, a boost token can expand the cells covered by a square from 1 to a certain number of cells, move a square a certain number of cells in a given direction, or manipulate a square's cell coverage in different ways. For example, prior to the winning cell being revealed, in which case the square would cover more cells than an unboosted square. As another example, boosted squares cannot move to adjacent cells or cover more than one cell, but can "win" if the winning cell was adjacent to the square's cell, e.g., full or consolation prizes could be awarded in this example. In such an example without a grid of x by y cells, squares that are associated with more than one cell due to being boosted could have a + or − sign displayed on them. For example, a square that wins on 7, 8, or 9 for the away team and 1, 2, or 3 for the home team, can take the appearance of: 8+/−|2+/− and/or dynamically change the number displayed on the square to more favorable odds for the user given the existing score.

In at least one embodiment, a game engine can generate a squares game to include the notion that prizes to users with winning squares may be fixed or variable, with the latter's value associated with a table that pays the smaller denomination prizes at a different/higher frequency than the larger prizes? For example, for professional basketball games, winning squares can win $10 k 0.5% of the time, $1 k 3%, $100 10%, $50 20%, and $25 66.5%.

Disclosed embodiments may also be configured to provide interactive features relating to the boost token and level system. Based on obtaining a particular boost token or achieving a certain level, the system may be configured to insert an additional game into the house-based game matrix. In one example embodiment, a user may be presented with an interactive boost token, which does not provide an automatic award upon presentation. Once the user uses the token through some user input or an input associated with the system, through instructions associated with the interactive boost token and system, internet gaming platform server 510 may be configured to temporarily replace house-based game matrix 900 on the user's display device with a new indicia. The new indicia may be in the form of a new temporary game such as a slot machine game board or other sports-related field game. The temporary game automatically rolls/spins in the style of a traditional slot game and outputs a combination of icons/characters. If the outputted icons/characters represent a winner in the system, the user receives an additional prize or bonus. The prize or bonus may take various forms as described herein. In one example, the user may receive a bonus that provides a prize money multiplier for any selected gaming unit 904 determined to be a winning selectable gaming unit 904. Once the play of the temporary game is complete, the display of the temporary game is removed and the system again displays house-based game matrix 900. The interactive boost token could also have a sports-related theme as desired. Similar to the above description, when the user uses the token through a user input, house-based game matrix 900 may be temporarily removed from the user's display device and a sports-themed display appears such as a soccer field and goal along with a ball. The user is provided an opportunity to roll/spin via user inputs to "score a goal" by placing the ball in the goal. If a goal is scored, the user is provided an award as described herein. For example, the user may be awarded an extra selectable gaming unit 904 in house-based game matrix 900.

The interactive boost token concept may also be incorporated into the level system. Achieving a new level may not automatically provide a new award to the user. Upon achieving a new level, however, house-based game matrix 900 may be temporarily removed from the user's display device and a new indicia is displayed. The new indicia may be in the form of a new temporary game. The user is provided a single play of the temporary game and if determined a winner as a result of the play, the user is provided an award as described herein. In one example, the temporary game may be in the form of a minesweeper game where the user, by clicking on any gaming unit, has a chance to get a mine and blow up and lose and get nothing, or select a winning gaming unit to receive an award as described herein such as an extra gaming unit in the house-based game matrix.

Another supporting feature of the house-based game matrix according to example embodiments relates to system user messaging. At various times in the house-based game matrix process, the system or system administrator may send messages to users who have purchased selectable gaming unit(s) 904. In the time frame between the generation first set of event gaming numbers 910 and second set of event gaming numbers 912 and the start of associated event 921, the system may send a message to a user to offer any of the bonus awards described herein if the user places an additional wager in the system. The message may also be just an offer to place additional wagers not attached to any further bonus. During play of event 921, the system may also send a message to a user(s) to offer additional betting options. For example, a user may place an additional wager to attach a bonus award to one or more of the user's selectable gaming units 904. The offers via user messaging may also have a time limit attached thereto wherein an additional wager must be placed within a predetermined period of time. It is further understood that any of the messaging described herein may be performed by the system via pop-up messaging, push notifications, text messaging, or email notifications.

Disclosed embodiments may also provide a chatroom for users to engage in further communication. Users may communicate about the house-based game matrix itself or the event that may generate further interest in general as well as potentially spur additional wagering. The system administrator may also enter the chatroom for communicating about the house-based game matrix or live sporting event.

Disclosed embodiments may also be configured to offer the user incentives for daily betting on events offered on the internet gaming platform server such as by betting a predetermined consecutive number of days. Upon meeting such a requirement, a user may be offered an opportunity to play in house-based game matrix itself as a reward for consistent betting. Betting a predetermined number of consecutive days could also be used as a qualification criteria for a user to be eligible to participate as a user in the house-based game matrix.

Bettors and wagerers are familiar with a betslip. A betslip in traditional terms refers to the piece of paper used to write down a wager. With online gaming, the betslip is a digital betslip displayed on the user-controlled electronic device. The betslip includes the details regarding the user's wager. There may be multiple wagers listed on the betslip as well as different types of wagers on different games or events.

Figure 14:
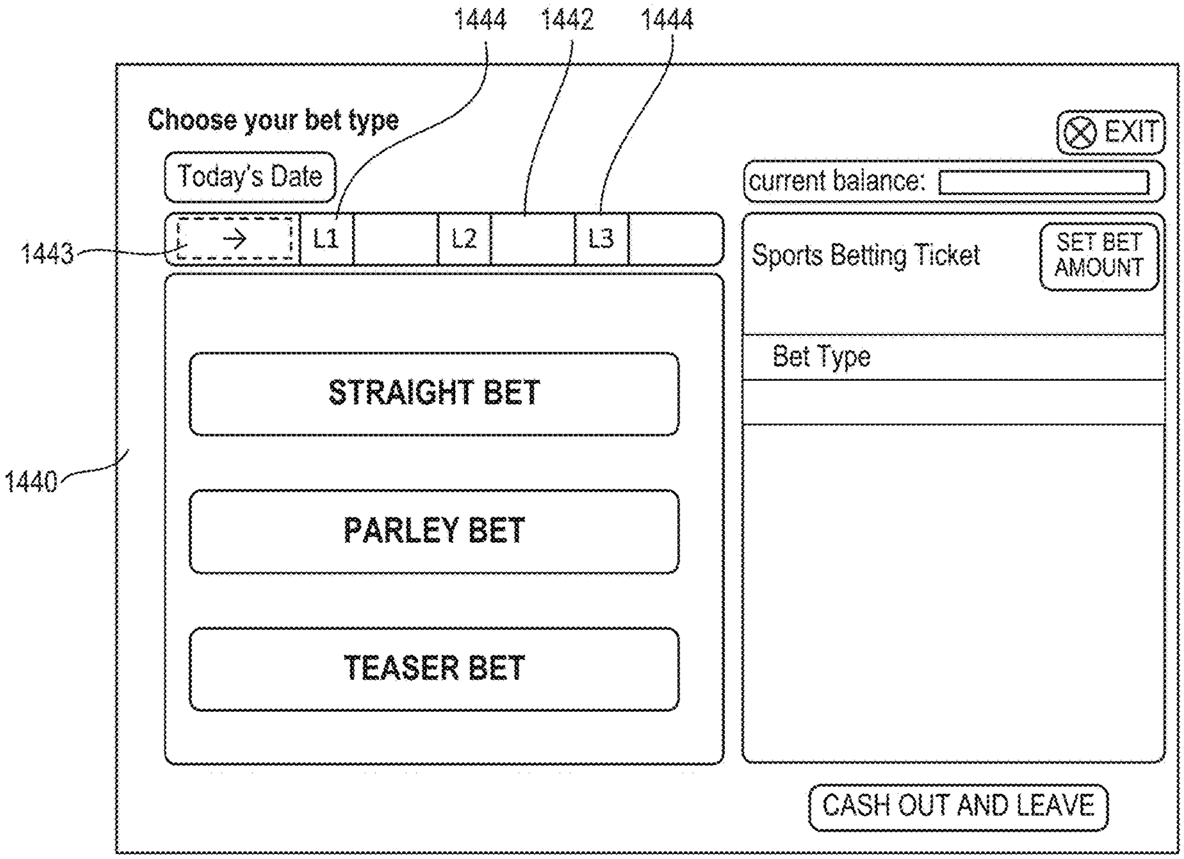
FIG. 14 illustrates a view of an example digital betslip showing a wager level indicator, consistent with some embodiments of the present disclosure.

In some example embodiments, a progress bar may be displayed as part of a user's digital betslip. FIG. 14 illustrates an example betslip in digital form such as displayed on a user's display. Betslip 1440 has progress bar 1442. Progress bar 1442 may include wager level indicator 1443 that is always part of the display of betslip 1440 to the user. Wager level indicator 1443 is operably associated with the level system and tracks all of the user's wagers within the system. Wager level indicator 1443 may include demarcation indicia 1444 indicating how close the user is to achieving the next level and therefore the next award. In further example embodiments, wager level indicator 1443 may include animations where wager level indicator 1443 is "filled up" with indicia to show the progress achieved by the user based on the user's wagers. Wager level indicator 1443 on betslip 1440 may provide direct and real-time feedback at the time of making new bets wherein the user may make wagering decisions accordingly.

Disclosed embodiments may also have a loot box feature. The loot box is associated with the user and contains the awards obtained by the user. For example, a boost token awarded to the user may be placed in the user's loot box until used by the user.

The house-based game matrix is typically played by individual users with a designated winner or multiple winners if sub-events are specified in the game. It is contemplated that a leaderboard could be incorporated into the system to create a multi-player competition over several different house-based game matrices. The leaderboard may show users based on levels achieved or users having the most winning gaming units.

The house-based game matrix may be associated with a live sporting event such as a football game as discussed above. It is understood that the live sporting event could be from other sports or even other events that lend itself to wagering. While the score of a live sporting event is often used to determine the winner of the house-based game matrix, it is understood that other game parameters may be used to determine the winner. It is also understood that similar data feeds may be used as described above to facilitate monitoring of the live sporting event and updating of the house-based game matrix in these embodiments as well.

For example, the live sporting event may be a basketball game. The operation of the house-based game matrix in association with the basketball game may operate similarly as discussed above. The score of the basketball game may be used as the parameter to determine the winner of the basketball house-based game matrix. Other basketball related statistics could also be used as the determinative parameters. Such parameters may be rebounds, turnovers, total team fouls as well as other categories that relate to basketball.

The live sporting event may also be a baseball game. The house-based game matrix could use the final score of the baseball game as the parameter to determine the winner. It is not uncommon for baseball games to have lower scores as compared to football and basketball games. Thus, a baseball game may use an alternative parameter such as total team pitch count in the game. The pitch counts may also be incorporated into baseball visualizations. Other baseball-related game parameters may be used.

The live sporting event may also be a hockey game. The house-based game matrix may use the final score of the hockey game as the parameter to determine the winner. Similar to baseball, it is not uncommon for hockey games to have lower scores as compared to football and basketball games. Thus, a hockey game may use an alternative parameter such as total team shots on goal in the game. The hockey shots on goal may also be incorporated into hockey visualizations. Other hockey-related game parameters may also be used. It is understood that soccer matches could be implemented similarly to hockey game.

The live sporting event may also be a tennis match. As tennis scoring may be kept somewhat differently than other competitions, the house-based game matrix may take other forms such as a lesser number of rows and columns. Game parameters used to determine a winner could be total games in all sets of the match. Other tennis-related parameters may also be used such as aces in a set or points in a set. A tennis-based matrix may have lesser numbers of rows and columns, and it is understood that other games or versions of games described herein may also utilize matrices of various sizes.

The live sporting event may be a boxing match. Total punches thrown by each boxer or total punches landed by each boxer may be used as parameters for determining a winner.

The live sporting event often focuses on the competition between the Home Team and the Away Team and the final score of the event. It is further understood that the house-based game matrix may also be associated with a competition between individual athletes on the teams. For example, in a football game, the teams may be switched to the starting running backs for each team wherein the parameter for determining winning gaming units is total rushing yards, total rushing and receiving yards, or even total all-purpose yards. Starting quarterbacks may also be used with passing yards as the parameter used for determining winning gaming units. Similarly, wide receivers may be used with receiving yards as the determining parameter. Finally, a player from each basketball team may be used with total points scored as the determining parameter. Depending on the makeup of certain sports teams, it is contemplated that two players on the same team may form the basis for a house-based game matrix.

The house-based game matrix may also be modified to include a plurality of sub-events in association with a live sporting event. In an example, the house-based game matrix may include a first sub-event with a plurality of users present in a room of the system. A winner may be determined at the end of the sub-event. A new sub-event may immediately start with the same participants in the same room for the next sub-event. This process may continue until the end of the live sporting event. For example, a football or basketball game may have four sub-events divided by four quarters. In a baseball game, there may be nine sub-events based on the nine innings of the baseball game. A hockey game may have three sub-events for each of the three periods of the hockey game. The house-based game matrix utilizing sub-events may also be structured such that after the winner is determined for the initial sub-event, a new sub-event may immediately start with new participants in a new room. This process may also repeated until the live sporting event is over.

Qualification requirements could also be incorporated into the sub-events similar to the requirements discussed above. For example, eligibility to participate in a first sub-event would require a user to have wagered a predetermined minimum amount on the live sporting event associated with the sub-event (e.g., a $20 pre-match bet on the live sporting event). Eligibility to participate in each subsequent sub-event (e.g., quarter, inning or period), is tied to the user having wagered an in-game/live bet during the current sub-event. For example, if the user wagered $20 or more in-play during a first quarter of a game, the user may be eligible to wager for the second quarter of the same game. Similarly, if the user wagered a predetermined minimum amount in a second quarter of the game, the user may be eligible to wager for the third quarter of the game. Thus, live wagerers may be prioritized for selection to participate in the next sub-event.

As described herein, the system may be configured for communicating with users in various methods and at various times before, during and after the house-based game matrix. The system may also have additional communication capabilities. For example, users may be able to log into the system for wagering. Upon logging in, the system may present a pop-up notification of a newly opened house-based game matrix and the parameters for qualifying for the house-based game matrix. Further periodic promotions may be sent to the user during the time selectable gaming units 904 are open for purchase and before the start of the associated live sporting event 921. An "Indicator On" feature may also be utilized with user logged in to the system. Messages may be sent via pop-up message, text messages, push notifications and email messages, whether on a mobile user platform or a web-based platform. Further to the messaging described above, additional messaging may include: new house-based game matrix open for gaming units purchase, results of house-based game matrix including sub-events results and final results and boost token received. If the boost token has a time limit associated therewith, the system may send a message(s) advising how much time is left to use the boost token. Similarly, the system may send messages at certain predetermined times before a house-based game matrix closes for purchase of selectable gaming units. Such messages may also include how much time is left to progress through levels in the level system before the house-based game matrix is closed. Other messaging may include when promotions are live or ended, when a live sporting event has ended, or when new house-based game matrices have opened for selectable gaming units purchase. While the system messages users having winning gaming units, the system may send announcements to a wider user audience such as a winning user having a high reward modifier/multiplier or winning a particular promotion or bonus. Regarding the mobile platform, slide programs may be utilized for preparing tutorials on playing the matrix-based games. The slides may include specific information regarding the various bonuses and level system and how to progress through the levels.

Various user interface features have been described above that assist in enhancing the experience for users in playing the house-based game matrix. The user interface may easily be modified around the various different events that may be associated with the house-based game matrix. The various bonus awards may be listed in easily understandable formats to users. The progress system or levels system may be explained in the aforementioned tutorials and progress bar 1442 may be a constant display in user's digital betslip 1440. As discussed above, the system may include various animations in the user interface to enhance the user experience. Various aspects may be animated including: gaming unit choice, level progression, boost token usage, bonus unit reveals/landings, user winning gaming units, user losing gaming units, live sporting event updates, and the progression bar display on the betslip. The complexity or magnitude of the animations may also increase with achieving high levels in the game or achieving higher bonuses or multipliers. Such animated messaging provides impact to the users, further enhancing user experience. Audio messages may also be incorporated with the animations or exist as standalone messages.

Figure 15:
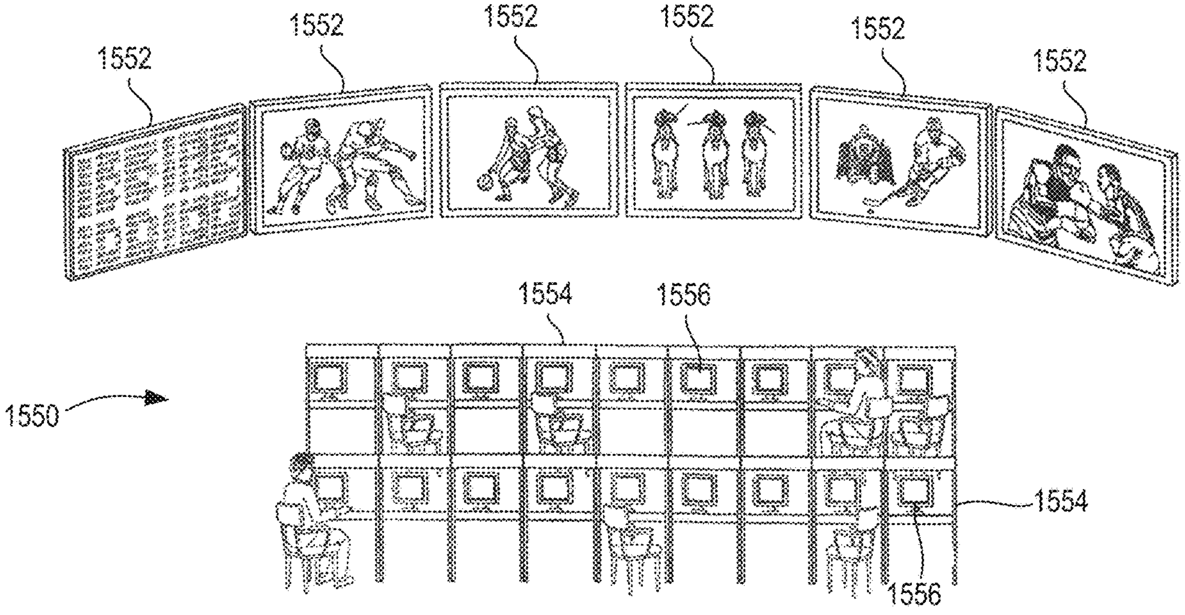
FIG. 15 illustrates a schematic view of an example casino sportsbook environment, consistent with some embodiments of the present disclosure.
Figure 16:
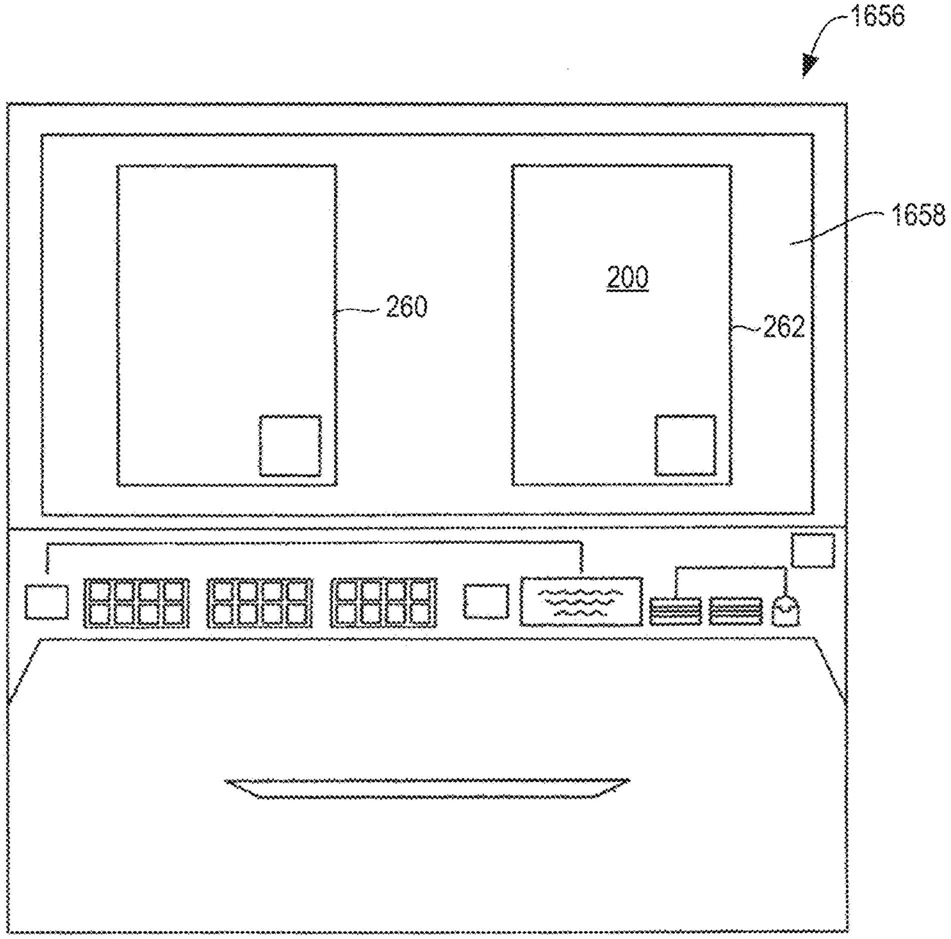
FIG. 16 illustrates a view of a display of an example gaming terminal used in the casino sportsbook environment, consistent with some embodiments of the present disclosure.

The system and methods have been described herein in an online gaming configuration where users may access internet gaming platform server 510 via the internet. It is also contemplated that house-based game matrix 900 may be implemented in a casino environment. In one example, house-based game matrix 900 may be implemented in a sportsbook room of a casino. FIG. 15 illustrates a representative view of sportsbook room 1550 of a casino. Sportsbook room 1550 may typically include, among other things, plurality of televisions 1552 of various sizes showing a variety of live sporting events 921. Sportsbook room 1550 may further include plurality of carrels 1554 wherein each carrel 1554 includes gaming terminal 1556. A user 900 may sit in carrel 1554, watch live sporting events 921 on televisions 1552 while wagering via gaming terminal 1556. FIG. 16 illustrates a schematic close-up view of gaming terminal 1656 including display screen 1658 of gaming terminal 1556. The system may be configured such that first segment 260 of the display screen displays one of a plurality of casino games and second segment 262 of the display screen displays information regarding house-based game matrix 900. The user 900 may place wagers on one of the casino games and house-based game matrix 900, or both. It is understood that in a casino sportsbook environment, the operational and communication capabilities of the system use the same types of structures as described above. Gaming terminal 1556 may be in operable communication with internet gaming platform server 510 operated by the casino entity.

FIGS. 17A and 17B are examples of quantifiable competition statistics for an event that includes probabilities of a gaming unit being a winning unit consistent with some embodiments of the present disclosure. FIG. 17A includes a first column that represents runs that a first team scored and row two that represents runs that a second team scored, e.g., final scores at the end of game. For example, FIG. 17A illustrates quantifiable competition statistics for a baseball game with runs 1705. FIG. 17A illustrates that there is a 0.50% chance than both teams score zero runs. As another example, the probability of a first team scoring 9 runs and a second team scoring zero runs is 0.7%. The probability of one team having one run total and another team having another run total is an example of quantifiable competition statistics. A gaming unit (e.g., a square) can be associated with a probability of an event occurring. For example, a square can be selected by users, where that square is associated with a first team scoring a certain number of runs and a second team scoring a different number of runs. In at least one embodiment, an awards system assigns users gaming units (e.g., squares) based on probability outcomes of the events. For example, an award system can assign to users squares that are more likely to win or a an award system can suggest that a user select gaming units that are more likely to win. FIG. 17B illustrates quantifiable competition statistics for hits in a baseball game. FIG. 17B illustrates that hits 1710 for a first team (first column) and a second team (second row) and the probability that the hits at the end of a game will be particular values. For example, the probability that the first team and second team will have zero hits at the end of a game is 0.9%.

FIGS. 18A, 18B, and 18C are examples of a bingo game played in accordance consistent with some embodiments of the present disclosure. FIG. 18A includes four columns and eight rows and information about a basketball game where team "A" is playing against team "B." FIG. 18A includes clock information in column 1 that includes time in the game and corresponding number of points for each team. For example, row 2 shows that the game has 12:00 minutes (and starts at 12:00 and then counts down) and each team has zero points, row 3 shows that team A scored 3 points at 11:40 and team B has still not scored, and row 8 shows that team A has scored 12 points and team B has scored 2 points. FIG. 18 includes column "SQ" which represents a two-digit number, where the first digit represents points of team A (e.g., the last digit in team A's score) and second digit represents points for team B (e.g., the last digit in team B's score). For example, SQ is 00 when both teams A and B have scored zero points (row 2), SQ is 30 when team A has scored three points and team B has still not scored, and at 7:45 in the game team A has scored 12 points while team B has scored 2 points, which results in an SQ of 22 (e.g., the second digit of team A's score is used as the first digit in SQ). In at least one embodiment, this information shown in FIG. 18A can be used to generate a bingo card. While FIG. 18A relates to a basketball game, a game engine can generate FIG. 18A for different events, e.g., different games and different sports events. For example, a game engine can generate FIG. 18A for an event related to a hockey game (e.g., ice time, goals, shots, penalties), football game (e.g., number of touchdowns, field goals, points, penalties), soccer game (e.g., yellow cards, red cards, assists, shots on goal, shots not on goal), volleyball game, lottery game, or other game that can be wagered on.

FIGS. 18B and 18C represent bingo cards or displays that can be generated by a game engine and distributed to users. For example, if a user has placed a wager on a game and the game engine can simultaneously provide an additional game, e.g., bingo card, to the user, where the game engine can provide this bingo card or several bingo cards to a user. In at least one embodiment, FIGS. 18B and 18C are not associated with a particular wager and instead a game engine provides these bingo cards to a group of users, who are loyal, frequently play games, or just want to play the bingo game (e.g., with or without a wager). In at least one embodiment, FIGS. 18B and 18C are associated with a promotion of an event (e.g., the Superbowl football game) and include 10 or more squares, where each square corresponds to an occurrence of an event within the event (e.g., time of game, number of players who play in game, kickoff time, halftime length, number of timeouts called).

FIGS. 18B and 18C include 3 columns and 3 rows, where each square can represent a square in a bingo game and corresponds to a value in FIG. 18A (e.g., data generated by an event). While FIGS. 18B and 18B include a 3-by-3 bingo card, any size bingo card (e.g., 5-by-5, 10-by-10) or bingo-like representation can be used. As shown in FIG. 18B with the gray highlighted boxes, a user holding this bingo card has won because the user has 3 squares in a row (e.g., "30," "82," and "02"). In at least one embodiment, a rewards engine can provide a reward (e.g., cash, points, credits) to a user who has won a bingo game as shown in FIG. 18A. As shown in FIG. 18C, a bingo card has not won yet, but some values of the bingo card have been filled because the events corresponding to bingo squares have occurred as shown in FIG. 18A (e.g., "30," "60," "22," and "02").

In at least one embodiment, a game engine can generate bingo cards by using a random number generator for values of squares. In at least one embodiment, a game engine can generate bingo cards using statistics of scenarios from events (e.g., average number of hits in baseball per inning, average number of penalties, average number of points in a quarter). In at least one embodiment, a bingo card is displayed on an electronic device, e.g., via a user interface as shown in FIGS. 9A and 9B. In at least one embodiment, a game engine generates bingo cards before an event, during an event, or after an event to increase user engagement with an event. In at least one embodiment, a game engine can generate customer rules for a bingo game (e.g., it is required to have a complete row or column filled in to win, it is only required to have 4 out of 5 squares in a row filled in to win, or a winner is a user who has the most number of squares in a row after an event has finished).

The entity owning the system owns and has access to various metrics associated with the users. With the various types of bonuses and awards offered by the system, the entity may track and analyze such data to enhance future configurations of the house-based game matrix. The entity may track the number of users qualified versus the number of users buying selectable gaming units 904. The entity may also track user levels and game playthroughs. The entity may further track the number of boost tokens used and the average wager amounts before the event starts as well as during play of the event.

The present application discloses many different features according to example embodiments. It is understood that the systems and methods described herein may include various combinations of the various features without departing from the broad aspects of the example embodiments. For example, during play of the live event associated with the house-based game matrix, if desired, disclosed embodiments may limit the amount and level of potential bonuses. This configuration keeps in-game activity to a minimum so that users may also watch and enjoy the live event.

Here are examples of the present application in clauses, which are illustrative.

Clause 1. A system for hosting a matrix game associated with an event having a score, the system comprising:

a server comprising one or more processing units configured to:

determine that one or more of a plurality of users are qualified to play one or more games based on qualification criteria, wherein the qualification criteria for the one or more plurality of users is received via a first application programming interface (API);

receive one or more requests from the one or more qualified users to place one or more wagers on the one or more games, wherein the one or more requests are received via a second API;

provide a matrix game associated with the event to a plurality of display devices that are associated with the one or more of the plurality of qualified users, wherein the matrix game includes a plurality of selectable gaming units;

generate two sets of event gaming numbers, wherein the two sets of event gaming numbers include a first set of event gaming numbers corresponding to a first dimension of the matrix game and a second set of event gaming numbers corresponding to a second dimension of the matrix game, transmit a notification that the one or more requests to place the one or more wagers have been confirmed;

generate one or more selectable gaming units for each of the plurality of qualified users to play the matrix game and have received the notification;

receive a selection of one or more of the plurality of selectable gaming units;

wherein each selectable gaming unit is associated with a first gaming number from the first set of event gaming numbers and a second gaming number from the second set of event gaming numbers, wherein each number in the first set of event gaming numbers is different from each other, and wherein each number in the second set of event gaming numbers is different from each other;

monitor the score of the event associated with the matrix game, wherein the score includes a first score number and a second score number;

compare, for a selected gaming unit selected by the display device, the first score number with the first gaming number of the selected gaming unit and the second score number with the second gaming number of the selected gaming unit; and provide information to the display device based on the comparison.

Clause 2. The system of clause 1, wherein the server is further configured to:

determine a match based on the comparison;

define a winning gaming square, based on the determined match, from the plurality of selectable gaming unit; and provide information of the defined winning gaming unit to the display device.

Clause 3. The system according to any one of the preceding clauses, wherein the server is further configured to:

generate an award that is designated for the winning gaming square prior to commencement of the event, wherein the award is delivered to the display device after the information is provided.

Clause 4. The system according to any one of the preceding clauses, wherein the one or more games are different than the matrix game.

Clause 5. The system according to any one of the preceding clauses, wherein the server is further configured to:

obtain the score indicative of progress of the event at specified intervals during play of the event, wherein an interval winning gaming unit is defined for each of the specified intervals;

compare, for each specified interval, the first score number with the first gaming number and the second score number with the second gaming number;

determine an indicator match based on the comparison; and provide an indicator based on the determined indicator match.

Clause 6. The system according to any one of the preceding clauses, wherein the server is further configured to provide the score of the event during the display of the event.

Clause 7. The system according to any one of the preceding clauses, wherein the server is further configured to, during play of the event, offer additional selections of one or more of the plurality of selectable gaming units to plurality of users who have selected one or more of the plurality of selectable gaming units in the matrix game.

Clause 8. The system according to any one of the preceding clauses, wherein the server is further configured to designate one or more of the plurality of selectable gaming units on the matrix game with a bonus award, wherein the designated bonus award is not displayed on the display device at a time of selecting one or more of the plurality of selectable gaming units, and wherein in response to the selection of one or more of the plurality of selectable gaming units that corresponds to the designated one or more of the plurality of selectable gaming units with the bonus award, the bonus award is awarded.

Clause 9. The system according to any one of the preceding clauses, wherein the bonus award is at least one of a real-world currency amount, a prize multiplier, a gaming unit in a second matrix game, or a ticket for a promotion associated with the system.

Clause 10. The system according to any one of the preceding clauses, wherein in response to the selection of one or more of the plurality of selectable gaming units, the server is further configured to attach a bonus award to the selection of one or more of the plurality of selectable gaming units based on a predetermined award criteria associated with the display device.

Clause 11. A computer-implemented method for implementing a house-based game matrix associated with an event having a score, the method comprising:

determining, by a server, that one or more of a plurality of users are qualified to play one or more games based on qualification criteria, wherein the qualification criteria for the one or more plurality of users is received via a first application programming interface (API);

receiving, by the server, one or more requests from the one or more qualified users to place one or more wagers on the one or more games, wherein the one or more requests are received via a second API;

providing, by the server, a matrix game associated with the event to a plurality of display devices that are associated with the one or more of the plurality of qualified users, wherein the matrix game includes a plurality of selectable gaming units;

generating, by the server, two sets of event gaming numbers, wherein the two sets of event gaming numbers include a first set of event gaming numbers corresponding to a first dimension of the matrix game and a second set of event gaming numbers corresponding to a second dimension of the matrix game, transmitting, by the server, a notification that the one or more requests to place the one or more wagers have been confirmed;

generating, by the server, one or more selectable gaming units for each of the plurality of users that are qualified to play the matrix game and have received the notification;

receiving, by the server, a selection of one or more of the plurality of selectable gaming units;

wherein each selectable gaming unit is associated with a first gaming number from the first set of event gaming numbers and a second gaming number from the second set of event gaming numbers, wherein each number in the first set of event gaming numbers is different from each other, and wherein each number in the second set of event gaming numbers is different from each other;

monitoring, by the server, the score of the event associated with the matrix game, wherein the score includes a first score number and a second score number;

comparing, by the server, for a selected gaming unit selected by the display device, the first score number with the first gaming number of the selected gaming unit and the second score number with the second gaming number of the selected gaming unit; and provide information to the display device and generate an award for the display device to provide to the one or more qualified users based on the comparison.

Clause 12. The computer-implemented method according to any one of the preceding clauses, further comprising:

determining a match based on the comparison;

defining a winning gaming square, based on the determined match, from the plurality of selectable gaming unit; and providing a second notification of the defined winning gaming unit to the display device.

Clause 13. The computer-implemented method according to any one of the preceding clauses, further comprising communicating with the display device and verifying whether the display device represents a qualified device based on predetermined qualification criteria.

Clause 14. The computer-implemented method according to any one of the preceding clauses, wherein the matrix game is configured to start even when less than all of the selectable gaming units are selected.

Clause 15. A non-transitory computer readable medium containing instruction that when executed by at least one processor of a device to cause the device to perform operations for enabling users to implement a matrix game associated with an event having a score, the operations comprising:

determine that one or more of a plurality of users is qualified to play one or more games based on qualification criteria, wherein the qualification criteria for the one or more plurality of users is received via a first application programming interface (API);

receive one or more requests from the one or more qualified users to place one or more wagers on the one or more games, wherein the one or more requests are received via a second API;

provide a matrix game associated with the event to a plurality of display devices that are associated with the one or more of the plurality of qualified users, wherein the matrix game includes a plurality of selectable gaming units;

generate two sets of event gaming numbers, wherein the two sets of event gaming numbers include a first set of event gaming numbers corresponding to a first dimension of the matrix game and a second set of event gaming numbers corresponding to a second dimension of the matrix game, transmit a notification that the one or more requests to place the one or more wagers have been confirmed;

generate one or more selectable gaming units for each of the plurality of users that is qualified to play the matrix game and has received the notification;

receive a selection of one or more of the plurality of selectable gaming units;

wherein each selectable gaming unit is associated with a first gaming number from the first set of event gaming numbers and a second gaming number from the second set of event gaming numbers, wherein each number in the first set of event gaming numbers is different from each and wherein each number in the second set of event gaming numbers is different from each other;

monitor the score of the event associated with the matrix game, wherein the score includes a first score number and a second score number;

compare, for a selected gaming unit selected by the display device, the first score number with the first gaming number of the selected gaming unit and the second score number with the second gaming number of the selected gaming unit; and provide a notification to the display device based on the comparison.

Clause 16. The non-transitory computer readable medium according to any one of the preceding clauses, wherein the operations further include:

determine a match based on the comparison;

define a winning gaming square, based on the determined match, from the plurality of selectable gaming unit; and provide a notification of the defined winning gaming unit to the display device.

Clause 17. The non-transitory computer readable medium according to any one of the preceding clauses, wherein the operations further include:

use one or more neural networks to determine that the one or more of a plurality of users are qualified to play one or more games based on qualification criteria.

Clause 18. The non-transitory computer readable medium according to any one of the preceding clauses, wherein the operations further include:

use one or more neural networks to generate an award for a winning square; and deliver the award to the display device.

Clause 19. The non-transitory computer readable medium according to any one of the preceding clauses, wherein the one or more games are different than the matrix game.

Clause 20. The non-transitory computer readable medium according to any one of the preceding clauses, wherein the operations further include:

obtain the score indicative of progress of the event at specified intervals during play of the event, wherein an interval winning gaming unit is defined for each of the specified intervals;

compare, for each specified interval, the first score number with the first gaming number and the second score number with the second gaming number;

determine an indicator match based on the comparison; and providing an indicator based on the determined indicator match.

Clause 21. The non-transitory computer readable medium according to any one of the preceding clauses, wherein the operations further include:

generate, using a third API, a second game that is to be played simultaneously with the event.

Clause 22. The non-transitory computer readable medium according to any one of the preceding clauses, wherein the second game corresponds to a bingo game, where the bingo game includes gaming units that correspond to the event.

Clause 23. The non-transitory computer readable medium according to any one of the preceding clauses, wherein the operations further include:

provide a plurality of matrix games associated with the event to a plurality of display devices that are associated with the one or more of the plurality of qualified users, wherein the plurality of matrix games includes gaming units that represent a last digit of a value for the event, and wherein the each of the plurality of matrix games includes gaming units associated with a different portion of the event.

Throughout this disclosure there are references to "disclosed embodiments," which refer to examples of inventive ideas, concepts, or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium and systems and devices for implementing those methods via, for example, at least one processor. It is to be understood that this form of disclosure is for ease of discussion only, and one or more aspects of one embodiment herein may be combined with one or more aspects of other embodiments herein, within the intended scope of this disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

While example embodiments have been described, it is to be understood that the words which have been used are words of description rather than limitation and that changes may be made within the purview of the appended claims without departing from the true scope and spirit of its broader aspects.

What is claimed is:

1. A system for hosting a matrix game associated with an event having a score, the system comprising:

a server comprising one or more processing units configured to:

determine that one or more of a plurality of users are qualified to play one or more games based on qualification criteria, wherein the qualification criteria for the one or more plurality of users is received via a first application programming interface (API);

receive one or more requests from the one or more qualified users to place one or more wagers on the one or more games, wherein the one or more requests are received via a second API;

provide a matrix game associated with the event to a plurality of display devices that is associated with the one or more of the plurality of qualified users, wherein the matrix game includes a plurality of selectable gaming units;

generate two sets of event gaming numbers, wherein the two sets of event gaming numbers include a first set of event gaming numbers corresponding to a first dimension of the matrix game and a second set of event gaming numbers corresponding to a second dimension of the matrix game;

transmit a notification that the one or more requests to place the one or more wagers have been confirmed;

generate one or more selectable gaming units for each of the plurality of qualified users to play the matrix game and have received the notification;

receive a selection of one or more of the plurality of selectable gaming units, wherein each selectable gaming unit is associated with a first gaming number from the first set of event gaming numbers and a second gaming number from the second set of event gaming numbers, wherein each number in the first set of event gaming numbers is different from each other, and wherein each number in the second set of event gaming numbers is different from each other;

monitor the score of the event associated with the matrix game, wherein the score includes a first score number and a second score number;

compare, for a selected gaming unit selected by the display device, the first score number with the first gaming number of the selected gaming unit and the second score number with the second gaming number of the selected gaming unit;

determine a match based on the comparison;

define a winning gaming square, based on the determined match, from the plurality of selectable gaming units; and provide information of the defined winning gaming unit to the display device.

2. The system of claim 1, wherein the server is further configured to:

generate an award that is designated for the winning gaming square prior to commencement of the event, wherein the award is delivered to the display device after the information is provided.

3. The system of claim 1, wherein the one or more games are different than the matrix game.

4. The system of claim 1, wherein the server is further configured to:

obtain the score indicative of progress of the event at specified intervals during play of the event, wherein an interval winning gaming unit is defined for each of the specified intervals;

compare, for each specified interval, the first score number with the first gaming number and the second score number with the second gaming number;

determine an indicator match based on the comparison; and provide an indicator based on the determined indicator match.

5. The system of claim 1, wherein the server is further configured to provide the score of the event during the display of the event.

6. The system of claim 1, wherein the server is further configured to, during play of the event, provide additional selections of one or more of the plurality of selectable gaming units to the plurality of users who have selected one or more of the plurality of selectable gaming units in the matrix game.

7. The system of claim 1, wherein the server is further configured to designate one or more of the plurality of selectable gaming units on the matrix game with a bonus award, wherein the designated bonus award is not displayed on the display device at a time of selecting one or more of the plurality of selectable gaming units, and wherein in response to the selection of one or more of the plurality of selectable gaming units that correspond to the designated one or more of the plurality of selectable gaming units with the bonus award, the bonus award is awarded.

8. The system of claim 7, wherein the bonus award is at least one of a real-world currency amount, a prize multiplier, a gaming unit in a second matrix game, or a ticket for a promotion associated with the system.

9. The system of claim 1, wherein in response to the selection of one or more of the plurality of selectable gaming units, the server is further configured to attach a bonus award to the selection of one or more of the plurality of selectable gaming units based on a predetermined award criteria associated with the display device.

10. A computer-implemented method for implementing a house-based game matrix associated with an event having a score, the method comprising:

receiving, by a server, one or more requests from one or more qualified users to place one or more wagers on one or more games, providing, by the server, a matrix game associated with the event to a plurality of display devices that are associated with one or more of a plurality of qualified users, wherein the matrix game includes a plurality of selectable gaming units;

generating, by the server, two sets of event gaming numbers, wherein the two sets of event gaming numbers include a first set of event gaming numbers corresponding to a first dimension of the matrix game and a second set of event gaming numbers corresponding to a second dimension of the matrix game;

generating, by the server, one or more selectable gaming units for each of the plurality of users that are qualified to play the matrix game;

receiving, by the server, a selection of one or more of the plurality of selectable gaming units, wherein each selectable gaming unit is associated with a first gaming number from the first set of event gaming numbers and a second gaming number from the second set of event gaming numbers, wherein each number in the first set of event gaming numbers is different from each other, and wherein each number in the second set of event gaming numbers is different from each other;

monitoring, by the server, the score of the event associated with the matrix game, wherein the score includes a first score number and a second score number;

comparing, by the server, for a selected gaming unit selected by the display device, the first score number with the first gaming number of the selected gaming unit and the second score number with the second gaming number of the selected gaming unit;

determining a match based on the comparison;

defining a winning gaming square, based on the determined match, from the plurality of selectable gaming units; and providing a second notification of the defined winning gaming unit to the display device.

11. The computer-implemented method of claim 10, further comprising communicating with the display device and verifying whether the display device represents a qualified device based on predetermined qualification criteria.

12. The computer-implemented method of claim 10, wherein the matrix game is configured to start even when less than all of the selectable gaming units are selected.

13. A non-transitory computer readable medium containing instruction that when executed by at least one processor of a device to cause the device to perform operations for enabling users to implement a matrix game associated with an event having a score, the operations comprising:

provide a matrix game associated with the event to a plurality of display devices that is associated with one or more of a plurality of users that are qualified to play one or more games based on qualification criteria, where the one or more games are different than the matrix game, wherein the matrix game includes a plurality of selectable gaming units;

generate two sets of event gaming numbers, wherein the two sets of event gaming numbers include a first set of event gaming numbers corresponding to a first dimension of the matrix game and a second set of event gaming numbers corresponding to a second dimension of the matrix game;

generate one or more selectable gaming units for each of the plurality of users that is qualified to play the matrix game;

receive a selection of one or more of the plurality of selectable gaming units, wherein each selectable gaming unit is associated with a first gaming number from the first set of event gaming numbers and a second gaming number from the second set of event gaming numbers, wherein each number in the first set of event gaming numbers is different from each other, and wherein each number in the second set of event gaming numbers is different from each other;

monitor the score of the event associated with the matrix game, wherein the score includes a first score number and a second score number;

compare, for a selected gaming unit selected by the display device, the first score number with the first gaming number of the selected gaming unit and the second score number with the second gaming number of the selected gaming unit; and provide a notification to the display device based on the comparison.

14. The non-transitory computer readable medium of claim 13, wherein the operations further include:

determine a match based on the comparison;

define a winning gaming square, based on the determined match, from the plurality of selectable gaming units; and provide a notification of a defined winning gaming unit to the display device.

15. The non-transitory computer readable medium of claim 13, wherein the operations further include:

use one or more neural networks to determine that the one or more of a plurality of users are qualified to play one or more games based on qualification criteria.

16. The non-transitory computer readable medium of claim 13, wherein the operations further include:

use one or more neural networks to generate an award for a winning square; and deliver the award to the display device.

17. The non-transitory computer readable medium of claim 13, wherein the operations further include:

obtain the score indicative of progress of the event at specified intervals during play of the event, wherein an interval winning gaming unit is defined for each of the specified intervals;

compare, for each specified interval, the first score number with the first gaming number and the second score number with the second gaming number;

determine an indicator match based on the comparison; and provide an indicator based on the determined indicator match.

18. The non-transitory computer readable medium of claim 13, wherein the operations further include:

generate, using a third API, a second game that is to be played simultaneously with the event.

19. The non-transitory computer readable medium of claim 18, wherein the second game corresponds to a bingo game, where the bingo game includes gaming units that correspond to the event.

20. The non-transitory computer readable medium of claim 18, wherein the operations further include:

provide a plurality of matrix games associated with the event to a plurality of display devices that are associated with the one or more of the plurality of qualified users, wherein the plurality of matrix games include gaming units that represent a last digit of a value for the event, and wherein each of the plurality of matrix games includes gaming units associated with a different portion of the event.

* * * * *